US011138915B2

(12) United States Patent
Rohena et al.

(10) Patent No.: US 11,138,915 B2
(45) Date of Patent: Oct. 5, 2021

(54) FAN ASSEMBLY FOR DISPLAYING AN IMAGE

(71) Applicant: Magic Leap, Inc., Plantation, FL (US)

(72) Inventors: Guillermo Padin Rohena, Coral Springs, FL (US); Ralph Remsburg, Midland, TX (US); Adrian Kaehler, Los Angeles, CA (US); Evan Francis Rynk, Boca Raton, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/046,783

(22) Filed: Jul. 26, 2018

(65) Prior Publication Data

US 2019/0035317 A1 Jan. 31, 2019

Related U.S. Application Data

(60) Provisional application No. 62/538,518, filed on Jul. 28, 2017.

(51) Int. Cl.
*G09G 3/00* (2006.01)
*G09G 3/02* (2006.01)
(Continued)

(52) U.S. Cl.
CPC .............. *G09G 3/02* (2013.01); *F04D 17/16* (2013.01); *F04D 29/005* (2013.01);
(Continued)

(58) Field of Classification Search
CPC .......... G09G 3/003; G09G 3/02; G09G 3/005; G09G 5/10; G02B 30/56; F04D 29/4226;
(Continued)

(56) References Cited

U.S. PATENT DOCUMENTS

| 1,921,218 A | 8/1933 | Colby |
| 2,853,539 A | 9/1958 | Kerr |

(Continued)

FOREIGN PATENT DOCUMENTS

| CN | 103336532 A | 10/2013 |
| CN | 104566757 A | 4/2015 |

(Continued)

OTHER PUBLICATIONS

International Search Report and Written Opinion, re PCT Application No. PCT/US18/43945, dated Nov. 15, 2018.

(Continued)

*Primary Examiner* — Alexander Eisen
*Assistant Examiner* — Cory A Almeida
(74) *Attorney, Agent, or Firm* — Knobbe, Martens, Olson & Bear, LLP

(57) ABSTRACT

Apparatus and methods for displaying an image by a rotating structure are provided. The rotating structure can comprise blades of a fan. The fan can be a cooling fan for an electronics device such as an augmented reality display. In some embodiments, the rotating structure comprises light sources that emit light to generate the image. The light sources can comprises light-field emitters. In other embodiments, the rotating structure is illuminated by an external (e.g., non-rotating) light source.

51 Claims, 35 Drawing Sheets

(51) Int. Cl.

| | | |
|---|---|---|
| *G02B 30/56* | (2020.01) | |
| *F04D 17/16* | (2006.01) | |
| *F04D 29/00* | (2006.01) | |
| *F04D 29/42* | (2006.01) | |
| *G06F 3/16* | (2006.01) | |
| *G08B 21/18* | (2006.01) | |
| *G09G 5/10* | (2006.01) | |
| *G06T 19/00* | (2011.01) | |

(52) U.S. Cl.
CPC ......... *F04D 29/4226* (2013.01); *G02B 30/56* (2020.01); *G06F 3/167* (2013.01); *G08B 21/18* (2013.01); *G09G 3/005* (2013.01); *G09G 5/10* (2013.01); *G06T 19/006* (2013.01); *G09G 3/003* (2013.01); *G09G 2320/028* (2013.01); *G09G 2320/0646* (2013.01); *G09G 2320/0666* (2013.01); *G09G 2354/00* (2013.01); *G09G 2360/04* (2013.01); *G09G 2370/16* (2013.01)

(58) Field of Classification Search
CPC ............... F04D 29/4233; F04D 29/424; F04D 29/4246; F04D 29/4253; F04D 17/16; G06F 3/167; G08B 21/18; G06T 19/006
See application file for complete search history.

(56) References Cited

U.S. PATENT DOCUMENTS

| | | | |
|---|---|---|---|
| 5,082,422 A * | 1/1992 | Wang | .................... F04D 25/088 362/234 |
| 5,291,560 A | 3/1994 | Daugman | |
| 5,825,443 A | 10/1998 | Kawasaki et al. | |
| 6,037,876 A * | 3/2000 | Crouch | .................... G09F 9/33 340/815.53 |
| 6,561,762 B1 | 5/2003 | Horng et al. | |
| 6,594,630 B1 * | 7/2003 | Zlokarnik | ............... G10L 15/26 704/256.5 |
| 6,850,221 B1 | 2/2005 | Tickle | |
| D514,570 S | 2/2006 | Ohta | |
| 8,950,867 B2 | 2/2015 | Macnamara | |
| 9,081,426 B2 | 7/2015 | Armstrong | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,398,357 B2 * | 7/2016 | Berkman | ................ H04R 1/02 |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,572,552 B1 | 2/2017 | Bodor et al. | |
| 9,671,566 B2 | 6/2017 | Abovitz et al. | |
| D794,288 S | 8/2017 | Beers et al. | |
| 9,740,006 B2 | 8/2017 | Gao | |
| D797,749 S | 9/2017 | Awad et al. | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 10,536,690 B2 | 1/2020 | Kaehler | |
| 10,871,806 B2 | 12/2020 | Aguirre et al. | |
| 2004/0192430 A1 | 9/2004 | Burak et al. | |
| 2005/0117294 A1 * | 6/2005 | Hsieh | ................... G06F 1/20 361/695 |
| 2006/0028436 A1 | 2/2006 | Armstrong | |
| 2006/0087815 A1 | 4/2006 | Lanni | |
| 2006/0109200 A1 | 5/2006 | Alden | |
| 2006/0132497 A1 | 6/2006 | Biegelsen | |
| 2007/0081123 A1 | 4/2007 | Lewis | |
| 2007/0109787 A1 * | 5/2007 | Wu | ................... F04D 25/0613 362/294 |
| 2007/0247832 A1 | 10/2007 | Barker | |
| 2009/0136341 A1 | 5/2009 | Kenyon | |
| 2009/0290307 A1 | 11/2009 | Hwang et al. | |
| 2010/0003126 A1 | 1/2010 | Wang | |
| 2010/0097448 A1 | 4/2010 | Gilbert et al. | |
| 2010/0142146 A1 | 6/2010 | Hwang et al. | |
| 2010/0247344 A1 | 9/2010 | Yang | |
| 2010/0310390 A1 | 12/2010 | Huang et al. | |
| 2011/0063799 A1 | 3/2011 | Takahasi et al. | |
| 2011/0157168 A1 | 6/2011 | Bennett et al. | |
| 2011/0228477 A1 | 9/2011 | Hong | |
| 2011/0263200 A1 | 10/2011 | Thornton et al. | |
| 2012/0127062 A1 | 5/2012 | Bar-Zeev et al. | |
| 2012/0162549 A1 | 6/2012 | Gao et al. | |
| 2013/0017076 A1 | 1/2013 | Li | |
| 2013/0044129 A1 | 2/2013 | Latta et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2013/0321394 A1 | 12/2013 | Fisher et al. | |
| 2014/0071539 A1 | 3/2014 | Gao | |
| 2014/0152672 A1 | 6/2014 | Seder et al. | |
| 2014/0168783 A1 | 6/2014 | Luebke et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0294621 A1 | 10/2014 | Narita | |
| 2014/0306866 A1 | 10/2014 | Miller et al. | |
| 2015/0016777 A1 | 1/2015 | Abovitz et al. | |
| 2015/0049390 A1 | 2/2015 | Lanman et al. | |
| 2015/0103306 A1 | 4/2015 | Kaji et al. | |
| 2015/0115060 A1 | 4/2015 | Klemm et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0238141 A1 | 8/2015 | Lai | |
| 2015/0260990 A1 | 9/2015 | Ueno et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2015/0379770 A1 * | 12/2015 | Haley, Jr. | ............. G06T 19/006 345/633 |
| 2016/0011419 A1 | 1/2016 | Gao | |
| 2016/0026156 A1 | 1/2016 | Jackson et al. | |
| 2016/0026253 A1 | 1/2016 | Bradski et al. | |
| 2016/0128229 A1 | 5/2016 | Pallasrnaa et al. | |
| 2016/0255748 A1 | 9/2016 | Kim et al. | |
| 2016/0270656 A1 * | 9/2016 | Samec | ................. A61B 3/1216 |
| 2016/0298650 A1 | 10/2016 | Inda et al. | |
| 2017/0106277 A1 | 4/2017 | Perdigon Rodriguez et al. | |
| 2017/0184863 A1 * | 6/2017 | Balachandreswaran | ..................... G02B 27/0176 |
| 2017/0223344 A1 | 8/2017 | Kaehler | |
| 2017/0235134 A1 * | 8/2017 | Border | ................ G02B 27/017 345/8 |
| 2017/0257913 A1 | 9/2017 | Vengroff et al. | |
| 2017/0266676 A1 * | 9/2017 | Fateh | ................. A63F 13/5255 |
| 2017/0347498 A1 | 11/2017 | Janak et al. | |
| 2018/0003192 A1 | 1/2018 | Chen et al. | |
| 2018/0053284 A1 | 2/2018 | Rodriguez et al. | |
| 2018/0036703 A1 | 5/2018 | Woods et al. | |
| 2018/0348826 A1 | 12/2018 | Aguirre et al. | |
| 2020/0033921 A1 | 1/2020 | Rohena et al. | |
| 2020/0092538 A1 | 3/2020 | Kaehler | |
| 2020/0383240 A1 | 12/2020 | Rohena | |

FOREIGN PATENT DOCUMENTS

| | | |
|---|---|---|
| CN | 204945946 U | 1/2016 |
| CN | 207609586 U | 7/2018 |
| JP | 2003-216071 | 7/2003 |
| JP | 2005-308980 | 11/2005 |
| JP | 2007-226013 | 9/2007 |

(56) References Cited

FOREIGN PATENT DOCUMENTS

| | | |
|---|---|---|
| JP | 2009-071516 | 4/2009 |
| JP | 2012-168446 | 9/2012 |
| JP | 2013-64996 | 4/2013 |
| WO | WO 2013/086046 | 6/2013 |
| WO | WO 2015/140578 | 9/2015 |
| WO | WO 2017/132050 | 8/2017 |
| WO | WO 2018/222618 | 12/2018 |
| WO | WO 2019/023489 | 1/2019 |

OTHER PUBLICATIONS

3D Hologram No Glass No Cd case—YouTube, accessed Jul. 18, 2017, in 3 pages URL: https://www.youtube.com/watch?v=49BhZlQvjLw.

Kinomo: "Kino-mo Holo Displays—The new holograms", Kino-mo, printed Jan. 27, 2016, in 4 pages. URL: http://kinomo.com/displays.

Lanman, D. et al., "Near-Eye Light Field Displays", NVIDIA Research, Jul. 2013, in 10 pages.

Invitation to Pay Additional Fees dated Sep. 20, 2018 for International Application No. PCT/US2018/043945, filed Jul. 26, 2018.

International Preliminary Report for Patentability, re PCT Application No. PCT/US18/439945, dated Jan. 28, 2020.

ARToolKit: https://web.archive.org/web/20051013062315/http://www.hiti.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

FAN ASSEMBLY FOR DISPLAYING AN IMAGE

CROSS-REFERENCE TO RELATED APPLICATIONS

This application claims the benefit of priority under 35 U.S.C. § 119(e) to U.S. Provisional Patent Application No. 62/538,518 filed Jul. 28, 2017, entitled "FAN ASSEMBLY FOR DISPLAYING AN IMAGE", the disclosure of which is hereby incorporated by reference herein.

FIELD

The present disclosure relates to apparatus and methods for displaying an image by projecting or reflecting light from rotating elements such as blades of a fan.

BACKGROUND

Light from natural objects, when it encounters the human eye, has a particular content in terms of rays of light, with magnitude and direction, at each point in space. This structure is known as a light field. Conventional two-dimensional (2-D) displays (paintings, photographs, computer monitors, televisions, etc.) emit light isotropically (e.g., light is uniformly emitted from the display). As a result, these 2-D displays may only approximate the light field of the objects they represent.

SUMMARY

Accordingly, it is desirable to build displays that reproduce, or attempt to reproduce, the exact or approximate light that would be created by a natural object (for example, a light field or other representation). Such displays create a more compelling image that may comprise two-dimensional (2-D) or appear to be three-dimensional (3-D) and may be capable of being mistaken for a natural object. These feats may be unachievable by traditional 2-D displays. Further, images generated from light sources on rotating objects (such as fan blades of a fan assembly) or from light reflected from such rotating objects can generate colored displays, images, notifications, etc. Such fan assemblies are often a component used to cool electronic devices (e.g., computers, augmented reality displays) and can be used to project such images to a user of such devices.

In some embodiments, a fan assembly and methods for displaying a representation of an image are disclosed. In one implementation, the fan assembly may include multiple fan blades; a motor configured to rotate the multiple fan blades to induce an airflow; multiple light sources disposed on at least one of the multiple fan blades; a non-transitory memory configured to store image data to be displayed by the fan assembly, the image data providing one or more views of the image at a viewing direction; and a processor operably coupled to the non-transitory memory, the motor, and the multiple light sources. The processor may be programmed with executable instructions to drive the motor to rotate the multiple fan blades about a rotation axis, the multiple fan blades positioned at a rotation angle as a function of time; access the image data; map the image data to each of the multiple light sources based at least in part on the rotation angle; and illuminate the plurality of light sources based at least in part on the mapped image data.

In some embodiments, a fan assembly and methods for displaying a representation of an image are disclosed. In one implementation, the method may include driving a motor to rotate multiple fan blades that comprises multiple light sources about a rotation axis, the multiple fan blades positioned at a rotation angle as a function of time. The method may also include accessing image data to be displayed, the image data providing one or more views of the image at a viewing direction; mapping the image data to each of the multiple light sources based at least in part on the rotation angle; and illuminating the multiple light sources based at least in part on the mapped image data.

In some embodiments, a display apparatus and methods for displaying a representation of an image are disclosed. In one implementation, the display apparatus comprises a rotatable structure; a motor configured to rotate the rotatable structure; multiple light sources positioned relative to the rotatable structure so as to direct light toward the rotatable structure; a non-transitory memory configured to store image data to be displayed by the display apparatus, the image data providing one or more views of the image at a viewing direction; and a processor operably coupled to the non-transitory memory, the motor, and the multiple light sources. The processor may be programmed with executable instructions to drive the motor to rotate the rotatable structure about a rotation axis, the rotatable structure positioned at a rotation angle as a function of time; access the image data; map the image data to each of the multiple light sources based at least in part on the rotation angle; and illuminate the multiple light sources based at least in part on the mapped image data.

In some embodiments, a fan assembly and methods for displaying a representation of an image are disclosed. In one implementation, the method may include driving a motor to rotate a rotatable structure about a rotation axis, the rotatable structure positioned at a rotation angle as a function of time. The method may also include accessing image data to be displayed by the display apparatus, the image data providing one or more views of the image at a viewing direction; mapping the image data to each of multiple light sources based at least in part on the rotation angle, the multiple light sources positioned relative to the rotatable structure so as to direct light toward the rotatable structure; and illuminating the multiple light sources based at least in part on the mapped image data.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
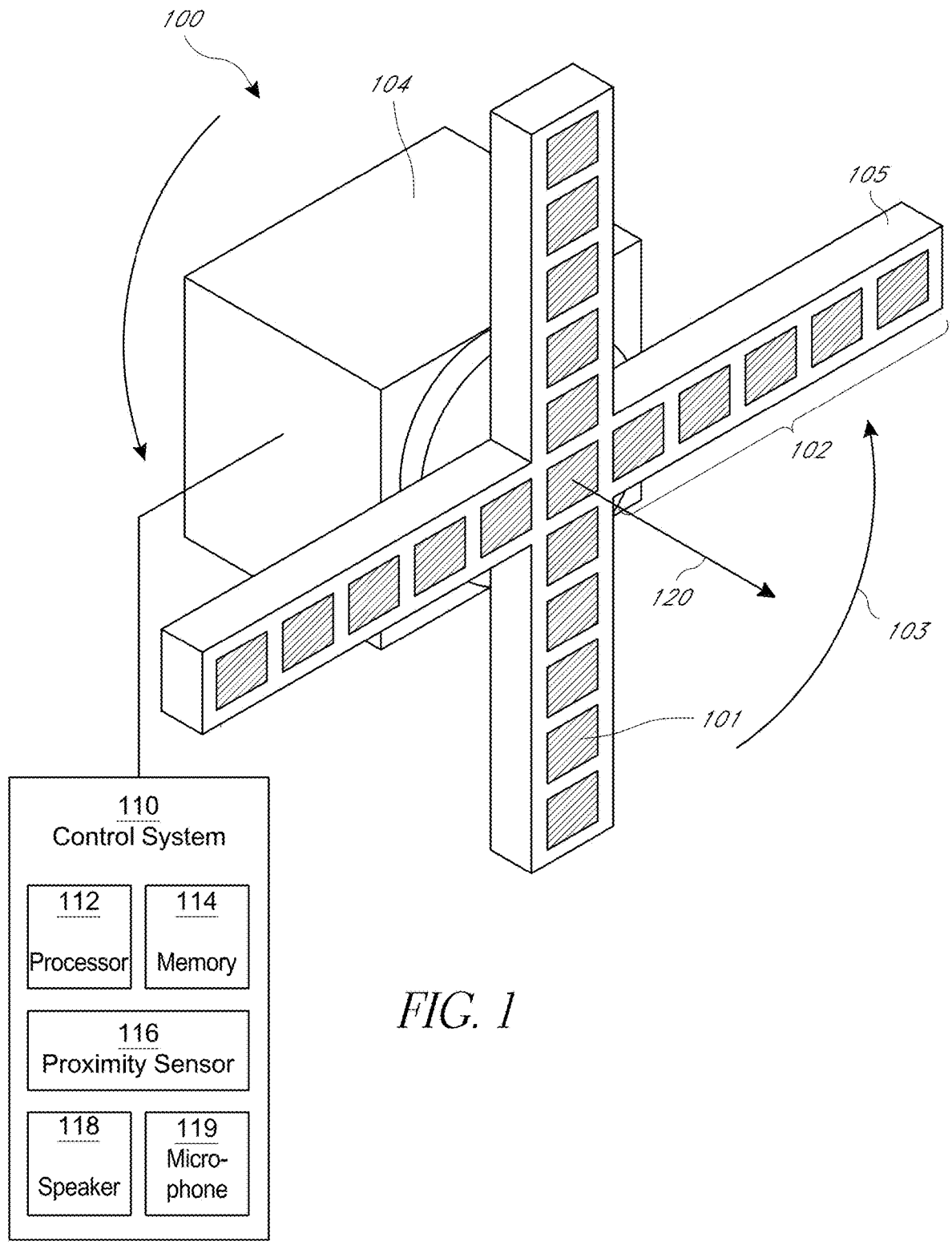
FIG. 1 schematically illustrates an example display apparatus.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Many types of light field displays at this time are costly and therefore not suitable for many applications (e.g. commercial advertising, viewing in a home, etc.). Current implementations of light field displays, for example a flat panel display, utilize numerous pixels and waveguides to mimic a 3-D representation of an object. At any single point in time, such representation requires several images to be displayed, each image rendering a different direction of viewing the object as well as varying focal depths such that the object appears to be three-dimensional. For example, multiple 2-D representations may be displayed each corresponding to a different direction of viewing the object. In some implementations, utilizing a flat display panel may provide an increasingly limited field of view of the 3-D representation for observers who are positioned at increasingly greater angles from normal to the flat display panel. The present disclosure describes examples of displays that are not prohibitively expensive, due to implementing light source technology (e.g., a light field sub-display technology in some embodiments) capable of displaying multiple viewing angles or focal depths at any single instance and can be controlled to switch between multiple different views of the object being displayed in a 2-D or three-dimensional representation. The present disclosure describes some examples that may be configured to provide greater fields of view of the object being displayed in a representation. Such displays may be used for indoor or outdoor display applications such as advertising, home viewing, interior or exterior decorating, the arts, and so forth. For example, a store front or other business may wish to attract customers by displaying objects in three-dimensions opposed to conventional two-dimensional displays. A three-dimensional representation may be more eye-catching to a passer-by or more likely to be noticed, opposed to a flat two-dimensional representation. Examples of apparatus and methods for 2-D or 3-D display of images from rotating elements as well as curved displays are described in U.S. patent application Ser. No. 15/410,455, filed Jan. 19, 2017, titled "Display for Three-Dimensional Image," which is hereby incorporated by reference herein in its entirety.

The present disclosure describes examples of a display apparatus comprising a rotatable structure (for example, a propeller, a collection of fan blades, an impeller, or other device configured to be rotated about a rotation axis) that combines with a number of light sources, in which the individual light sources are strobed with different images depending on the current rotation state of the rotatable structure and the overall image to be projected by the display. The rate of strobing (e.g., switching the content displayed) may be at a frequency that is unperceivable to the eyes of a person viewing the object. The rate of strobing may also correspond to a refresh rate of the image displayed, for example, an increase in the strobing rate may correspond to an increase in the refresh rate thereby producing better quality image. The rotating motion of the rotatable structure causes the light sources to sweep out a particular area and, as a result, a lower cost implementation of a display providing an image to an observer is possible.

Example Display Apparatus

FIG. 1 illustrates an example of a display apparatus 100 configured to display an image observable as a 3-D representation of an object. The display apparatus 100 includes a rotatable structure 105, a motor 104, and a control system 110. The rotatable structure 105 may be coupled to the motor 104 configured to drive the rotatable structure 105 about a rotation axis 120 along a path 103 based on inputs from a local data processing module of the control system 110. The control system 110 may be operatively coupled to the display apparatus 100 which may be mounted in a variety of configurations, such as fixedly attached to the display apparatus 100 or located elsewhere in relation to the display apparatus 100 (e.g., in a separate part of a room or central control room). The rotatable structure 105 may include an array of light sources 101 disposed along one or more elongated elements 102. The light sources 101 may be controlled by the control system 110 to generate and display the 3-D representation of the object. The light sources 101 may comprise liquid crystals (LC), light emitting diodes (LEDs), organic LEDs (OLEDs), or any other type of pixel structure configured to emit light for rendering an image. Other light sources may include lasers, fiber optics, or any structure configured to emit light that may be manipulated to render an image. In the embodiment illustrated in FIG. 1, the light sources 101 may comprise light field sub-displays, for example, as described below in connection to FIGS. 2A-3C. As such, the light sources 101 may be referred to as light field sub-displays 101. However, such reference is for illustrative purposes only and is not a limitation. The light sources 101 may include lenses, waveguides, diffractive or reflective elements, baffles, or other optical elements to guide, direct, or focus light from the light sources toward or onto the rotatable structure.

In some implementations, movement of the rotatable structure 105 causes the light field sub-displays 101 to move about path 103, which, when driven by the control system 110 to illuminate the light field sub-displays 101, displays an image that is observable by a bystander as a 3-D representation of the object to be displayed. For example, the display apparatus 100 may be placed in a store front or viewable area where a person, located at a viewable distance from the display apparatus 100, is able to view the image displayed by the display apparatus 100 by looking toward the rotatable structure 105. In some embodiments, an extended 3-D representation of the object is created as the light field sub-displays 101 are rotated about the path 103 due to rotational movement imparted onto the rotatable structure 105 by the motor 104. In some embodiments, the multiple light field sub-displays 101 may each comprise one or more pixels, as described below, which can be illuminated according to light field image data stored in the digital memory 112 (e.g., non-transitory data storage) to display a 3-D representation of the object. In some embodiments, a speaker 118 may be coupled to the display apparatus 100 for providing audio output.

Figure 5A:
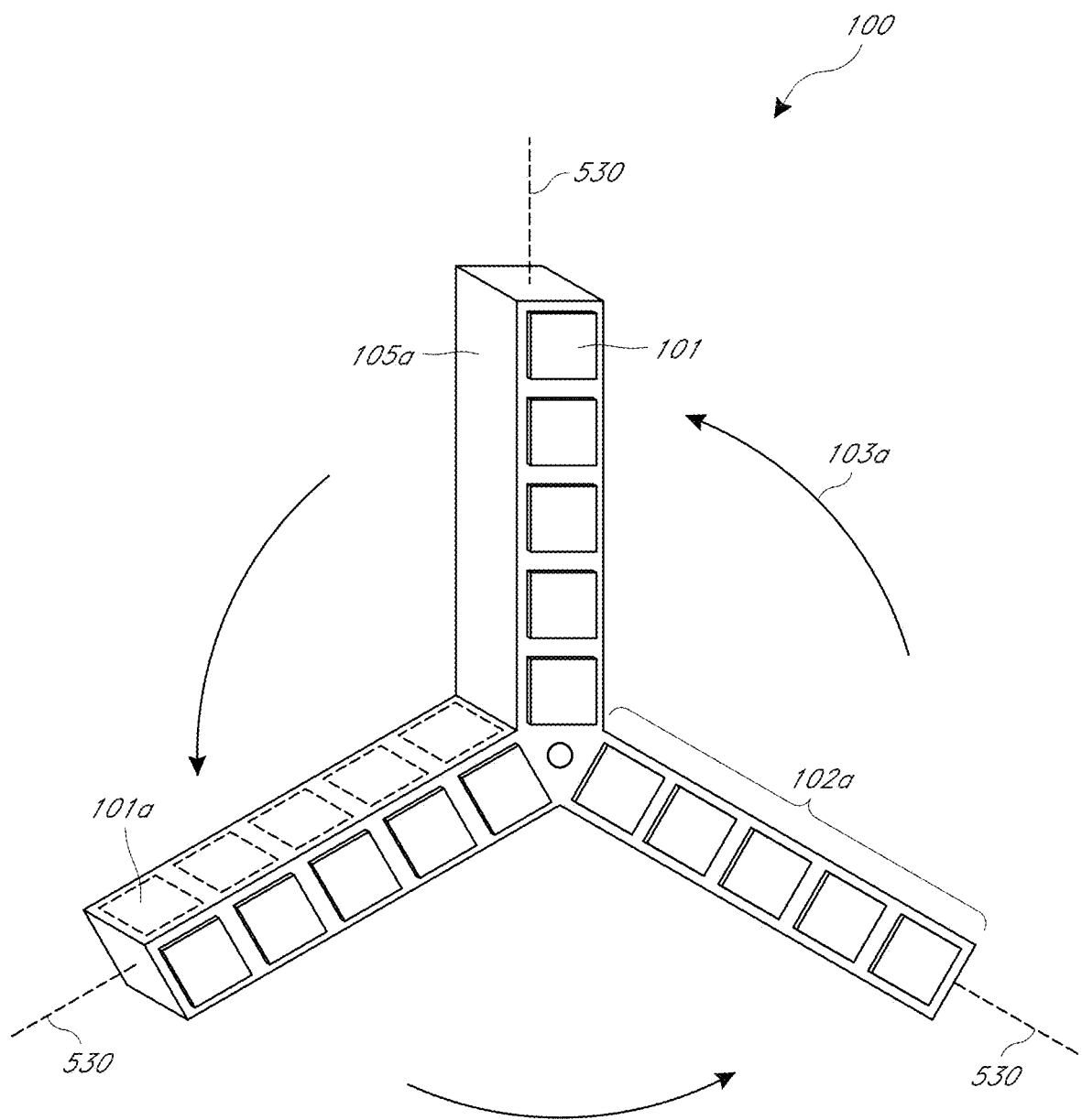
FIGS. 5A-5G schematically illustrate various examples of the display apparatus.
Figure 5B:
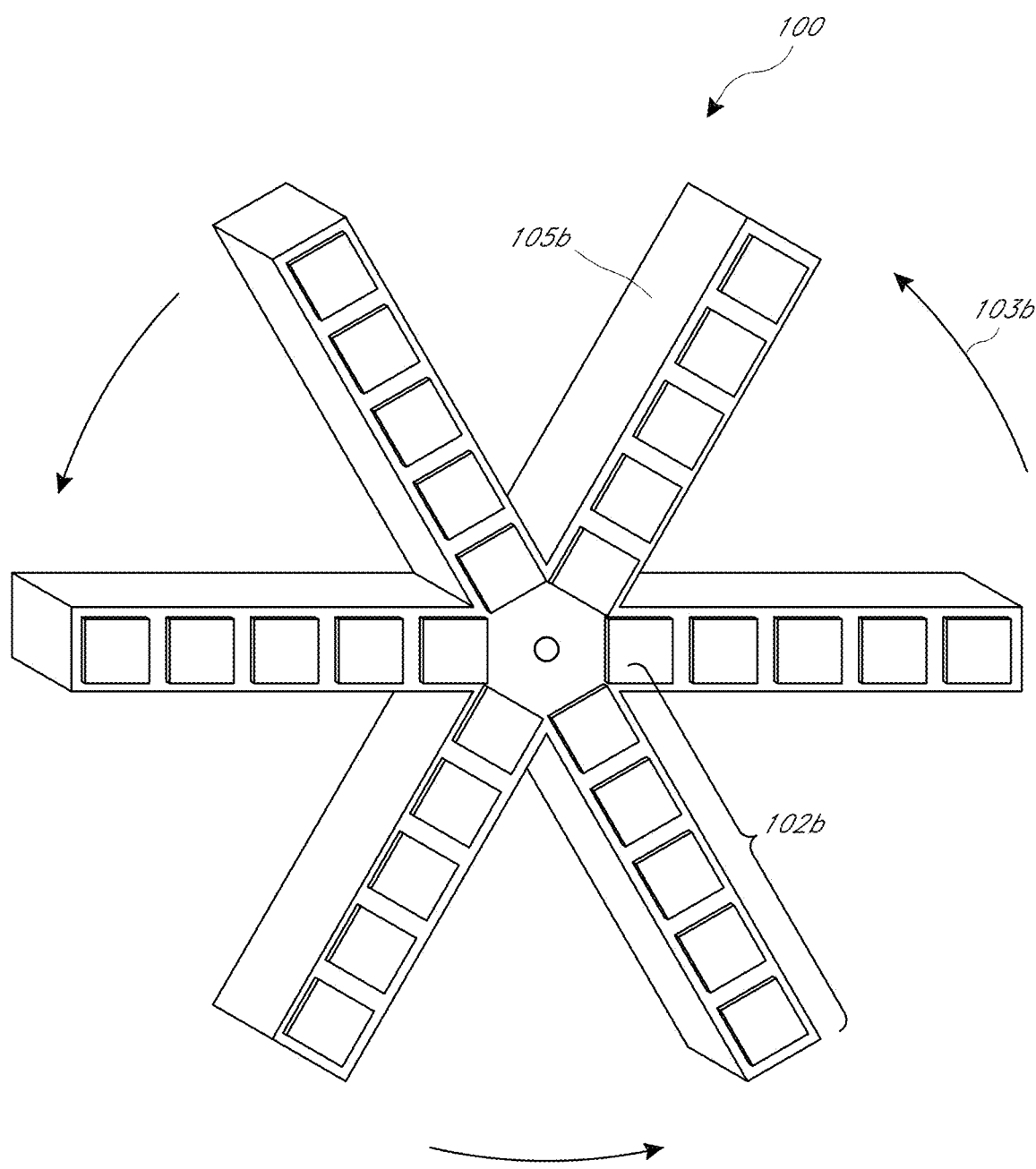
Figure 5C:
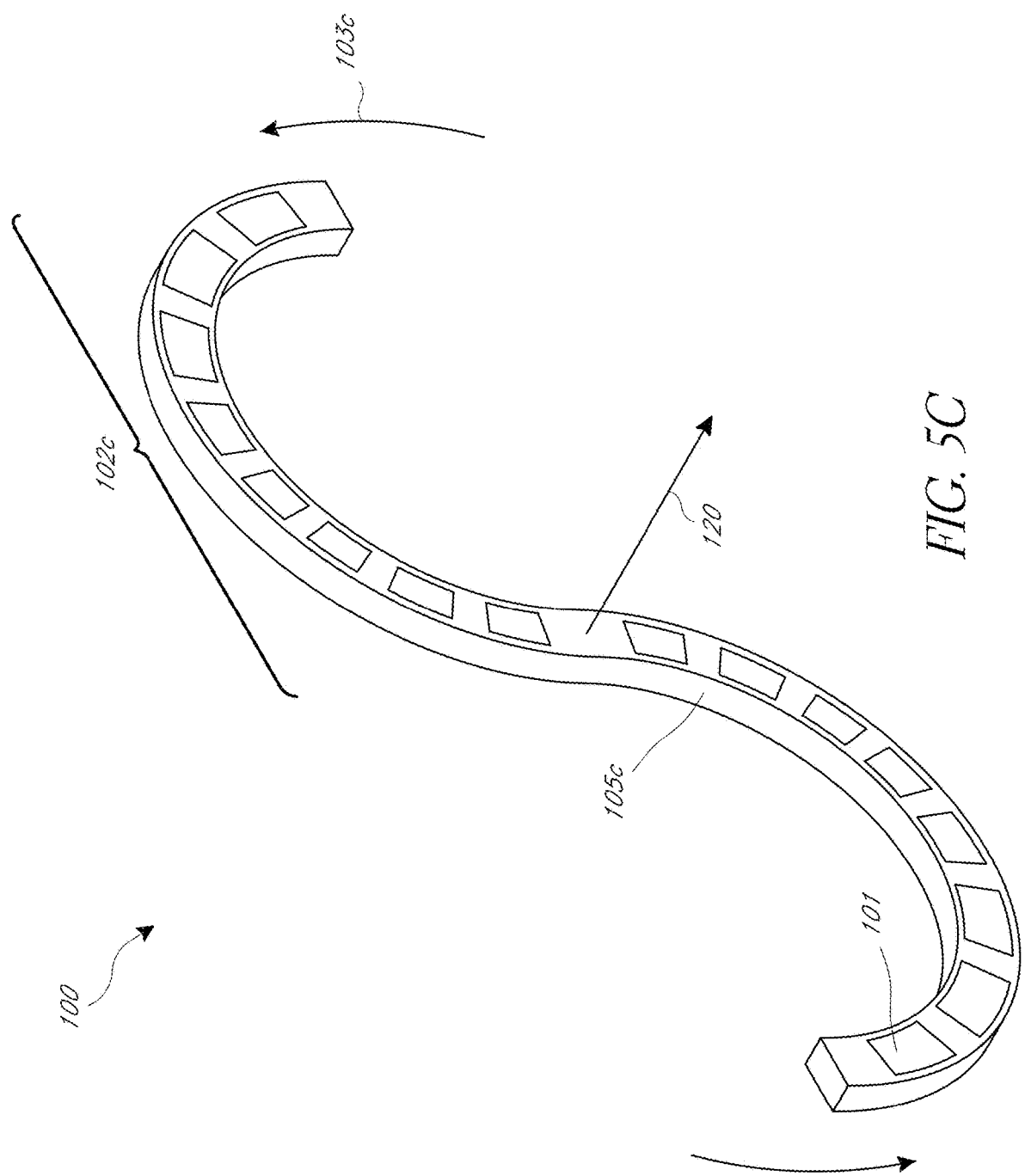

Referring again to FIG. 1, the rotatable structure 105 may be arranged similar to a propeller that rotates about the axis 120. As illustrated in FIG. 1, a rotatable structure 105 having a propeller arrangement may include multiple elongated elements 102. The elongated elements 102 may also be configured as a plurality of arms or blades of the propeller. While the display apparatus 100 in connection with FIG. 1 is shown having 4 elongated elements 102, the number, arrangement, length, width, or shape of the elongated elements 102 can be different (see, e.g., FIGS. 5A-5G). For example, the number of elongated elements 102 can be 1, 2, 3, 4, 5, 6, or more (e.g., as illustrated in FIGS. 5A and 5B). The elongated elements 102 can be straight (e.g., FIGS. 1, 5A, and 5B), curved as illustrated in FIG. 5C, or curved in or out of the plane that is perpendicular to the rotation axis 120 of the propeller (e.g., FIG. 7). As will be described below, in some embodiments the rotatable structure 105 may be arranged as a collection of fan blades or an impeller that rotates about the axis 120 as part of a fan assembly (e.g., FIGS. 8-13B).

With continued reference to FIG. 1, each elongated element 102 includes an array of light field sub-displays 101 disposed along the length of the elongated element 102. Although, FIG. 1 shows five light field sub-displays 101 disposed on each elongated element 102 (and an additional optional sub-display at the center of the display, where the elongated elements cross), other embodiments are possible. For example, the number of light field sub-displays 101 can be 1, 2, 3, 4, 5, 6, or more on each elongated element 102. In another embodiment, the rotatable structure may comprise a single light-field sub-display disposed thereon. The light field sub-displays 101 may comprise any display configured to produce a light field. In some embodiments, the light field sub-displays 101 may comprise one or more pixels configured to emit anisotropic light (e.g., directionally emitted). For example, as will be described in more detail in connection with FIGS. 2A-3C, the light field sub-displays 101 may comprise a micro-lens array disposed adjacent to a pixel array that emits light isotropically toward the micro-lens array. The micro-lens array redirects the light from the pixel array into an array of beams that propagate at different outgoing angles to generate a light field image. In some embodiments, each micro-lens of the micro-lens array may be configured as a pixel of the light field sub-display 101. In another embodiment, the light field sub-displays 101 may include a waveguide stack assembly that produces a light field, as described below in connection with FIGS. 4A and 4B.

The display apparatus also includes a motor 104 electrically coupled to and configured to drive the rotatable structure 105. For example, the motor 104 may cause the rotatable structure 105 to rotate about the rotation axis 120 in a circular motion as illustrated by the rotation path 103. When the rotatable structure 105 is driven by the motor 104, the light field sub-displays 101 are similarly rotated about the rotation path 103. The control system 110 may be configured to control the rotation rate applied by the motor 104 to the rotatable structure 105 at a desired frequency. The frequency of rotation may be selected such that the rotatable structure 102 may not be perceivable to the viewer, who instead perceives primarily the 3-D image due to the persistence of vision of the human visual system. Such displays are sometimes generally referred to as persistence of vision (POV) displays. Other rotation frequencies are possible. The combination of the rotating light field sub-displays 101 and the illumination of each light field sub-display 101 projects a representation of an image that can be viewed by observers. The image can include objects, graphics, text, and so forth. The image may be part of a series of image frames that project an object or thing that appears to be moving or changing, as in a video. The representation may appear to be 3-D and might be mistaken by the observers to be a natural object rather than a projection. The motor 104 and the control system 110 can be disposed so that they are not apparent to a viewer (e.g., below the propeller and connected to it via suitable gearing). The control system 110 may be coupled to the motor 104 via a wired or wireless communication link 150. Because the arms of the propeller are not visible (when the propeller is rotated sufficiently quickly), the image may appear to hover in mid-air and thereby attract attention from passers-by. Accordingly, the display apparatus 100 can advantageously be used in advertising, marketing, or sales, for presentations, or to otherwise generate interest or convey information to viewers.

The local data processing module of computerized control system 110 may comprise a hardware processor 112 and a digital memory 114. In some embodiments, the digital memory 114 may comprise non-volatile memory (e.g., flash memory) or any non-transitory computer readable media. The digital memory 114 may be configured to store data defining instructions for the hardware processor 112. These instructions configure the hardware processor 112 to perform functions of the display apparatus 100. For example, the hardware processor 112 and the digital memory 114 may both be utilized to assist in the processing, caching, and storage of light field data. The data may include data related to a) a light field image of the object to be displayed, b) the light field sub-display positions as a function of time, or c) a mapping of the light field image to the light field sub-display positions. In some embodiments, the light field image comprises multiple rendered frames of the object where each rendered frame is a 2-D representation of the object at a viewing direction (e.g., a direction that an observer may be relative to the display apparatus 100). Each rendered frame may comprise multiple pixels, referred to hereinafter as rendered pixels, which are combined to represent the image of the object to be displayed. Each rendered pixel may be associated with a position on a rendered frame (e.g., a rendered pixel position). The multiple rendered frames and the rendered pixel positions may be stored in the digital memory 114 for access and use by the control system 110. The light field image may include imaging parameters (e.g., color and intensity of light to display the rendered frame), where the imaging parameters are associated with the viewing direction of the rendered frame. In some embodiments, the light field sub-display positions are defined by positions of the light field sub-display 101 along the elongated elements 102 as a function of time and rotation angle based on the rotation rate of the rotatable structure 105. The light field sub-display positions may also include the positions of the components (e.g., micro-lenses described below) of each light field sub-display as a function of time.

The control system 110 may be coupled via wired or wireless communication lines (not shown) to the plurality of light field sub-displays 101. The communication lines may be configured to transmit signals from the control system 110 to the light field sub-displays 101 for rendering the image as described above. In some embodiments, the rotatable structure 105 or elongated elements 102 may comprise a plurality of cavities or pathways arranged to accept wired communications lines between each of the light field sub-displays 101 and the control system 110.

In some embodiments, the hardware processor 112 may be operatively coupled to the digital memory 114 and configured to analyze and process the data in the digital memory 114. The hardware processor 112 may also be operatively coupled to the motor 104 and configured to drive the motor 104 at a rate of rotation. In some embodiments, the rate of rotation may be preselected based on the light field image, the number of light field sub-displays 101, or the number of elongated elements 102. The hardware processor 112 may also be operably coupled to each light field sub-display 101 and configured to drive each light field sub-display 101 (e.g., the pixels of each light field sub-display 101 as described below) based on the light field image stored in the digital memory 114. For example, while the rotatable structure 105 is rotated based on instructions executed by the hardware processor 112, the rotation is imparted on to the light field sub-displays 101 causing them to sweep out a series of concentric circular arcs along the rotation path 103 about the rotation axis 120. The hardware processor 112 may also drive each light field sub-display 101 (e.g., the pixels described below) to emit light as the light field sub-displays 101 (or the pixels therein) reach a position associated with a rendered pixel position and image parameters stored in the digital memory 112. The rotation rate of the rotatable structure 105 can be sufficiently high so that an observer does not perceive the elongated elements 102 of the rotatable structure 105 as they rotate (e.g., the rotatable structure 105 in effect appears transparent) and instead sees the illumination from the light field sub-displays 101 thereby displaying a 3-D representation of the object.

One possible manner in which displaying a 3-D representation of an object can be accomplished is that a multiplicity of points of view may be rendered in advance by the control system 110 or another rendering engine. For any given orientation (e.g., rotation angle) of the rotatable structure 105, a mapping may be generated or retrieved that maps a position (z) of a pixel of the light field sub-display 101 at a time (t) (e.g., based on the rotation of the rotatable structure 105) to a rendered pixel (u) of a rendered frame (k). This mapping may be accomplished by the processor 112, which may include a microprocessor or microcontroller, a graphics processing unit (GPU), or special purpose hardware (e.g., a floating point gate array (FPGA) or an application specific integrated circuit (ASIC)).

In one embodiment, the control system 110 can be configured to map the rendered pixels of the rendered frame. For example, the rendered frame k can be associated with a viewing direction of the object to be displayed and the rendered pixel (u) can have a position (e.g., represented by coordinates, for example, an X and a Y coordinate or a positional coordinate) within the rendered frame (k). This mapping may be constant and independent of the object to be displayed and thus may be pre-computed and stored (e.g., in the digital memory 114) in a data structure (e.g., in a lookup table (LUT)).

In one embodiment, the control system 110 may also be configured to map the rendered pixel positions to positions of the light field sub-displays 101. For example, each pixel of the light field sub-displays 101 can be located at a different position at different times based on the rate of rotation of rotatable structure 105. The rotation rate may, but need not, be constant in time. In addition, because the light field sub-displays 101 are rotated with time, the rendered pixel position for the light emitted by a pixel of a light field sub-display 101 may be translated for this overall rotation. Accordingly, each rendered pixel position (u) of the rendered frame (k) can be associated with a given position of a pixel of the light field sub-display 101 based on the position (z) of the pixel along the elongated element 102 as a function of time (t) as the pixel sweeps out along the path 103. Thus, the corresponding rendered pixels of each rendered frame can be collected together and mapped to the pixels of the light field sub-displays 101. The mapping is configured such that the rendered pixel positions are translated to pixels of the light field sub-display 101 so that light emitted from the light field sub-displays 101 is anisotropically directed based on the viewing direction of the rendered frame. This may also be pre-computed and stored (e.g., in the digital memory 114) in a data structure (e.g., in a lookup table (LUT)) that may comprise the same data structure as described above or a different data structure. In some embodiments, the pixels of light field sub-display 101 may be strobed (e.g., alternated or switched between different rendered frames of the light field image) based on the mapped translated image parameters of the rendered frame as the rotatable structure 105 rotates.

In some embodiments, since some light field sub-displays 101 are farther from the rotation axis 120, some light field sub-displays 101 sweep out larger circular areas as compared with light field sub-displays 101 that are closer to or on the rotation axis 120. In some instances, the apparent intensity of light, as viewed by the observer of a displayed object, from the light field sub-displays 101 away from the rotation axis 120 may tend to be lower than the intensity of light emitted from light field sub-displays 101 that are closer to the rotation axis 120, because the amount of illumination per area decreases for light field sub-displays 101 farther from the rotation axis 120. Thus, in some implementations, to keep the apparent intensity of the image across the rotatable structure 105 relatively constant, the brightness of the illumination, the duration of the strobe, or both, can be scaled linearly with the radius for a particular light field sub-display 101 based on the distance from the rotation axis 120. In other implementations, the light field sub-displays 101 at larger radii have increased size, increased number of pixels, or both (compared to the light field sub-displays 101 closer to the rotation axis). In yet other implementations, more light field sub-displays 101 may be used at larger radii, e.g., by decreasing a spacing between adjacent light field sub-displays 101 or having the elongated elements 102 branch out into sub-elements as distance from the rotation axis increases.

The control system 110 can include a connection to a network, for example, to receive images or image display instructions that are to be displayed by the display apparatus 100. The display apparatus 100 can include audio capability. For example, the display apparatus 100 may include or be connected to a speaker system 118 to project audio in combination with the projected image. In some implementations, the display apparatus 100 can include a microphone 119 and voice recognition technology to enable the display apparatus 100 to receive and process audio commands or comments from viewers. For example, the display apparatus 100 may be configured to recognize comments from interested viewers and take action to modify the display apparatus 100 in response to the comments (e.g., by changing the color of the projected image, changing the projected image, outputting an audio response to the comments, etc.). As an example, in a retail store environment, the display may show an image of a product for sale, and in response to a question as to the price of the product, the display may output the price audibly (e.g., "The product is on sale today for two dollars.") or by a change in the displayed image (e.g., text or graphics showing the price).

The display apparatus 100 may include a proximity sensor 116 to detect whether an object is nearby and the control system 110 can take an appropriate action such as displaying an audible or visual warning or shutting off or slowing the rotation of the propeller. Such implementations may provide safety advantages if a viewer were to attempt to touch the 3-D visible object, not knowing about the rapidly rotating propeller arms.

While examples of devices for producing a light field are described herein, it will be understood that no single light field sub-display type is necessary for displaying a 3-D representation of an object in the display apparatuses. Other light field displays are envisioned, such that a plurality of light field sub-displays is disposed on the rotatable structure to produce a 3-D representation of an object. For example, any of the light field sub-displays, assemblies, or arrangements described in U.S. Patent Application No. 62/288,680, filed Jan. 29, 2016, entitled "Holographic Propeller," which is incorporated by reference herein in its entirety for all it discloses, can be implemented for displaying a 3-D representation of an object. One non-limiting advantage of some of the embodiments disclosed herein is that by attaching an array of light field sub-displays along the elongated element that is rotated, the display apparatus may utilize a reduced number of light field sub-displays to display the 3-D representation as compared to a single non-rotating display covered by pixels. Another non-limiting advantage of the present embodiments is that fewer display elements or light field sub-displays need be illuminated at any one time as compared to a single display that illuminates the entire display to generate an image. In some embodiments, the control system 110 may be configured to control the actuation of each light field sub-display 101 (e.g., the timing, intensity, and color of illumination of each light field sub-display) based on a desired image to be projected by display apparatus 100.

Example Light Field Sub-Display Comprising a Micro-Lens Array Assembly

Figure 2A:
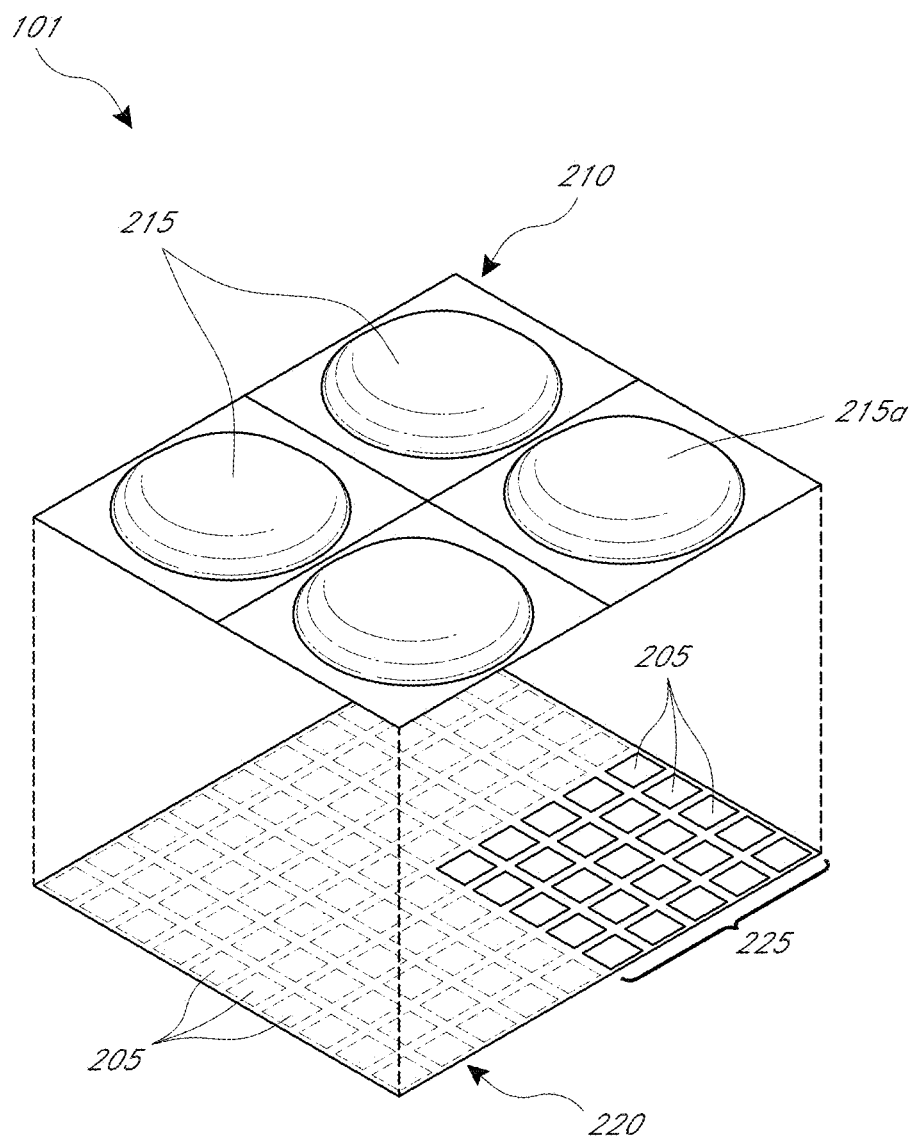
FIGS. 2A and 2B are perspective (FIG. 2A) and top (FIG. 2B) views that schematically illustrate an example of a light field sub-display for outputting light field image information.
Figure 2B:
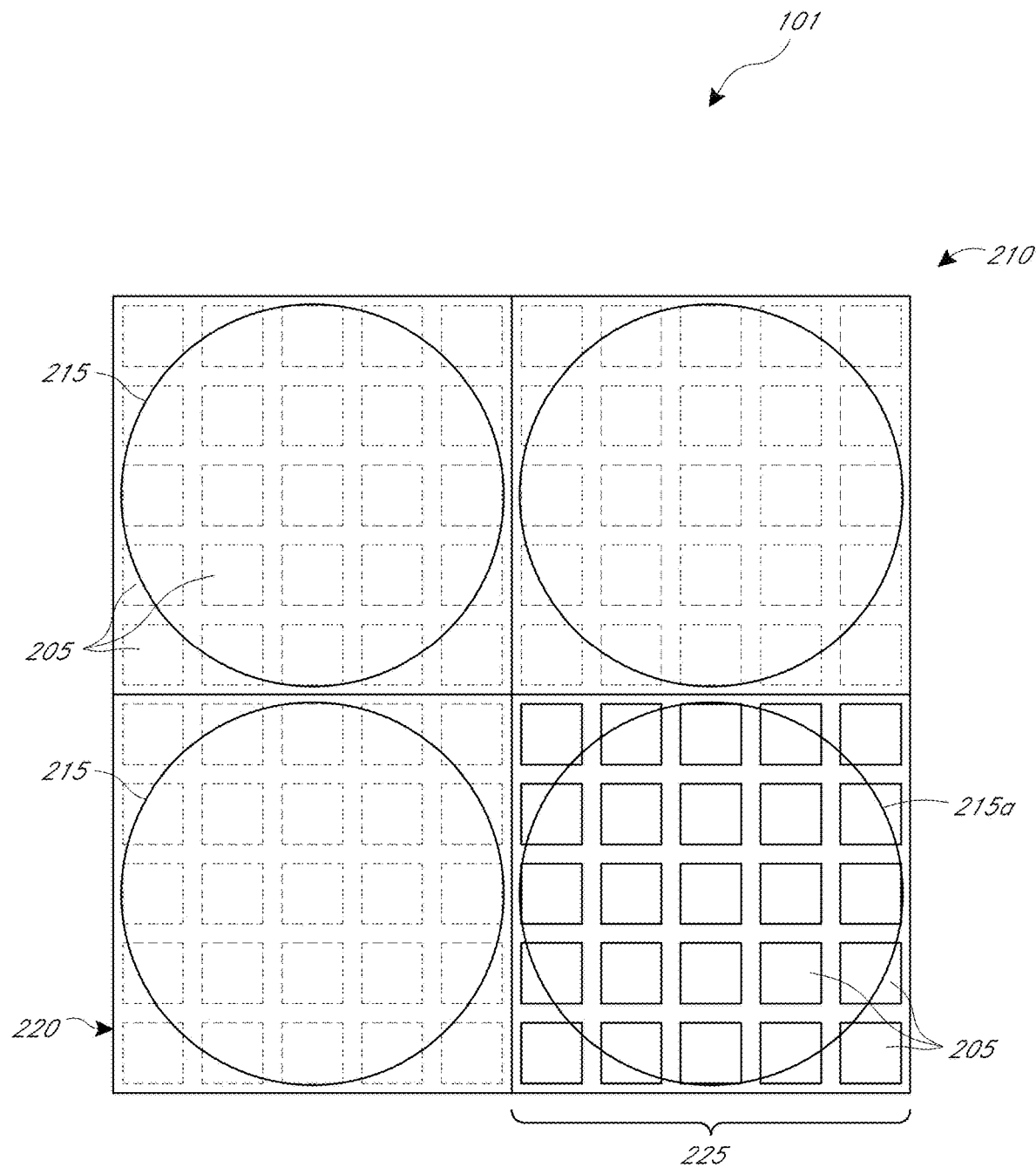

FIGS. 2A-2B illustrate an example of a light field sub-display 101 that may be disposed along the rotatable structure 105 of FIG. 1. FIG. 2A is an exploded perspective view of a portion of a light field sub-display 101 having a micro-lens array 210 spaced apart from a pixel array 220 comprising a plurality of pixels 205. The micro-lens array 210 includes a plurality of micro-lenses 215. FIG. 2B is a top view of the portion of the light field display 101 shown in FIG. 2A. The pixels 205 of the pixel array 220 can be liquid crystal (LC), light emitting diodes (LEDs), organic LEDs (OLEDs), or any other type of pixel structure configured to emit light for rendering an image. Generally the pixels 205 of the pixel array 220 emit light substantially isotropically, at least in the direction above the pixel array 220 and toward the micro-lens array 210. FIGS. 2A-2B, and the other figures illustrated herein, may not be to scale, but are for illustrative purposes only. Further, these figures schematically illustrate a portion of the light field sub-display 101, which may include more than the four micro-lenses 215 and more than 100 pixels 205.

FIGS. 2A and 2B illustrate that the light field sub-display 101 includes the micro-lens array 210 having multiple micro-lenses 215. The micro-lens array 210 shown in FIGS. 2A and 2B includes a 2×2 array of micro-lenses 215. Each micro-lens 215 is associated with a subset of pixels 205 of pixel array 220. For example, the micro-lens 215a is used to redirect light from the subset 225 of pixels 205 of pixels array 220 disposed below the micro-lens 215a into a variety of angular directions. Redirection of the light by the micro-lens 215a will be described with reference to FIGS. 3A-3C.

The resolution of a display apparatus 100 employing the light field sub-display 101 of FIG. 2A-2B may depend on, e.g., the number of micro-lenses 215 included in the micro-lens array 210 and the number of pixels in the subset 225 associated with each micro-lens. In some embodiments, each micro-lens 215 may be configured as a pixel of a light field sub-display 101. For example, the pixel array 220 illustrated in FIG. 2A includes an array of 10×10 pixels (shown with dashed lines). Each micro-lens 215 may be associated with a subset 225 of pixels 205, for example, as illustrated in FIGS. 2A and 2B, the micro-lens 215a is associated with the 5×5 subset 225 of pixels 205 (shown with solid lines). The micro-lens array 210 and the pixel array 220 are intended to be illustrative, and in other embodiments, the arrangement, numbers, shapes, etc. of the micro-lenses and pixels can be different than illustrated. For example, the pixel array 220 may include 100×100 pixels covered by an array of micro-lenses 210 such that each micro-lens 215 covers a 10×10 array of pixels on the pixel array 220.

In the example shown in FIGS. 2A-2B, the cross-sectional shapes of the micro-lenses 215 are depicted as circular, however they may comprise a rectangular or any other shape. In some embodiments, the shape or spacing of the individual micro-lenses 215 can vary across the micro-lens array 210. Also, although FIGS. 2A and 2B depict a 2×2 micro-lens array disposed over a 10×10 pixel array, it will be understood that this is for illustration purpose and any other number or dimension n×m (n, m=1, 2, 3, 4, 5, 10, 20, 30, 64, 100, 512, 768, 1024, 1280, 1920, 3840, or any other integer) for either the micro-lens array 210 or the pixel array 220 can be used.

One non-limiting advantage of utilizing a micro-lens array 210, is that the each micro-lens array 210 of a single light field sub-display 101 may be configured as a light field display capable of providing a light field to observers of the display apparatus. Light field displays are capable of controlling the direction of light emitted along with the color and intensity. In contrast, conventional displays emit light isotopically in all directions. For example, micro-lens 215a may be associated with the subset 225 of the pixels 205. The subset 225 of pixels 205 may emit light that is isotropic, but when the light passes through the micro-lens 215a, the light is directed toward an observer mimicking or simulating a ray of light that originates from a point in space at a focal plane at which the observer is focusing.

Figure 3A:
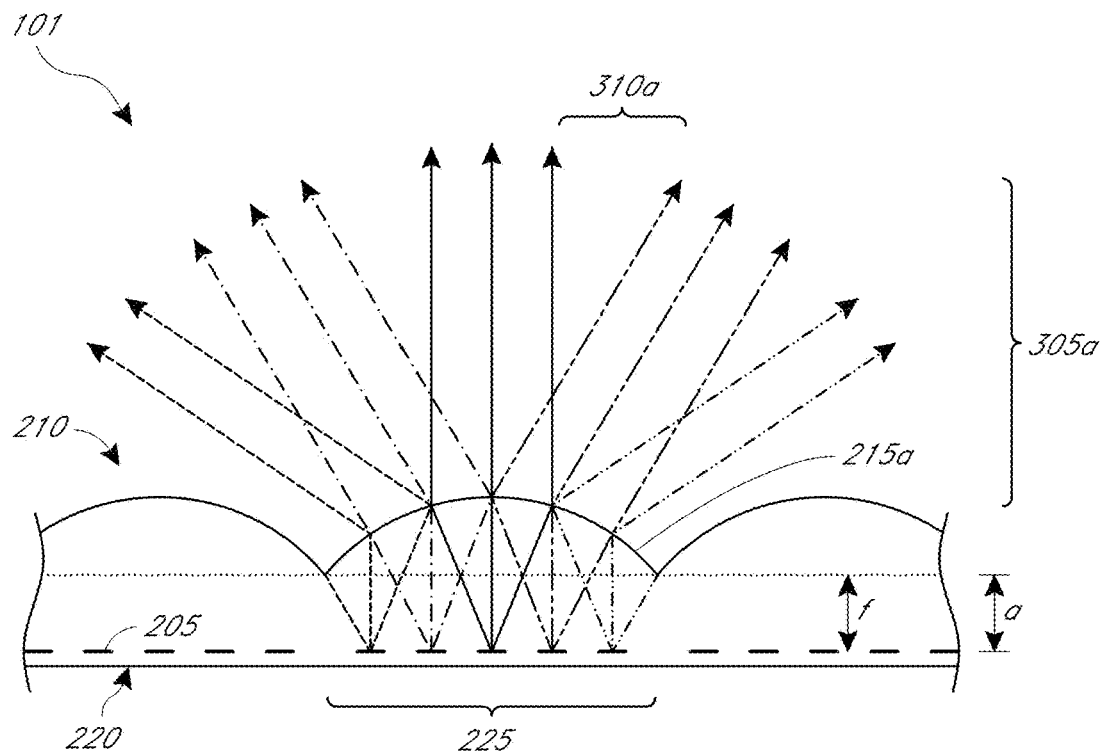
FIGS. 3A-3C are cross-section side views schematically depicting a portion of embodiments of light field sub-displays of FIGS. 2A and 2B.
Figure 3B:
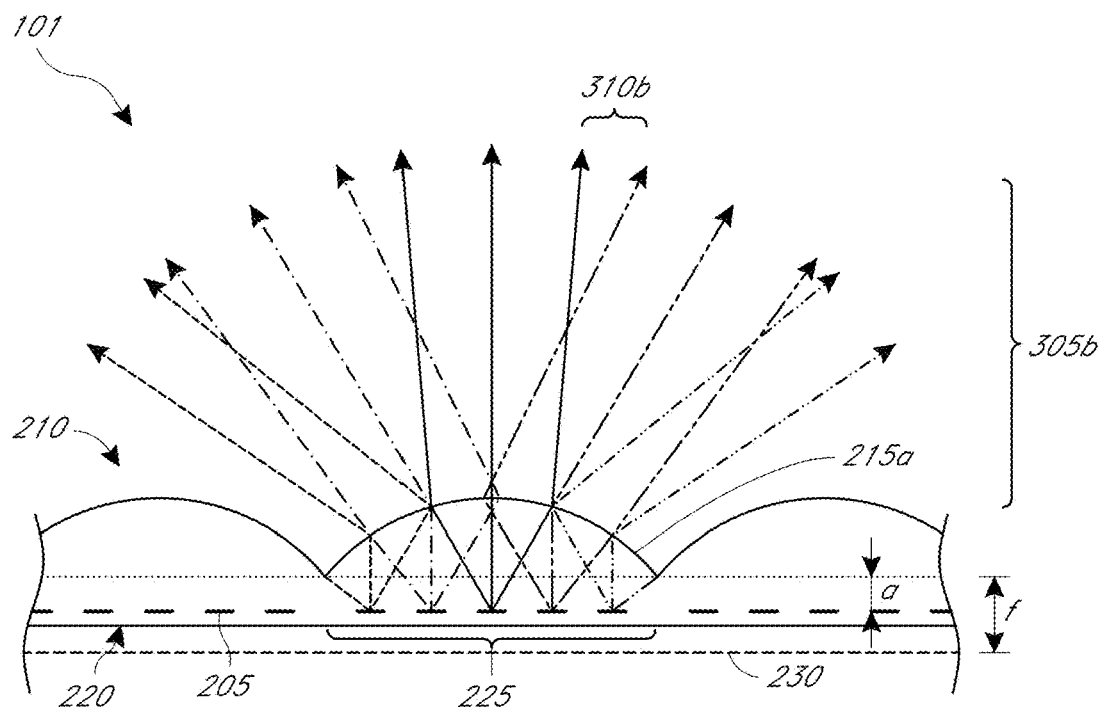
Figure 3C:
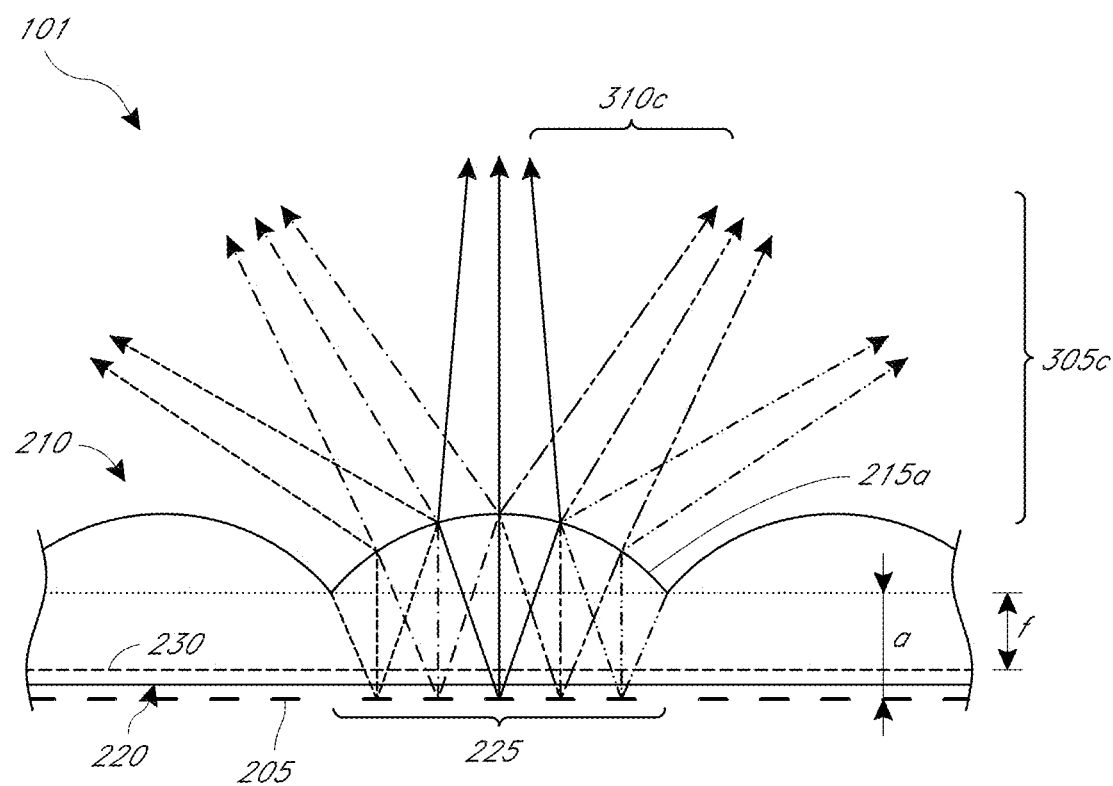

FIGS. 3A-3C are partial side views of the light field sub-display 101 including an illustrative representation of ray traces for multiple arrangements of the pixel array 220 and micro-lens array 210. FIG. 3A illustrates a partial cross-sectional side view of light field sub-display 101 including rays of light emitted from the subset 225 of pixels 205 of pixel array 220. The pixels 205 of the pixel array 220 are positioned at a distance of a from the micro-lens array 210. In some embodiments, the hardware processor is configured to drive each pixel 205 of the pixel array 220 to emit light based on the image data stored in the digital memory 114. Light emitted from each of the individual pixels 205 interacts with the micro-lens array 210 such that the spatial extent of the light emitted from the subset 225 of pixels 205 under the associated micro-lens 215a generates an array of light beams 305a that propagate at different outgoing angles. In the embodiment illustrated in FIG. 3A, the distance a between the micro-lens array 210 and the individual pixels 205 is approximately equal to the focal length (f) of the micro-lens 215 in the micro-lens array 210. When the distance a is equal to the focal length (f), the light emitted from individual pixels 205 of the pixel array 220 interacts with the micro-lens array 210 such that the spatial extent of the light emitted from the subset 225 of pixels 205 generate an array of substantially collimated beams of light 305a at different outgoing angles. The different line types for the light rays (e.g., solid line, dotted lines, etc.) do not refer to the color or intensity of light, but are merely illustrative to depict the geometry of the rays of light emitted by different pixels.

In some embodiments, the number of pixels in the subset 225 of pixels 205 disposed under each individual micro-lens 215 can be selected based on the number of beams of light 305a designed to be emitted from each micro-lens in the micro-lens array 210. For example, an n×m subset 225 of pixels 205 underneath a micro-lens 215a can produce an n×m array of light beams perceivable by observers, thus representing n×m different viewing directions of the object represented by the display apparatus 100. In various implementations n and m (which may be different from each other, and different in each subset 225 of pixels 205) can be integers such as, e.g., 1, 2, 3, 4, 5, 10, 16, 32, 64, 100, 256, or more. For example, the micro-lens 215a of FIG. 2A having a 5×5 subset 225 of pixels 205, may emit a light at 25 different directions. Each direction may be associated with a viewing direction of the image to be displayed by the display apparatus 100.

In the embodiment illustrated in FIG. 3A, the individual pixels 205 are positioned at the focal length (f) of the micro-lens array 210, such that light emitted from individual pixels 205 will be fully or partially collimated by the micro-lenses 215 and redirected to an outgoing angle such that the subset 225 of pixels 205 underneath the micro-lens 215 effectively creates a multiplicity of beams of light 305a, each corresponding to a particular angle of the overall light field generated by the display. In some implementations, if relatively few pixels are in the subset 225 of pixels 205, there may be gaps 310a between the individual collimated beams of light 305a. The gaps 310a may be perceivable by an observer viewing the image at an angle associated with the gap 310a and may distract from the appearance of the image if the angular extent of the gap 310a is too large. The gap 310a may be observed as a fading of intensity of the light 305a directed to the observer at that angle. If the gaps 310a are too large in angular extent, the observer may perceive the brightness of the displayed image as modulating when the observer moves her head or eyes or slightly changes her position relative to the display, which may be distracting. In one embodiment, the gap 310a may be reduced by increasing the number of pixels in the subset 225 of pixels 205 so that the angular extent of the gaps 310a is sufficiently small. Ray tracing software can be used to model the distribution of light from the light field sub-display 101 and to determine the number, spacing, spatial distribution, etc. of the pixels and micro-lenses, based on factors such as a typical distance that observers view the display, an amount of modulation that is acceptable, etc.

In another embodiment, alternatively or in combination with the embodiments described herein, the pixels in the subset 225 of pixels 205 can be placed at a distance a from the micro-lens array 210 that is slightly larger or smaller than the focal plane 230 of micro-lenses 215 (see, e.g., FIGS. 3B and 3C) of the microlenses. This may result in some divergence of the individual beams so that there are fewer, reduced, or no gaps in the light field at the far-field from the light field sub-display 101. For example, FIG. 3B illustrates a scenario where the distance a is smaller than the focal length f, thus the beams of light 305b diverge outward, thereby reducing the angular extent of the gaps 310b. FIG. 3C illustrates a scenario where the distance a is greater than the focal length f, so that the beams may diverge toward a central beam, which in some embodiments may result in larger gaps 310c.

Light Field Sub-Display Comprising Waveguide Stack Assembly

While FIGS. 2A-3C show examples light field sub-displays 101 comprising a micro-lens array 210 for use in a display apparatus 100, this is for illustration and not limitation. It will be understood that the various advantages of the embodiments disclosed herein may be achieved by any variation and type of display capable of producing a light field used as one or more of the light field sub-displays 101. For example, any of the light field displays, stacked waveguide assemblies, or other optical emitters described in U.S. patent application Ser. No. 14/555,585, filed Nov. 27, 2014, entitled "Virtual and Augmented Reality Systems and Methods," published as U.S. Patent Publication No. 2015/0205126, which is hereby incorporated by reference herein in its entirety for all it discloses, can be implemented as one or more of the light field sub-displays 101 of the display 100 of FIG. 1. Furthermore, the stacked waveguide assemblies may be implemented in the alternative or in combination with the light field sub-displays comprising the micro-lens array of FIGS. 2A and 2B.

Figure 4A:
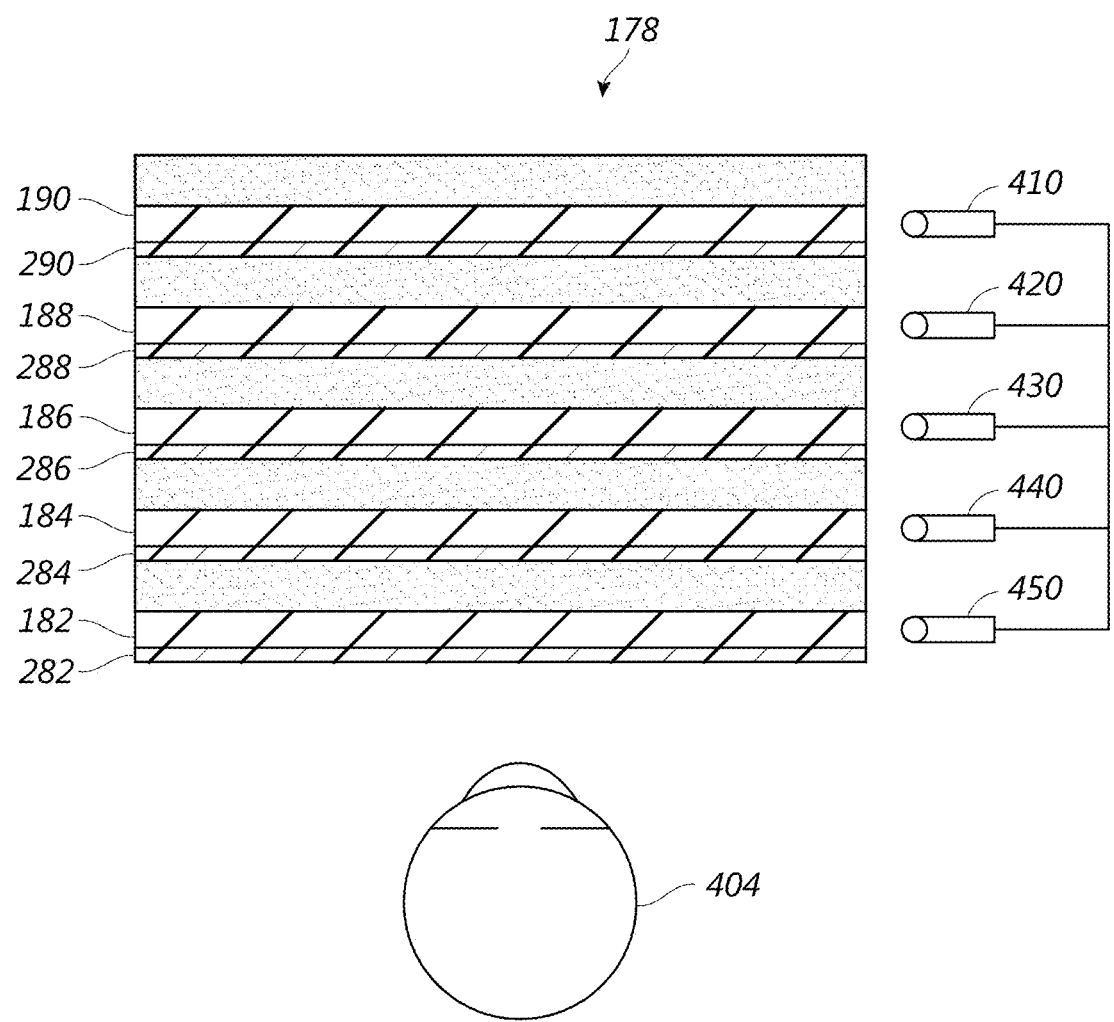
FIGS. 4A and 4B schematically illustrate an example of a waveguide stack for outputting light field image information to a user.
Figure 4B:
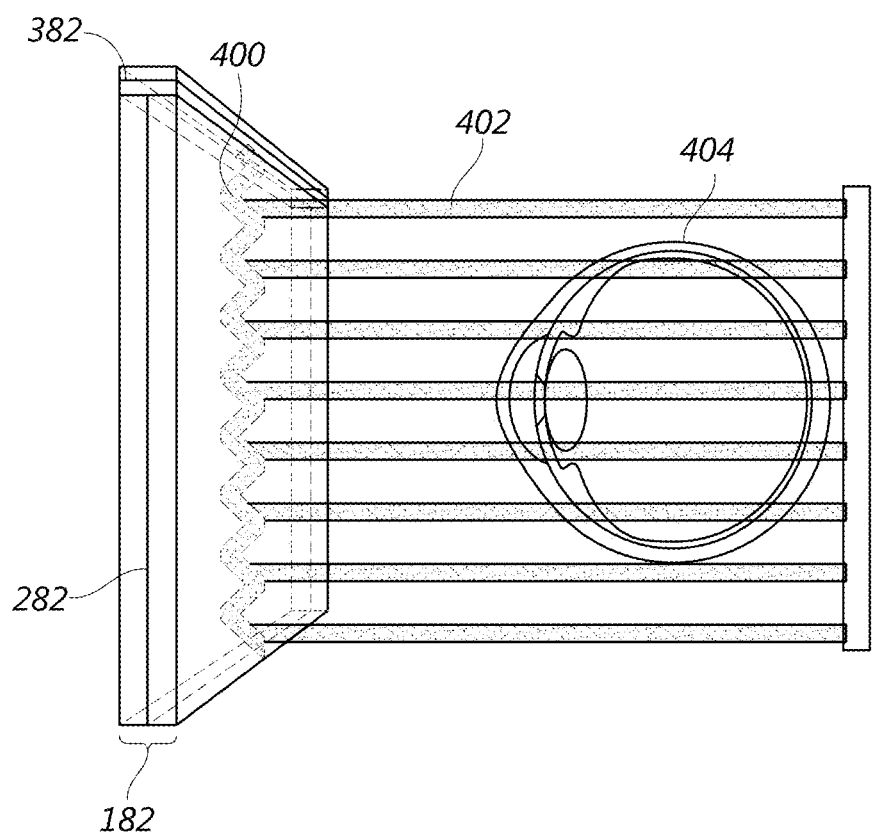

FIGS. 4A and 4B illustrate one such embodiment of a stacked waveguide assembly 178 that may be implemented as a light field sub-display 101. For example, FIGS. 4A and 4B illustrate aspects of an approach for simulating three-dimensional imagery using multiple depth planes. The optics illustrated in FIGS. 4A and 4B correspond to a stacked waveguide assembly of transmissive beamsplitter substrates, each of which is configured to project light at a different focal plane.

With reference to FIG. 4A, objects at various distances from eye 404 (which may be a single eye or two eyes) are accommodated by the eye 404 so that those objects are in focus. Consequently, a particular accommodated state may be said to be associated with a particular depth planes, with has an associated focal distance, such that objects or parts of objects in a particular depth plane are in focus when the eye is in the accommodated state for that depth plane. In some embodiments, three-dimensional imagery may be simulated by providing different presentations (e.g., different rendered frames) of an image for each eye 404, and also by providing different presentations of the image corresponding to each of the depth planes or different viewing angles. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

FIG. 4A illustrates an example of a stacked waveguide assembly 178 for outputting image information to a user. The stacked waveguide assembly, or stack of waveguides, 178 that may be utilized to provide three-dimensional perception to the eye/brain using a plurality of waveguides 182, 184, 186, 188, 190. In some embodiments, the waveguide assembly 178 may correspond to a light field sub-display 101 of FIG. 1.

With continued reference to FIG. 4A, the stacked waveguide assembly 178 may also include a plurality of features 198, 196, 194, 192 between the waveguides. In some embodiments, the features 198, 196, 194, 192 may comprise lenses. The waveguides 182, 184, 186, 188, 190 or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 410, 420, 430, 440, 450 may be utilized to inject rendered frame image information (as describe d above) into the waveguides 182, 184, 186, 188, 190, each of which may be configured to distribute incoming light across each respective waveguide, for output toward the eye 404. In some embodiments, a single beam of light (e.g., a collimated beam) may be injected into each waveguide to output an entire field of cloned collimated beams that are directed toward the eye 404 at particular angles (and amounts of divergence) corresponding to the depth plane of the rendered frame and associated with a particular waveguide.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 404. An extracted beam of light is outputted by the waveguide at locations at which the light propagating in the waveguide strikes a light redirecting element. The light extracting optical elements 282, 284, 286, 288, 290 may, for example, be reflective or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top or bottom major surfaces, or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface or in the interior of that piece of material.

With continued reference to FIG. 4A, as discussed herein, each waveguide 182, 184, 186, 188, 190 is configured to output light to form a rendered frame or presentation based on a particular depth plane or viewing direction. For example, the waveguide 182 nearest the eye may be configured to deliver collimated light, as injected into such waveguide 182, to the eye 404. The collimated light may be representative of the optical infinity focal plane. The next waveguide up 184 may be configured to send out collimated light which passes through the first lens 192 (e.g., a negative lens) before it can reach the eye 404. First lens 192 may be configured to create a slight convex wavefront curvature so that the eye/brain interprets light coming from that next waveguide up 184 as coming from a first focal plane or viewed direction closer inward toward the eye 404 from optical infinity. Similarly, the third up waveguide 186 passes its output light through both the first lens 192 and second lens 194 before reaching the eye 404. The combined optical power of the first and second lenses 192 and 194 may be configured to create another incremental amount of wavefront curvature so that the eye/brain interprets light coming from the third waveguide 186 as coming from a second focal plane or viewing direction that is even closer inward toward the person from optical infinity than was light from the next waveguide up 184. Accordingly, one or more waveguides of the waveguide stack may be configured, individually or in combination with the other waveguides, as one or more pixels of the light field sub-display.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4A, the light extracting optical elements 282, 284, 286, 288, 290 may be configured to both redirect light out of their respective waveguides and to output this light with the appropriate amount of divergence or collimation for a particular depth plane (or viewing direction) associated with the waveguide. As a result, waveguides having different associated depth planes (or viewing direction) may have different configurations of light extracting optical elements, which output light with a different amount of divergence depending on the associated depth plane (or viewing direction). In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, or diffraction gratings. In other embodiments, they may simply be spacers (e.g., cladding layers or structures for forming air gaps).

FIG. 4B shows an example of exit beams outputted by a waveguide. One waveguide is illustrated, but other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the light extracting optical element 282, a portion of the light exits the waveguide as exit beams 402. The exit beams 402 are illustrated as substantially parallel but they may also be redirected to propagate to the eye 404 at an angle (e.g., forming divergent exit beams), depending on the depth plane or viewing angle associated with the waveguide 182. Substantially parallel exit beams may be indicative of a waveguide with light extracting optical elements that extract light to form images that appear to be set on a depth plane at a large distance (e.g., optical infinity) from the eye 404. Other waveguides or other sets of light extracting optical elements may output an exit beam pattern that is more divergent, which would require the eye 404 to accommodate to a closer distance to bring it into focus on the retina and would be interpreted by the brain as light from a distance closer to the eye 404 than optical infinity.

Figure 4C:
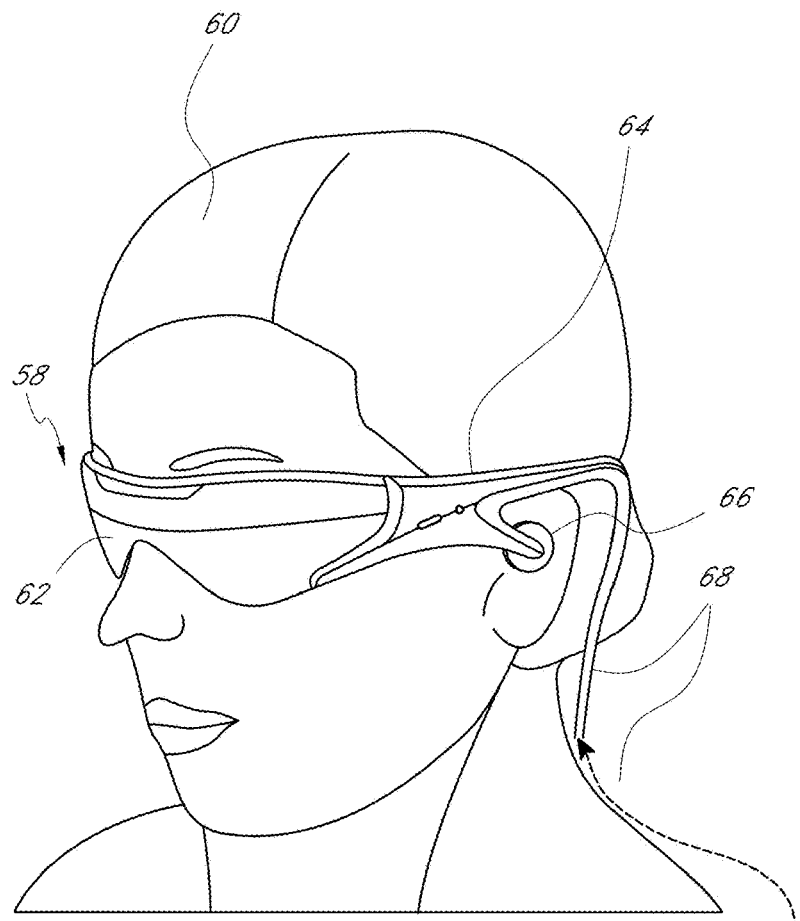
FIG. 4C schematically illustrates an example augmented reality display device and belt-pack, which may include a battery and an illuminated fan assembly.
Figure 4C:
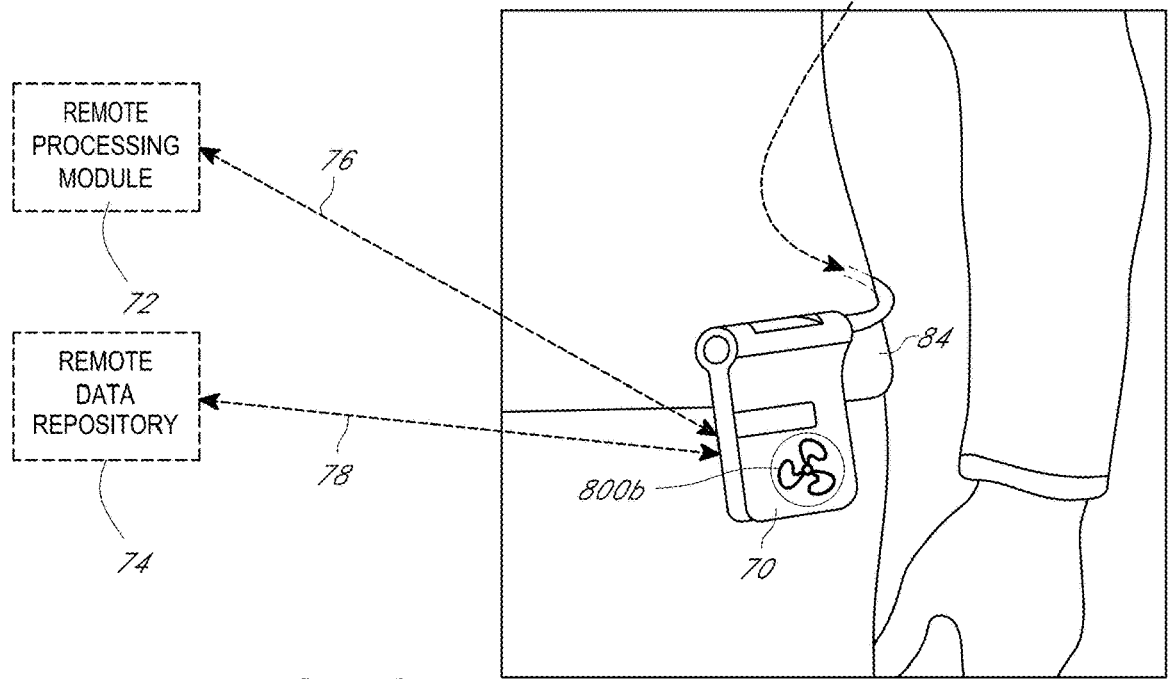

FIG. 4C schematically illustrates an example augmented reality (AR) display device and belt-pack, which may include a battery, a processor, or an illuminated fan assembly. A user 60 of the AR device is depicted wearing a head mounted component 58 featuring a frame 64 structure coupled to a display system 62 positioned in front of the eyes of the user. A speaker 66 is coupled to the frame 64 in the depicted configuration and positioned adjacent the ear canal of the user (in one embodiment, another speaker, not shown, is positioned adjacent the other ear canal of the user to provide for stereo/shapeable sound control). The display system 52 can comprise any type of augmented or virtual reality display. For example, the display system 52 can comprise a light-field display (e.g., having a stacked waveguide assembly 178) that is generally similar to that described with reference to FIGS. 4A and 4B. The display 62 is operatively coupled 68, such as by a wired lead or wireless connectivity, to a local processing and data module 70 which may be mounted in a variety of configurations, such as fixedly attached to the frame 64, fixedly attached to a helmet or hat, embedded in headphones, removably attached to the torso or an appendage (e.g., an arm) of the user, or a hip 84 of the user 60 as shown in FIG. 4C in a belt-coupling style configuration (e.g., or in a backpack-style configuration).

The local processing and data module 70 may comprise a power-efficient processor or controller, as well as digital memory, such as flash memory, both of which may be utilized to assist in the processing, caching, and storage of data a) captured from sensors which may be operatively coupled to the frame 64, such as image capture devices (such as cameras), microphones, inertial measurement units, accelerometers, compasses, GPS units, radio devices, or gyros; or b) acquired or processed using the remote processing module 72 or remote data repository 74, possibly for passage to the display 62 after such processing or retrieval. The local processing and data module 70 may be operatively coupled 76, 78, such as via a wired or wireless communication links, to a remote processing module 72 and remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

As shown in the example of FIG. 4C, the local processing and data module 70 can include a fan assembly 800b designed to cool the electronics in the module 70. Examples of the fan assembly 800b are described below with reference to FIGS. 8B and 8C. Also, as further described below with reference to FIGS. 8A-18, the fan assembly 800b can be illuminated (e.g., via external light sources or via light sources disposed on fan blades) and configured to display an image, color(s), alerts, messages, operational states of the AR display device, etc. The local processing and data module 70 or the remote processing module 72 and remote data repository 74 can be programmed to perform the processing used to display an image by the fan assembly 800b, for example, to perform the methods described with reference to FIGS. 14-16 and 18.

Alternative Embodiments for Displaying a 3-D Representation of an Object

While FIG. 1 shows an example of the display apparatus 100 comprising a rotatable structure 105 having four elongated elements 102 with light field sub-displays 101 disposed thereon, the display apparatus 100 can be configured differently in other embodiments. For example, a rotatable structure may comprise any number of elongated elements having any shape or size. Furthermore, the rotatable structure may comprise a single structure having one or more arrays of light field sub-displays. FIGS. 5A-5G illustrate some of the embodiments of a display apparatus 100 in accordance with the disclosure herein, however, other configurations are possible.

FIGS. 5A and 5B illustrate the display apparatus 100 with different rotatable structures 105 configured as a propeller in which the number and arrangement of the elongated elements 102 are different than illustrated in FIG. 1 (the motor 104 and the control system 110 are not shown). For example, FIG. 5A illustrates a rotatable structure 105a that comprises three elongated elements 102a. Similar to elongated elements 102 of FIG. 1, each elongated element 102a includes a plurality of light field sub-displays 101. While FIG. 5A illustrates an arrangement of three equally spaced elongated elements 102a, the elongated elements 102a need not be equally spaced, but may have any spacing therebetween. FIG. 5B illustrates another example of a rotatable structure 105b that comprises six elongated elements 102b. The elongated elements need not be equal in length or width. Furthermore, as illustrated in FIGS. 5A and 5B, the number of light field sub-displays 101 on each elongated element (102a, 102b) is the same, this need not be the case for all designs of rotatable structures. The number of light field sub-displays 101 may be varied as required by the particular application of the display apparatus 100.

In some embodiments, the elongated elements need not be straight, but may have any non-straight shape (e.g., curved, arcuate, segmented, etc.). For example, FIG. 5C illustrates another rotatable structure 105c with elongated elements 102c having an arced shape, where the arc is along the same plane that the light field sub-displays 101 are disposed thereon. For example, the elongated elements 102c are curved along a plane that is perpendicular to the rotation axis 120 of the rotatable structure 105c.

In some embodiments, the elongated elements need not have a square or rectangular cross section. For example, each elongated element may have a circular or ovular cross section. In other embodiments, the elongated elements may have a cross section of any polygon shape (e.g., cross section shape of a triangle, pentagon, hexagon, etc.). While the embodiments illustrated in FIGS. 1 and 5A-5G depict the plurality of light field sub-displays 101 being disposed along a single planar surface perpendicular to the rotation axis 120, this need not be the case. For example, with reference to FIG. 5A, light field sub-displays 101a (shown with dashed lines) optionally can be disposed on other surfaces of the elongated element.

Similarly, each elongated element may be rotated about a second rotation axis different than the rotation axis 120 of the rotatable structure. For example, referring to FIG. 5A, each elongated element 102a may have an axis 530 extending along the elongated element. The display apparatus 100 may then be configured to individually or in combination rotate one or more of the elongated elements 105a about their own axis 530.

Figure 5D:
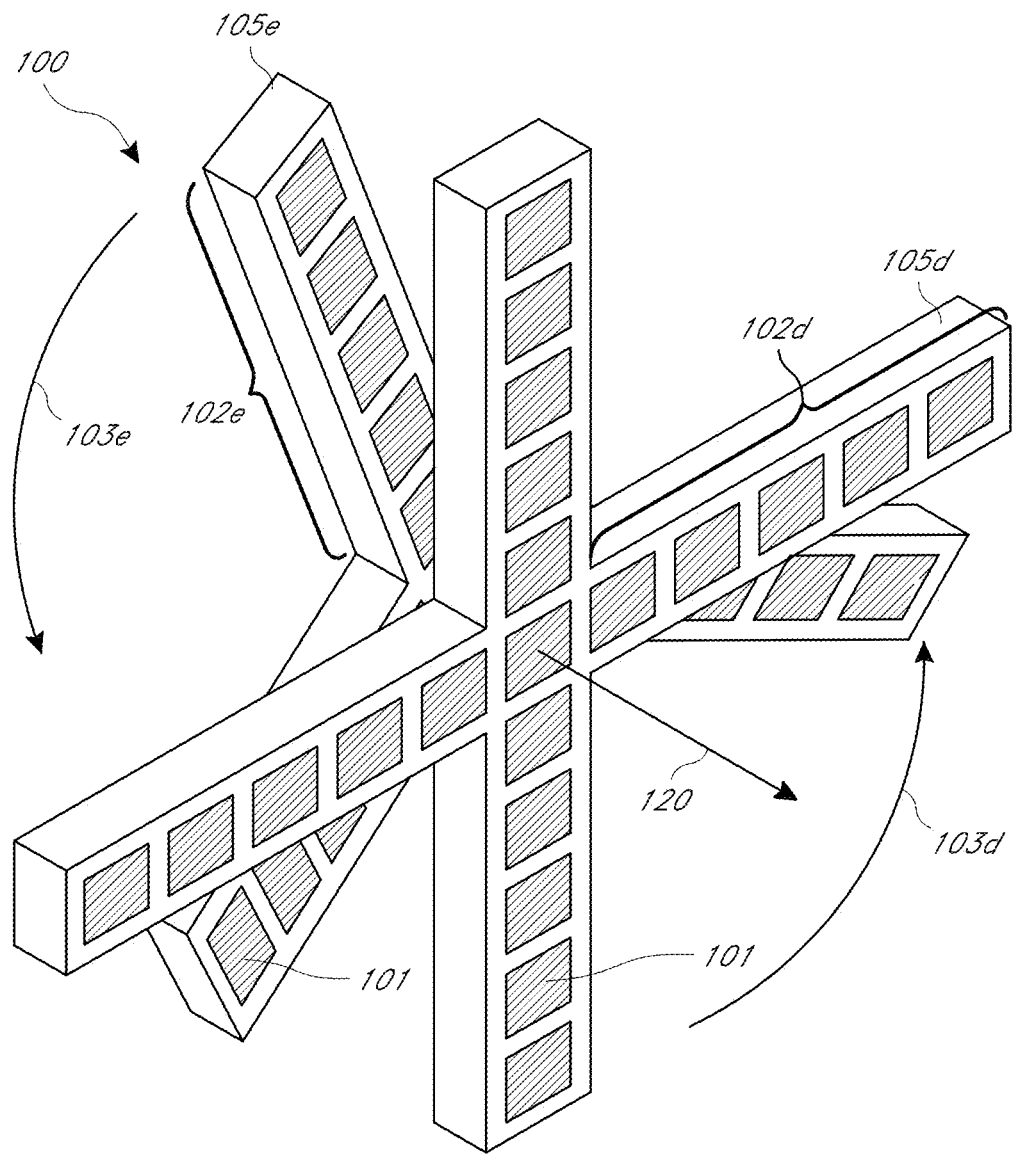

In some embodiments, the display apparatus 100 may comprise multiple rotatable structures. For example, FIG. 5D illustrates multiple rotatable structures 105d and 105e that may be rotated independent of each other about the rotation axis 120. FIG. 5D illustrates two rotatable structures (105d, 105e) but 3, 4, 5, or more rotatable structures can be utilized. As shown in FIG. 5D, the number of elongated elements 102d and 102e need not be the same on each rotatable structure, however, they may be the same in number, shape, and arrangement on the two rotatable structures. In some embodiments, the rotation rate or rotation direction of the rotatable structure 105d is the same as the rotation rate or rotation direction of the rotatable structure 105e. In another embodiment, the rotation rates or rotation directions are different for the different rotatable structures, e.g., the rotatable structures rotate in opposite directions. Furthermore, the number of light field sub-displays 101 disposed on each rotatable structure need not be the same or in the same arrangement.

Figure 5E:
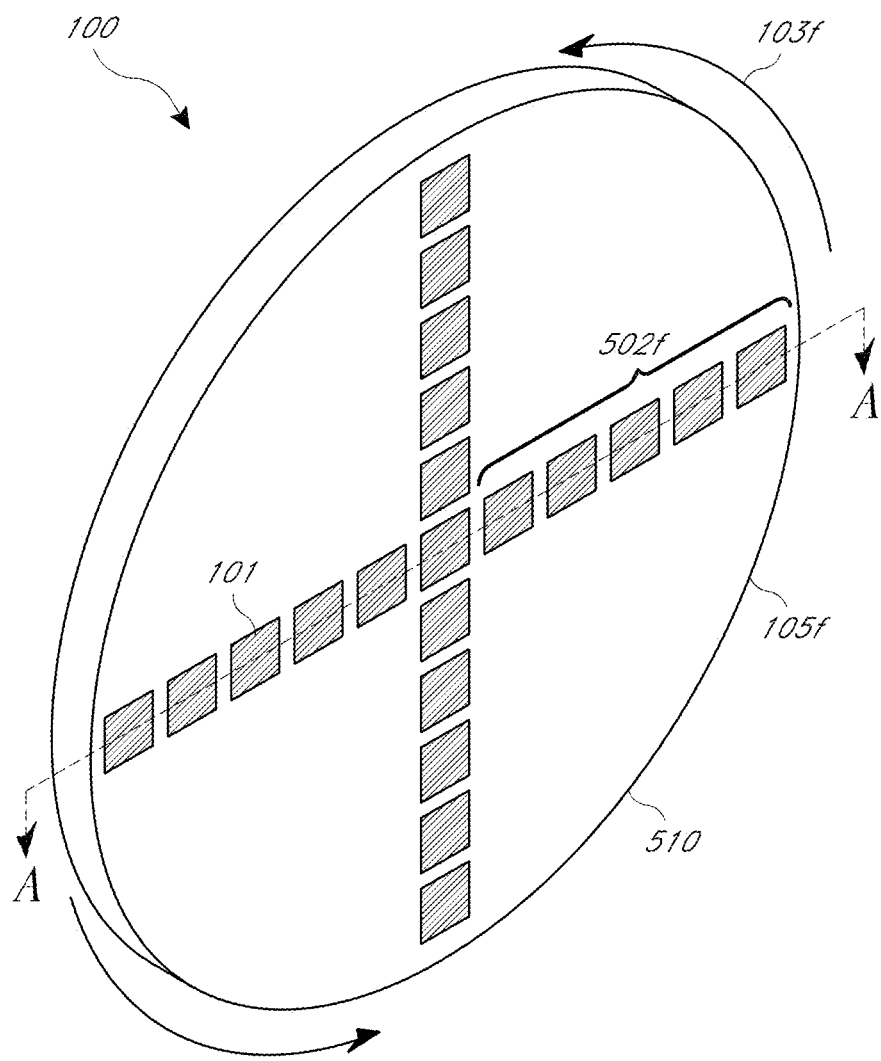
Figure 5F:
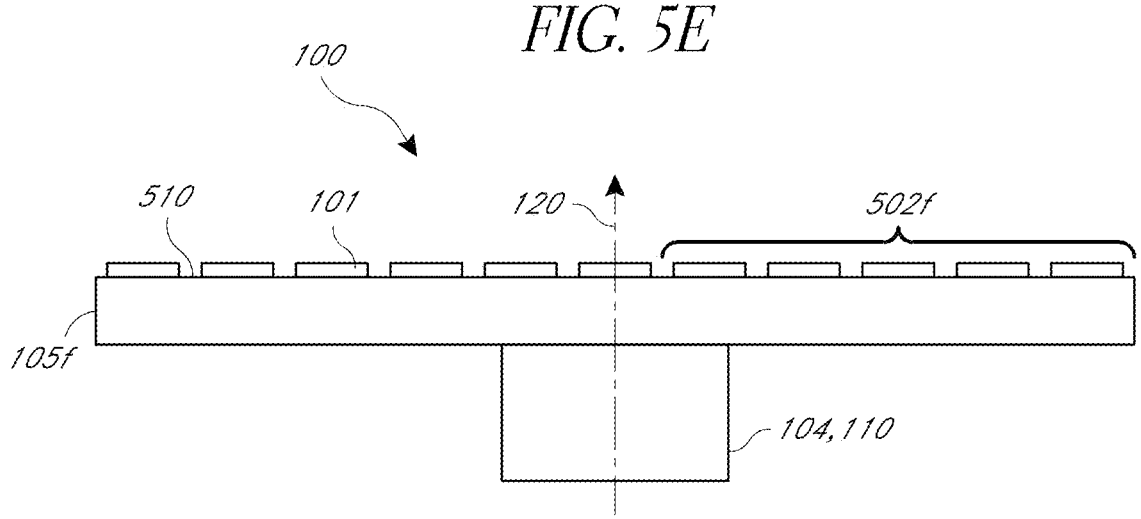

In some embodiments, additionally or alternatively to the use of a number of elongated elements, the rotatable structure 105 of the display apparatus 100 may comprise a transparent element that can be rotated by the motor 104. The transparent element can be a plexiglass disk or thin, 2-D polymer, thermoplastic, or acrylic element. For example, FIGS. 5E and 5F illustrate an example of such an arrangement. FIG. 5E is a perspective view of an example rotatable structure 105f comprising the transparent element 510. FIG. 5F is a cross sectional view of the display apparatus 100 taken along the line A-A shown in FIG. 5E. The light field sub-displays 101 can be attached to the transparent element 510 in any suitable arrangement and illuminated by the control system 110, as described above. As illustrated in FIGS. 5E and 5F, the light field sub-displays 101 may be disposed on a surface of the transparent element 510 along an elongated direction 502f so that the arrangement of the light field sub-displays 101 is analogous to the arrangement along the elongated elements 102 shown in FIGS. 1 and 5A-5C. While FIG. 5F illustrates the light field sub-displays 101 on an upper surface of the transparent element 510, the light field sub-displays 101 may be attached to a lower surface of the transparent element 510 or disposed within the transparent element 510. For example, the light field sub-displays 101 can be attached to a surface of a first transparent disk, and then a second transparent disk disposed over the first disk. Such embodiments advantageously can protect the sub-displays from being touched by observers or from environmental damage.

The material of the transparent element 510 may be selected to have no or minimal effect on the optical properties of the light transmission from each light field sub-display 101 (e.g., the material is substantially transparent in the visible). In other embodiments, the transparent element 510 may include color filtering, polarization modification, or other optical properties to be imparted onto light emitted from the light field sub-displays 101. One non-limiting advantage of the display apparatus of FIGS. 5E and 5F is that the light field sub-displays 101 are attached to or contained in a rotating disk which may minimize a risk of an external item (e.g., a hand from a person viewing the image) from being inserted between each arm of the propeller embodiments shown in FIGS. 1 and 5A-5C, thereby reducing potential for damaging the display apparatus 100 or harming the external item.

Figure 5G:
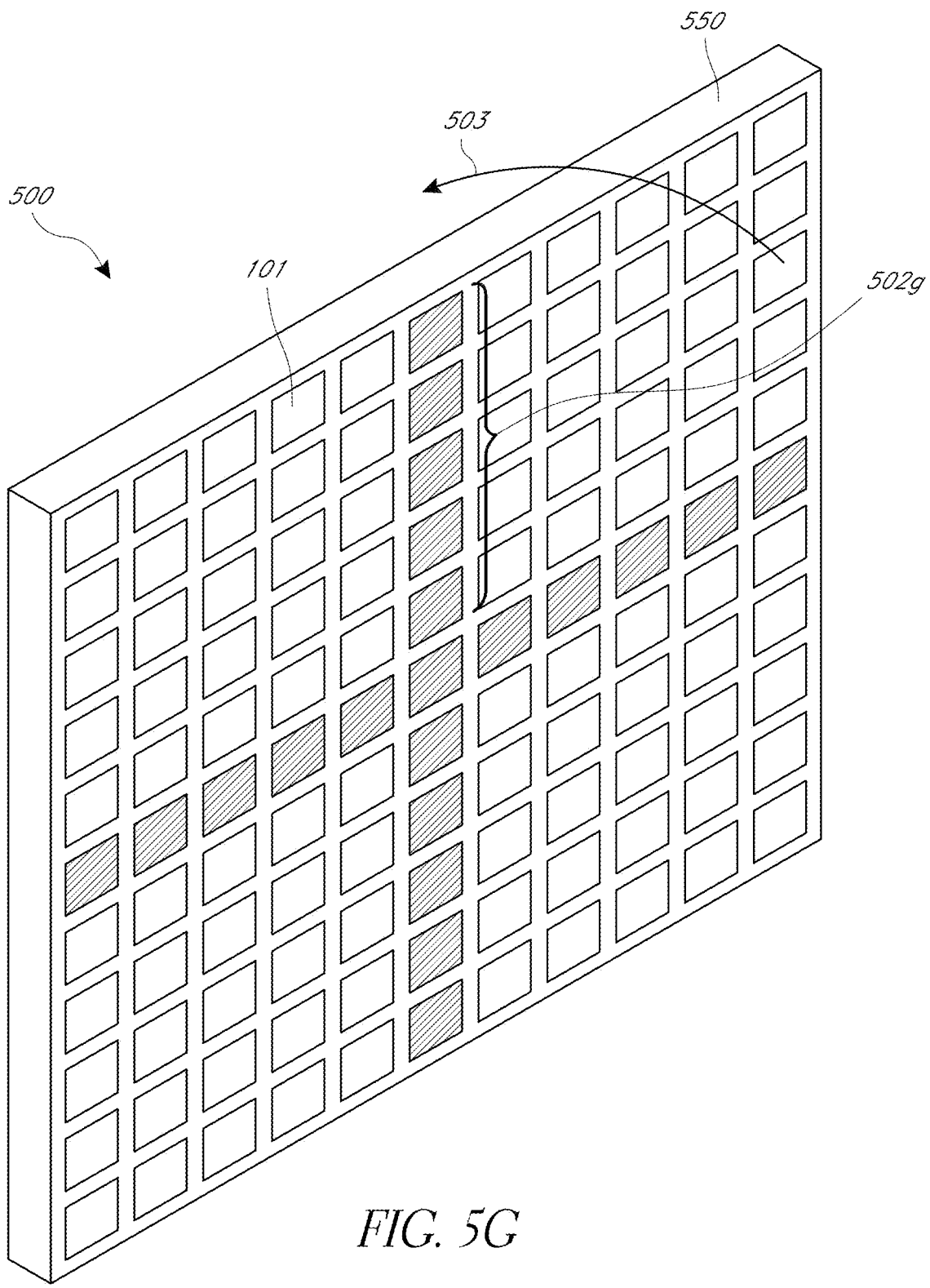

FIG. 5G illustrates an embodiment of display apparatus that is stationary. The display apparatus 500 comprises an array of light field sub-displays 101 disposed on a transparent substrate 550. FIG. 5G schematically illustrates an 11×11 array of light field sub-displays 101, however, any size n×m of a light field sub-display array may be implemented. A subset of the array of light field sub-displays 101 may form an elongated feature 502g by being illuminated by the control system 110 to generate any number or arrangement of elongated elements 502g. The subset array of light field sub-displays 101 that are illuminated may be changed at a rotation rate, such that the elongated feature 502g is electrically rotated about the display apparatus 500. In effect, by sequentially illuminating elongated features 502g of the light field sub-displays 101, the control system 110 can electronically mimic physical rotation of the arms of the propeller.

For each instance in time as the elongated feature 502g rotates, the subset array of light field sub-displays 101 that make up the elongated feature 502g changes. Accordingly, the elongated feature 502g appears to be rotating about a path 503 as result of strobing or turning the light field sub-displays 101 on and off. As the elongated feature 502g is "rotated," the light field sub-displays 101 of the subset array of light field sub-displays 101 are controlled by the controller 110 to display a 3-D representation of an image.

One non-limiting advantage of the embodiment illustrated in FIG. 5G is that there are no mechanically rotating parts of the display apparatus 500, the rotation is imparted onto the light field sub-displays 101 through processing by the controller. As such, there is no rotatable structure that may cause damage or injury to surrounding areas. In the embodiment shown in FIG. 5G, no motor is used since the display apparatus 500 is stationary. However, in other embodiments, a motor can be used to rotate the substrate 550, so that the combination of physical rotation of the substrate 500 and electronic "rotation" of the light field sub-displays 101 that are illuminated provides the light field image.

Example Non-Planar Light Field Display Apparatus

Figure 6A:
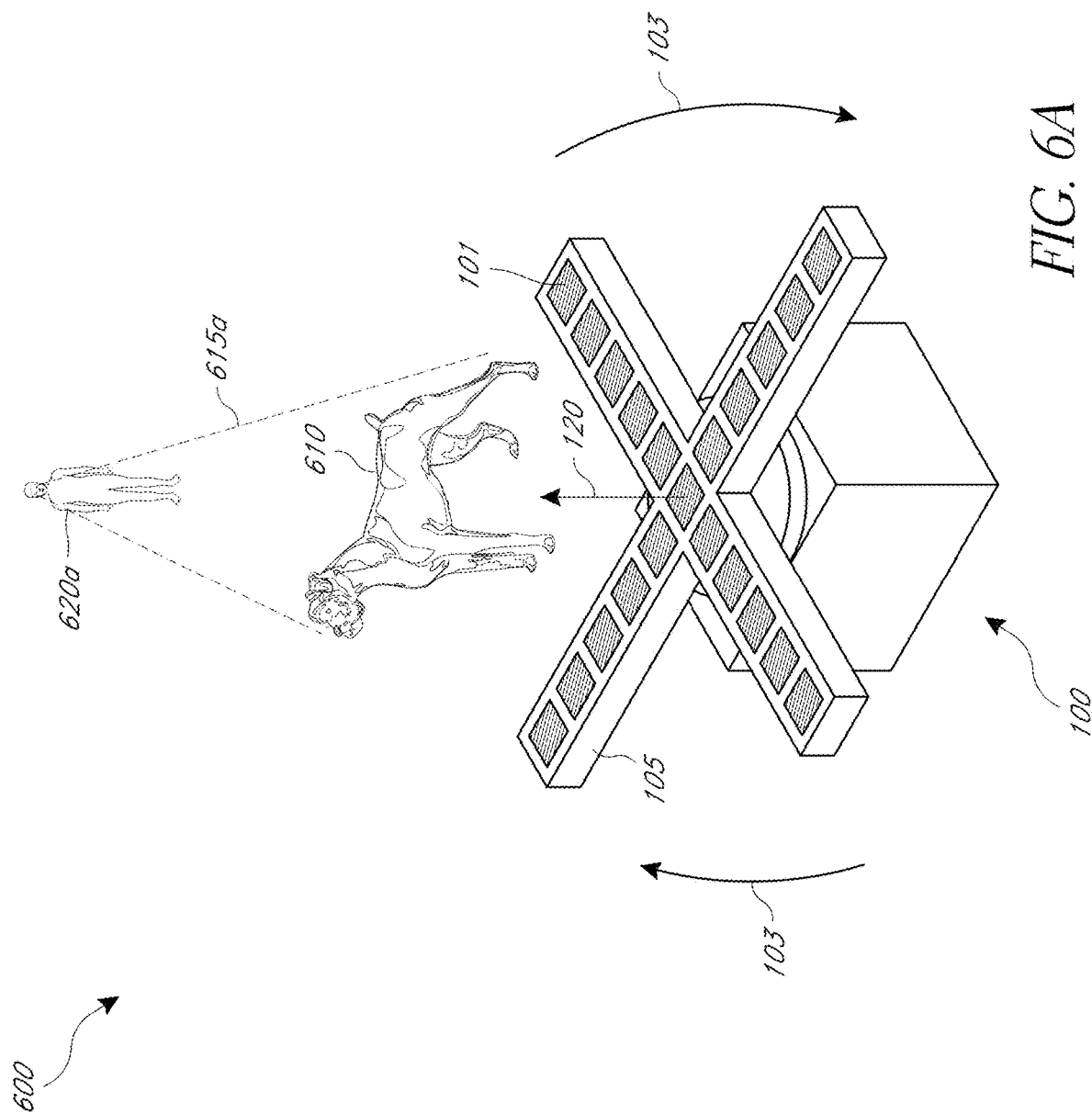
FIGS. 6A and 6B are perspective views that schematically illustrate an example display apparatus that is displaying a 3-D representation of an image (a dog, in this example) viewed by multiple observers.
Figure 6B:
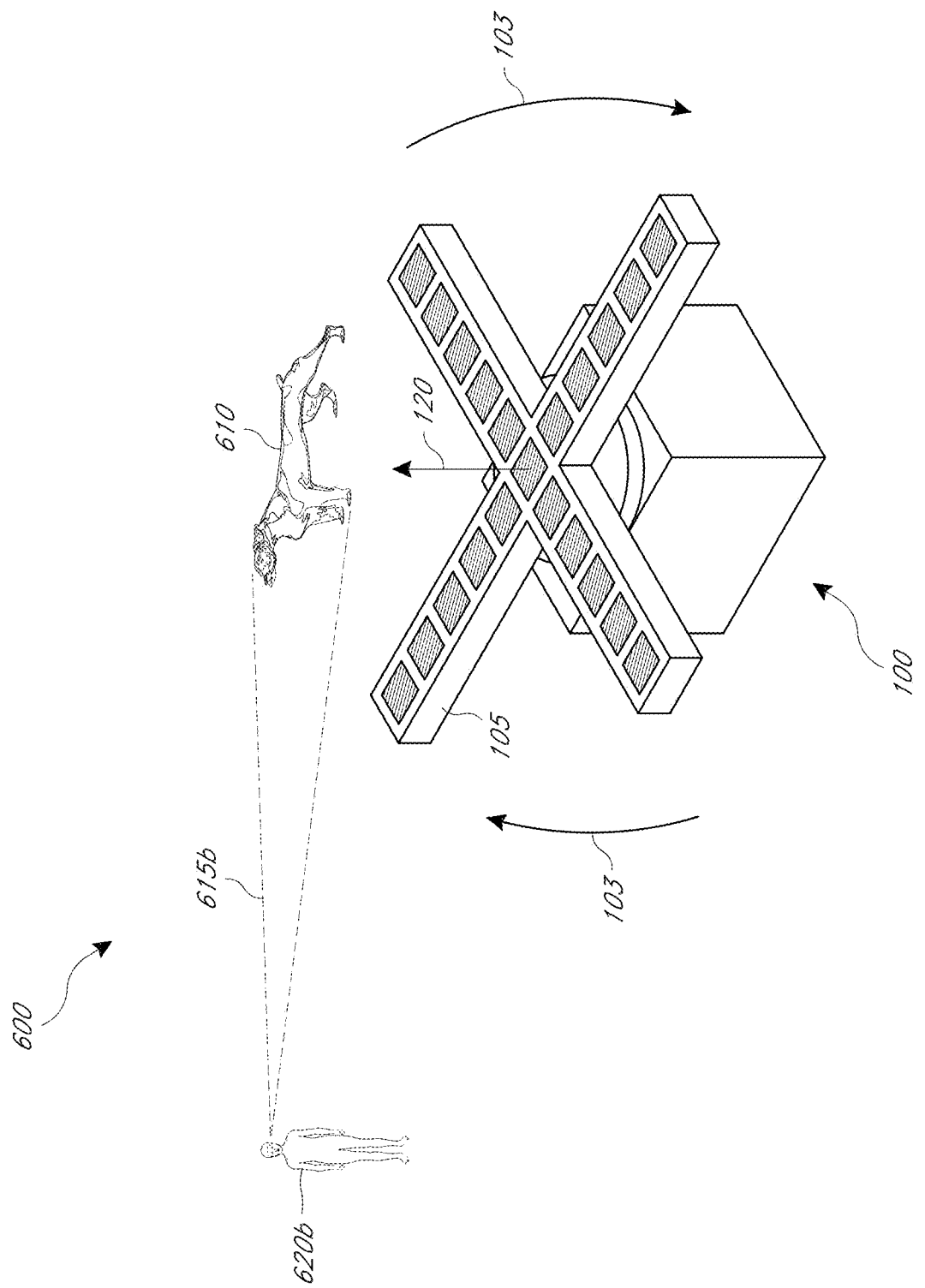

FIGS. 6A and 6B are perspective views of an example of display apparatus 100 and multiple observers 620a, 620b viewing an example image 610 (of a dog) displayed by the display apparatus 100 at different viewing directions. The display apparatus 100 illustrated in FIGS. 6A and 6B may be substantially similar to the display apparatus 100 of FIGS. 1 and 5A-5G.

FIG. 6A illustrates an observer 620a positioned approximately in front of the display apparatus 100, e.g., at a small angle relative to the direction of the rotation axis 120. The field of view of the display apparatus 100 for observer 620a is illustrated as dotted lines 615a. For observer 620a, the field of view 615a is wide enough to fully view the image displayed by display apparatus 100.

In contrast, FIG. 6B illustrates an observer 620b positioned such that the observer 620b is viewing the image 610 projected by display apparatus 100 at an angle off from the rotation axis 120. As the observer 620b views the image 610 at increasingly greater angles from the rotation axis 120, the field of view 615b may become increasingly narrow. The narrow field of view 615b may result in a distorted image, a flattened image, or even an unviewable image. Is some embodiments, this may be due to the light field sub-displays 101 being viewed from increasingly large oblique angles, and the light field sub-displays 101 are unable to direct light at increasing greater angles from the rotation axis 120. Due to the 3-D light field nature of the light projected from the display apparatus 100, the observers who are off-axis (e.g., the observer 620b) will perceive a different perspective of the image 610 being projected from the display.

Figure 7:
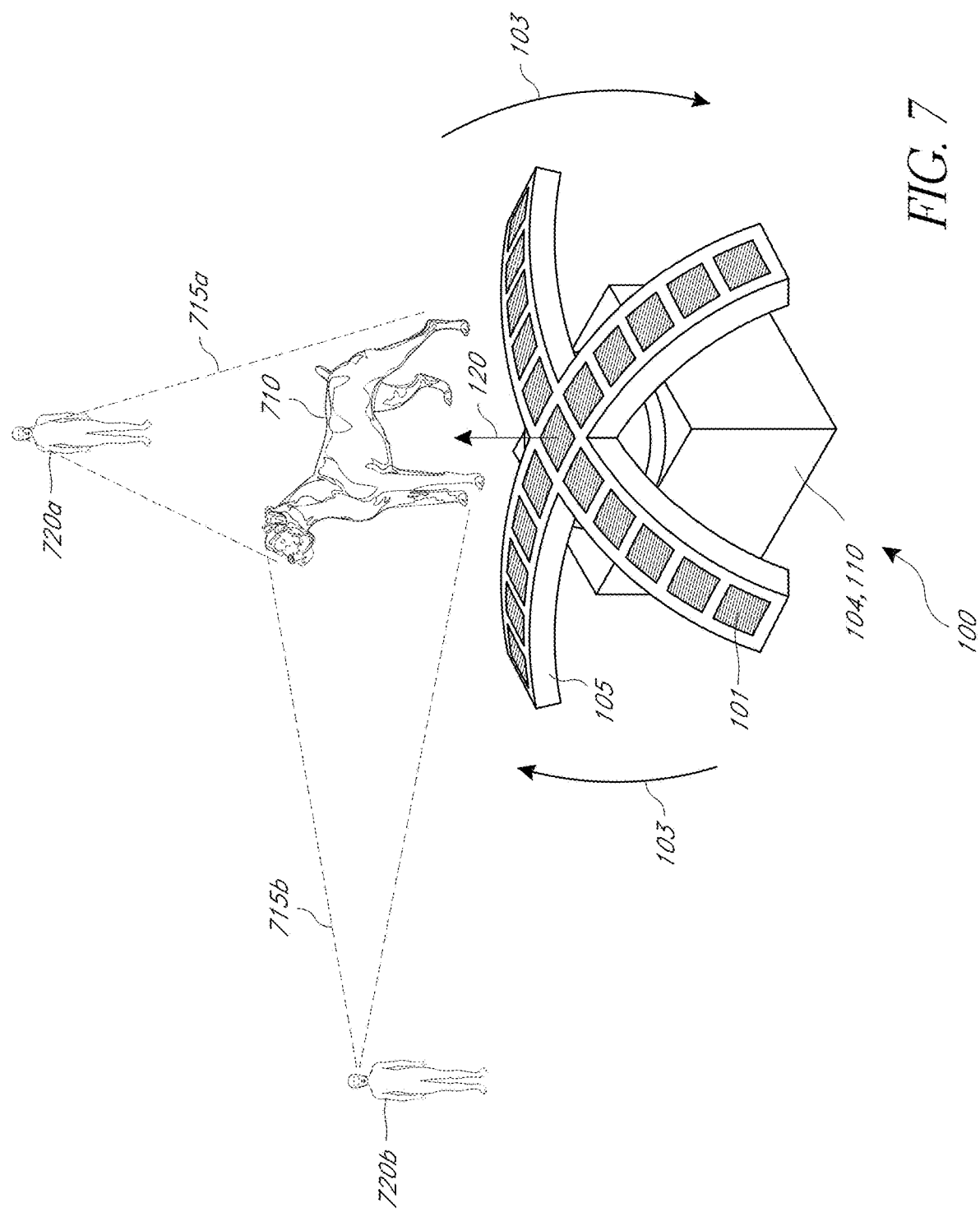
FIG. 7 is a perspective view that schematically illustrates another example display apparatus that is displaying a 3-D representation of an image viewed by multiple observers.

Accordingly, FIG. 7 illustrates an embodiment of the display apparatus 100 configured to display a 3-D representation of an object at greater angles from the rotation axis 120. FIG. 7 illustrates a perspective view of an example of the display apparatus 100 in which the rotatable structure 105 is curved so as to be convex to observers 720a, 720b.

In the embodiment illustrated in FIG. 7, the elongated elements 102 of the rotatable structure 105 are curved out of the plane that is perpendicular to the rotation axis 120 to achieve the convexity. An advantage of a display apparatus 100 having a convex rotatable structure 105 is that an observer (e.g., the observer 720b) that is not directly in front of the display apparatus (e.g., like the observer 720a) can see a substantial field of view 715b of the display apparatus 100 (e.g., an increased field of view as compared to the flat rotatable structure of FIGS. 6A and 6B).

The curvature of the elongated elements 102 can be selected to provide a desired field of view for the display apparatus 100. The curvature need not be constant along an elongated element 102 or the same for each elongated element 102. For example, each elongated element may have a different radius of curvature, or a single elongated element 102 may have a radius of curvature that depends on distance from the rotation axis or distance along the elongated element 102.

Further, while FIG. 7 illustrates a display apparatus 100 having a rotatable structure 105 similar to the rotatable structure 105 of FIG. 1, in other embodiments, the display apparatus 100 can include any rotatable structure described herein.

Example Display Apparatus Comprising a Fan Assembly

While FIG. 1 shows an example of the display apparatus 100 comprising a rotatable structure 105 having elongated elements 102 with light field sub-displays 101 disposed thereon, the display apparatus 100 can be configured differently in other embodiments. For example, the display apparatus 100 may comprise a fan assembly. In such embodiments, the fan assembly may comprise a rotatable structure including a plurality of fan blades having any shape, size, or positional relationship with respect to other fan blades or with respect to an axis of rotation about which the rotatable structure rotates. The rotatable structure may comprise any number of fan blades needed to satisfy the fan specification requirements for a particular thermal system application. The rotatable structure may further comprise a central hub which may be circular or any other desired shape and may be centered at the axis of rotation of the rotatable structure. In certain embodiments, fan blades may extend radially outwardly from a central hub. The fan blades may comprise the elongated elements 102 as described above with respect to FIG. 1.

The fan blades or any other portion of the rotatable structure may comprise one or more light sources mounted thereon or embedded therein. In some embodiments, the light sources may comprise light field sub-displays 101 as described above in connection with FIGS. 1-3C. For example, the plurality of pixels 205 may be configured to project light toward a micro-lens array where the light may be redirected in a manner substantially similar to that described above in connection with FIGS. 3A-3C. Other configurations of light sources, light redirecting elements, and relationships between components are possible. For example, the fan blades can include combinations of both light field sub-displays and other optical sources such as, e.g., LEDs.

In some embodiments, light sources may be physically spaced apart from, but in direct or indirect optical communication with, the fan blades or any other portion of the rotatable structure. In such embodiments, the fan blades or other portions of the rotatable structure may be configured to reflect light from the spaced apart light source to project a displayed image. In some embodiments, on-board light sources and spaced apart light sources may be used in combination.

FIGS. 8A and 9A-9D illustrate some example embodiments of a fan assembly for displaying an image in accordance with the disclosure herein, however, other configurations are possible. Generally, as used herein, a fan assembly can include a fan (such as, e.g., a desk fan) or an assembly that when electromechanically coupled with another device (such as, e.g., a computer or an AR device) is used to cool the device. A fan assembly can also comprise portions of a fan such as, e.g., the rotatable fan blades, which are combined with other components (e.g., a motor, a base, a cage surrounding the fan blades, etc.) to form a completed fan.

Figure 8A:
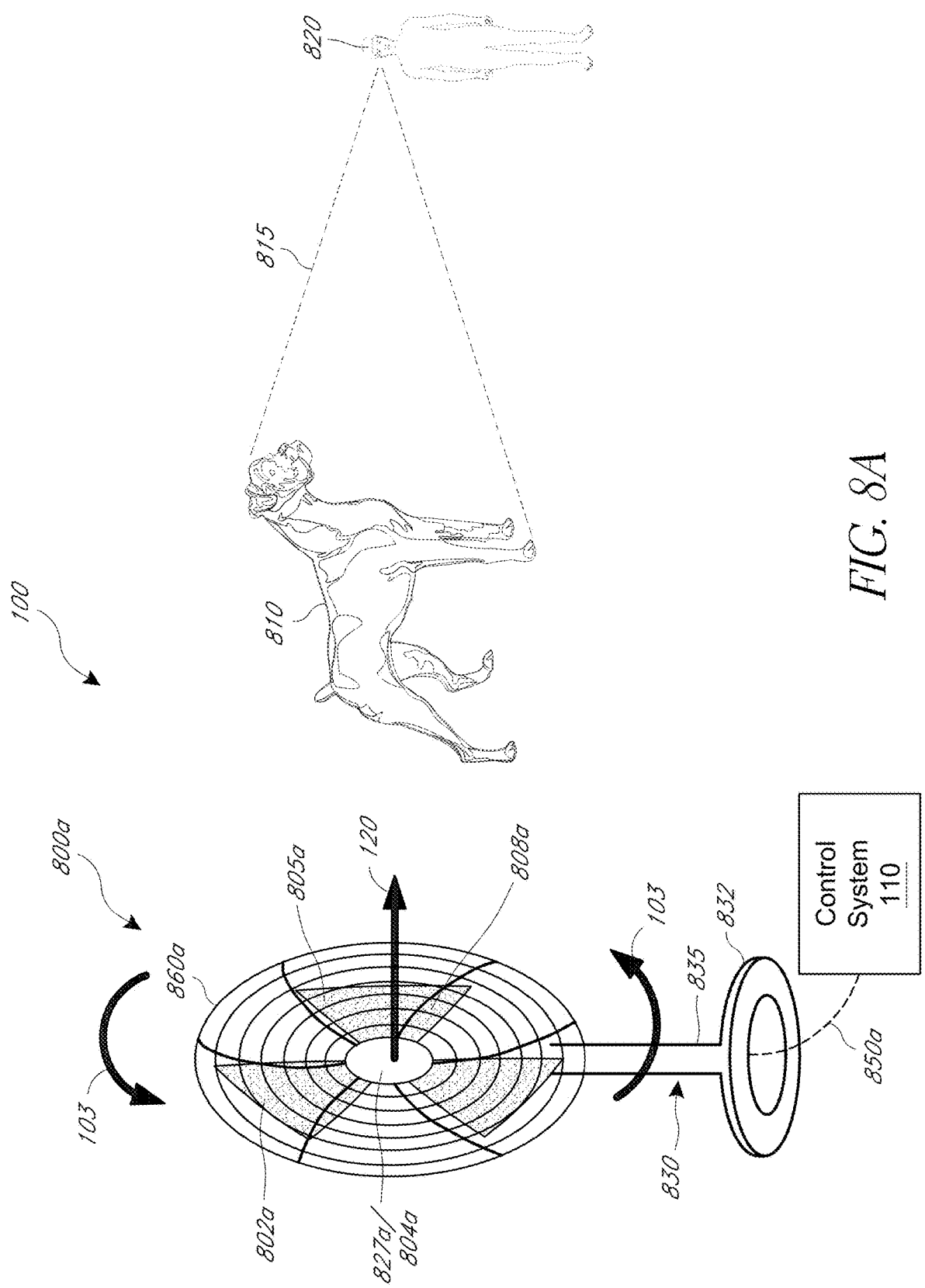
FIG. 8A is a perspective view that schematically illustrates another example display apparatus that is displaying a 3-D representation of an image viewed by an observer.

FIG. 8A is a perspective view of an example display apparatus 100 and an observer 820 viewing an example image 810 (e.g., a dog in this example) displayed by the display apparatus. Unless otherwise noted, the components of FIG. 8A may include components similar to like numbered components shown in FIGS. 1 and 7.

As shown in the embodiment illustrated in FIG. 8A, the display apparatus 100 may comprise a fan assembly 800a. Fan assembly 800a may include a rotatable structure 805a, and may further include fan blades 802a. In certain embodiments, rotatable structure 805a may include embodiments of the elongated elements 102 described herein (see, e.g., FIGS. 1, 5A-5D, and 6A-7). In general, the fan assembly 800a may comprise any fan or machine having a rotatable structure 805a comprising a plurality of fan blades 802a having a plurality of light sources disposed on at least a portion of at least one fan blade 802a. In some embodiments, the light sources may comprise light field sub-displays 101 as described above in connection with FIGS. 2A-3B; however, other types of light sources and light redirectors may also be used.

Referring again to FIG. 8A, the fan blades 802a can be configured to rotate about a rotation axis 120 to generate a directional fluid flow of a medium surrounding the fan blades 802a (e.g., air in some embodiments). While the fan assembly 800a of FIG. 8A is illustrated as a household standing fan, other configurations are possible. For example, the fan assembly 800a may comprise a standing desk fan, a clip-on fan comprising a spring loaded fastener, a box fan, a wall-mounted fan, a ceiling fan, a window fan, a desk fan, a cooling fan, a fan configured to cool electronics or computer components, a fan for use in mobile devices, a centrifugal fan, a propeller for aerial vehicles, engine turbines, etc.

FIG. 8A also illustrates an observer 820 positioned approximately in front of the display apparatus 100. As described above in connection with FIGS. 1-4B, the light field sub-displays 101, which may be disposed on fan blades 802a, are configured to produce and redirect light in a desired pattern and frequency while the fan blades 802a are rotated about rotation axis 120 at a desired rotational velocity by the motor 804a. Thus, the image 810 (e.g., a dog in this example), is displayed as a 3-D representation of the image. Accordingly, as described throughout this disclosure, the observer 820 is able to view the image 810 within the field of view of the observer 820 (illustrated as dotted lines 815).

As illustrated in FIG. 8A, the fan assembly 800a may be coupled to the control system 110, which can be configured to drive the fan assembly 800a as described above in connection with FIG. 1. The control system 110 can be coupled to the fan assembly 800a via a wired or wireless link 850a. In some embodiments, a wired link 850a may feed into an opening of the support 830 to the motor 804a and fan blades 802a. A wired link may further pass through a housing 860a which may at least partially surround rotatable structure 805a. The rotatable structure 805a or fan blades 802a may comprise a plurality of cavities or pathways arranged to accept wired communications lines between each of the light field sub-displays 101 and the control system 110. Both wired and wireless link embodiments provide communication for controlling the operation of the motor 804a and at least one light source component, such as at least one light field sub-display (not shown), disposed on fan blades 802a to project an image 810 toward an observer 820.

The fan blades 802a may comprise a shape, number, or rotation rate about axis of rotation 120 based on the intended use of the fan assembly 800a. The fan blades 802a can be configured to generate an air flow based on the rotation about the rotation axis 120, where the volume flow rate of the generated airflow may be based on the intended use of the fan assembly 800a (e.g., house fan, propellers for aerial vehicles, engine turbines, etc.). For example, the fan blades 802a may comprise a contoured shape, an angled position with respect to a plane normal to the axis of rotation 120, or a specific surface size such that fan blades 802a are configured to induce an air flow to move air or other fluid medium from one side of the fan assembly 800a to other during rotation of the fan blades 802a. The shape of fan blades 802a can be based on fluid dynamics, aerodynamics, etc. so as to provide desired air flow properties. In some embodiments, the fan blade shape may be configured to optimize the airflow. In embodiments having light field sub-displays 101 disposed thereon, fan blade design characteristics such as the shape, the size, the number, the material, and the position of the fan blades may all be selected to accommodate for changes in weight, rotational inertia, and balance that may occur when including light field sub-display components on the fan blades 802a. The design characteristics of fan blades 802a may be further selected to account for additional drag due to the light field sub-displays 101 mounted or otherwise disposed thereon. In some embodiments, the light field sub-displays 101 or other light sources may be embedded in the fan blades 802a to reduce drag by providing a substantially flush surface 808a. Other configurations are possible.

In some embodiments, the shape may also be configured to anisotropically direct light into an array of light beams that propagate at different outgoing angles to generate an image. The fan blades 802a may have a varied shape along any one of a length, width, or depth of the fan blades 802a. In some embodiments, the fan blades 802a may be flatter near the rotation axis 120 (e.g., having a surface nearer to parallel in position with respect to a reference plane normal to the rotation axis 120) and be increasingly angled with respect to that reference plane with increasing radial distance from the rotation axis 120. In some embodiments, fan blades may have a flat, angled surface at a constant angle with respect to a normal reference plane to the axis of rotation 120. In other embodiments, the fan blades may have a curved or a contoured depth, width, or length, each of which may vary with radial distance from axis of rotation 120. In various embodiments, the shape of the fan blades 802a may have a contoured depth relative to a virtual plane perpendicular (not shown) to the rotation axis 120. For example, the fan blades 802a may have a contoured surface 808a (e.g. the surface directing light therefrom) that has a difference in angle of the contour relative to the rotation axis 120. In embodiments having light field sub-displays mounted on or embedded in fan blades 802a, the light field sub-displays may be positioned along the length, width, or depth dimension of the fan blade 802a such that light may be projected at any desired angle to create a displayed image 810.

Particular contours of fan blades 802a may be used advantageously in other embodiments as well. For example, in embodiments having spaced apart light sources which project or direct light toward fan blades 802a for redirection, particular shapes and angles of the fan blades 802a with respect to the light source may affect the displayed image 810. In various embodiments, one or more of the contours, the size, the shape, and the number of the fan blades may be selected to achieve a desired air flow characteristic and light reflection or redirection characteristics. In embodiments having angled fan blades with respect to a reference plane normal to the axis of rotation 120, light may travel varying distances from a light source display before reaching the contoured surface 808a (e.g., FIGS. 12A-12C). Without subscribing to any particular scientific theory, this may be advantageous in projecting a displayed image 810 with certain visual characteristics. In particular, varying the light path distances between a light source and the point of redirection may allow the presentation of three dimensional images. In another example, the light may originate from a source directed toward a given viewing direction (e.g., via light field sub-displays or other light manipulation elements), where the viewing direction is located at an angle relative to the rotation axis 120, for example, on a side of the fan assembly 800 (e.g., FIGS. 8A-9D). Other configurations are possible.

In some embodiments, the fan blades 802a may comprise an arrangement of the light field sub-displays 101 balanced to the fan blades 802a. For example and without subscribing a scientific theory, the plurality of fan blades 802a may need to be balanced against each other to reduce induce noise and vibration. Accordingly, additional features disposed thereon (e.g., light field sub-displays 101, wires for controlling sub-displays 101, etc.) may be balanced within each fan blade 802a, against each other fan blade 802a, or throughout the rotatable structure 805a such that a desired symmetry or balance is achieved.

In some embodiments, the fan assembly 800a may be configured to dissipate heat from other objects nearby. Accordingly, the fan blades 802a may be shaped or driven to remove heat from these objects. However, light field sub-displays thereon may generate additional heat during operation. Accordingly, the control system 101 may be configured to control the rotation of the fan blades 802a or the operation of the light field sub-displays to reduce, mitigate, or neutralize the effect of any heat generated by the light field sub-displays.

In the embodiment illustrated in FIG. 8A, the fan assembly 800a can comprise a housing 860a configured to at least partially enclose the fan blades 802a and motor 804a. In some embodiments, the housing 860a may comprise a plurality of housing surfaces (not shown) configured to be connected together by fasteners or other mechanical connectors. In some embodiments, the housing 860a may comprise an array of wires forming a mesh (e.g., a cage) comprising a plurality of openings for fluid flow through the housing 860a while enclosing the rotatable structure 805a. In some embodiments, the housing 860a is optional. A hub 827a may be disposed approximately at the rotation axis 120, for example, over the motor 804a in this example. The hub 837a may be part of the housing 860a or may be a separate component. In some embodiments, hub 837a may be coupled to or may be formed integrally with rotating assembly 805a.

The fan assembly 800a may comprise a support 830 that provides structural support to the fan assembly 800a. In some embodiments, the support 830a may comprise a stand comprising base 832 and a support arm 835. In other embodiments, the support 830 may be part of the housing 860, e.g., a box fan.

Figure 8B:
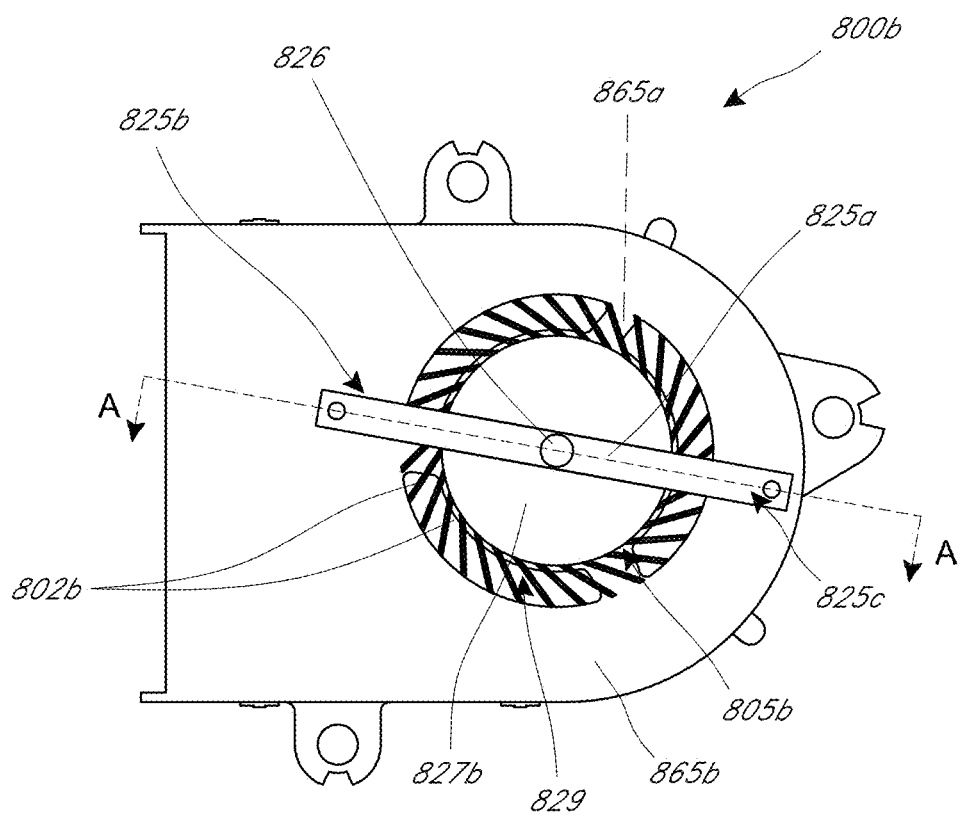
FIGS. 8B and 8C schematically illustrate a plane and side views of an example fan assembly.
Figure 8C:
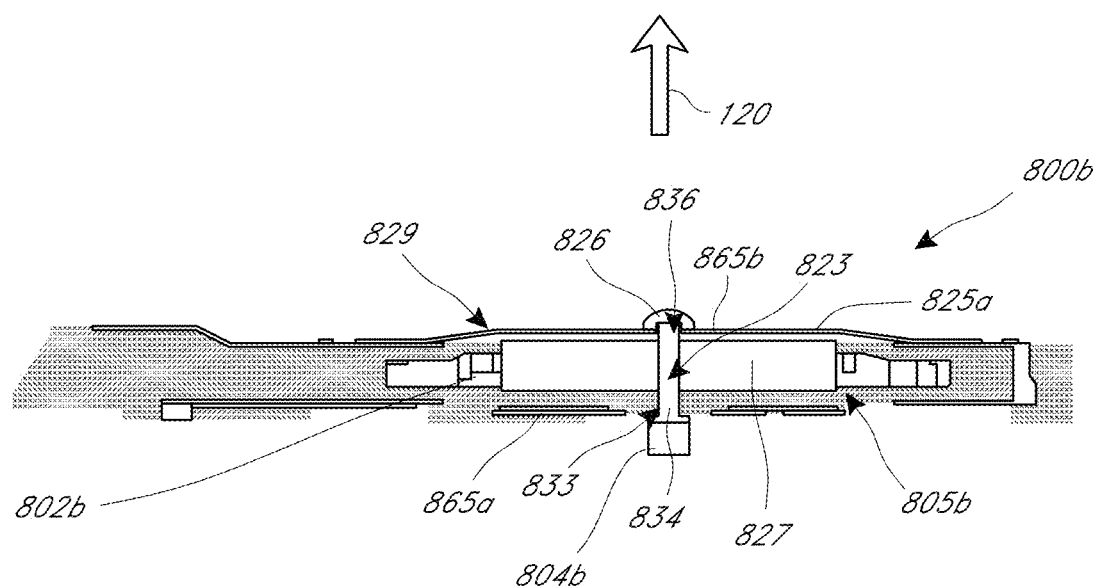

FIGS. 8B and 8C illustrate a plan and a side view of another example embodiment of a fan assembly. FIG. 8B is a plan view of a fan assembly 800b, for example, a fan configured to cool an electronic device (e.g., computers, mobile devices, augmented reality devices, etc.) or dissipate heat from a surrounding area. FIG. 8C is a schematic side sectional view of the fan assembly 800b of FIG. 8B along sectional line A-A. Unless otherwise noted, the components shown in FIGS. 8B and 8C may include components similar to like numbered components shown in FIG. 8A. As shown in FIGS. 8B and 8C, the fan assembly 800b can comprise a frame assembly that can have a first support frame 865a and a second support frame 865b coupled to the first frame 865a. A rotatable structure 805b can be disposed between the first and second support frames 865a, 865b, e.g., within the enclosure defined by the frames 865a, 865b. The rotatable structure 805b can comprise a hub 827b and one or a plurality of blades 802b (e.g., fan blades) coupled with or extending from the hub 827b. The hub 827b can be coupled with the shaft assembly 823. In some embodiments, a bushing can be disposed between the shaft assembly 823 and the hub 827b. In some embodiments, the rotatable structure 805b can rotate relative to the rotationally fixed shaft assembly 823. In other embodiments, the rotatable structure 805b can rotate with the rotating shaft assembly 823.

As shown in FIG. 8C, a first end 833 of the shaft assembly 823 can be supported by or coupled with the first support frame 865a (e.g., to a support structure defined by or including the frame, to the motor, etc.). For example, in the embodiment of FIG. 8C, the first end 833 of the shaft assembly 823 can be secured to the first support frame 865a at a first shaft support 834 of the first support frame 865a. In various embodiments, the first end 833 can be welded, glued, or press fit onto the frame 865a. The first shaft support 834 can comprise a portion of a structural body defined by the first support frame 865a. In other embodiments, the first support frame 865a can comprise the motor 804b such that the first end 833 of the shaft assembly 823 may be secured to the motor 804b and the shaft support 834 comprises a portion of the motor 804b. Any suitable structure can be used as the shaft support 834 so as to secure the first end 833 of the shaft assembly 823.

In some implementations, the rotatable structure 805b may comprise light sources (e.g., light field sub-displays or other light emitting elements) that may add additional weight or air resistance to the fan blades which may affect the rotation of the rotatable structure 805b. Such additional structures may result in increased transverse loads (e.g., loads that are transverse to the longitudinal axis of the shaft assembly) applied to the shaft assembly 823. Accordingly, in some embodiments, it can be advantageous to control transverse loads (e.g., loads that are transverse to the longitudinal axis of the shaft assembly) applied to the shaft assembly 823 so as to reduce noise and vibrations, and to mitigate the risks of fatigue, wear, or excessive loading conditions. Accordingly, in the embodiment of FIGS. 8B and 8C, a second support frame 865b can be provided to reduce transverse loading on the shaft assembly 823. The second support frame 865b can be coupled with the first support frame 865a and can be disposed at or over a second end 836 of the shaft assembly 823 so as to control transverse loading at the second end 836. In FIGS. 8B and 8C, the second support frame 865b can comprise a second shaft support 826 coupled with the second end 836. The second shaft support 826 can be rigidly attached to the second support frame 865b across at least a portion of the airflow opening 829. In some embodiments, the second shaft support 826 can comprise a pin or other connector that rigidly attaches the second end 836 of the shaft assembly 823 to the frame 865b. In various embodiments, the second shaft support 826 can be connected concentrically or axially relative to the rotation axis 120 about which the shaft assembly 823 or the rotatable structure 805b rotate. Positioning the second shaft support 826 along or centered relative to the rotation axis 120 can beneficially reduce deflections of shaft assembly 823 and improve the rotation of the rotatable structure 805b.

In the embodiment of FIGS. 8B and 8C, the second shaft support 826 can comprise or be connected with an elongate member 825a (sometimes referred to as a follower arm) between first and second end portions 825b, 825c thereof. As shown in FIG. 8B, the first end portion 825b of the elongate member 825a can be supported at a first portion of the second support frame 865b, and the second end portion 825c of the elongate member 825a can be supported at a second portion of the second support frame 865b. The first and second end portions 825b, 825c can be spaced apart about a periphery of the airflow opening 829 (e.g., disposed on generally opposite sides of the airflow opening 329, as illustrated in FIG. 8B). Other configurations are possible, such as the first and second end portions 825b, 825c need not be directly opposite and may be disposed anywhere about the periphery of the airflow opening 829.

Without subscribing to any scientific theory, rigidly supporting the second end 836 of the shaft assembly 823, in addition to supporting the first end 833, can beneficially control transverse loading on the shaft assembly 823 and can reduce or eliminate deflections of the shaft assembly 823 (e.g., due to vibrations resulting from wear or imbalance of the rotatable structure 805b). However, since the elongate member 825a may be disposed across part of or the entire airflow opening 829, the elongate member 825 may interfere with the influent air entering the fan assembly 800b through the airflow opening 829. Furthermore, the elongate member 825a may interfere with displaying the image, by for example blocking a subset of the light emitted by the light field sub-displays 101 which may be disposed on part of the rotatable structure 805a, such as fan blades 802a. Accordingly, some embodiments may include additional instructions in the memory 114 of the control system 110 configured to cause the hardware processor 112 to account for the interference. For example, the control system 110 may be configured to drive a first subset of light field sub-displays 101 corresponding to a region of the airflow opening 829 absent of the elongate member 825 in accordance with the image data, while turning off or otherwise not operating a second subset of light field sub-displays 101 corresponding elongate member. In embodiments where the light field sub-displays 101 would periodically pass underneath elongate member 825a during rotation, control system 110 may be configured to correspondingly accommodate for this light path interruption. For example, light field sub-displays can be controlled to turn off at times or positions corresponding to times or positions when the light field sub-displays are underneath the elongate member 825.

In another embodiment (e.g., FIGS. 11-13A), the control system 110 may be configured to drive a first region of a display 1000 corresponding to a region of the airflow opening 829 absent of the elongate member 825, while turning off or otherwise not operating a second region of the display corresponding elongate member. Other configurations are possible. For example, the size of the image displayed by the light field sub-displays may be reduced to an exposed area of the airflow opening (not shown). In another embodiment, the light field sub-displays 101 corresponding to a single fan blade 802a, 802b may be driven separately from the other fan blades or a determined subset of light field sub-displays 101 on each fan blade. In another embodiment, the first and second subset of light field sub-displays 101 may be driven based on an exposed region of the fan blades 802a,b, for example, if the housing or other element extends within the airflow opening or over a portion of the blades or rotating components.

Figure 9A:
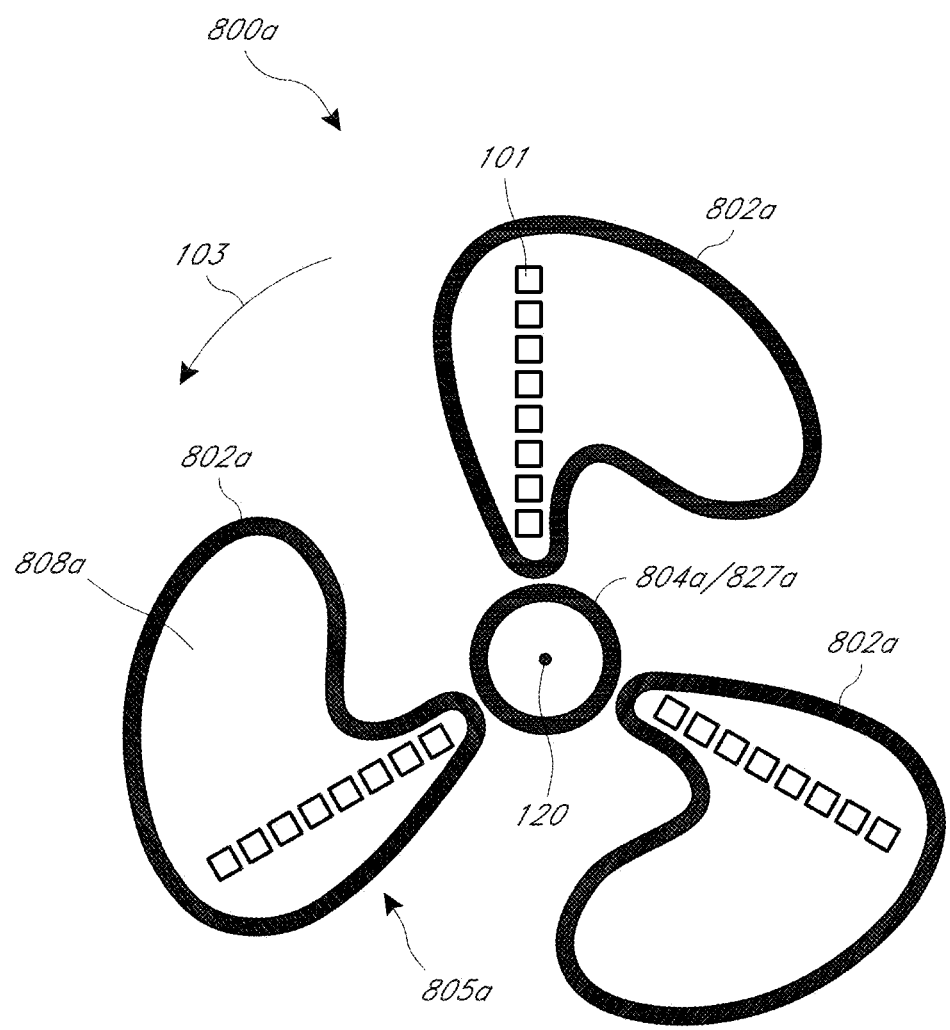
FIGS. 9A-9D schematically illustrate various examples of another display apparatus.
Figure 9B:
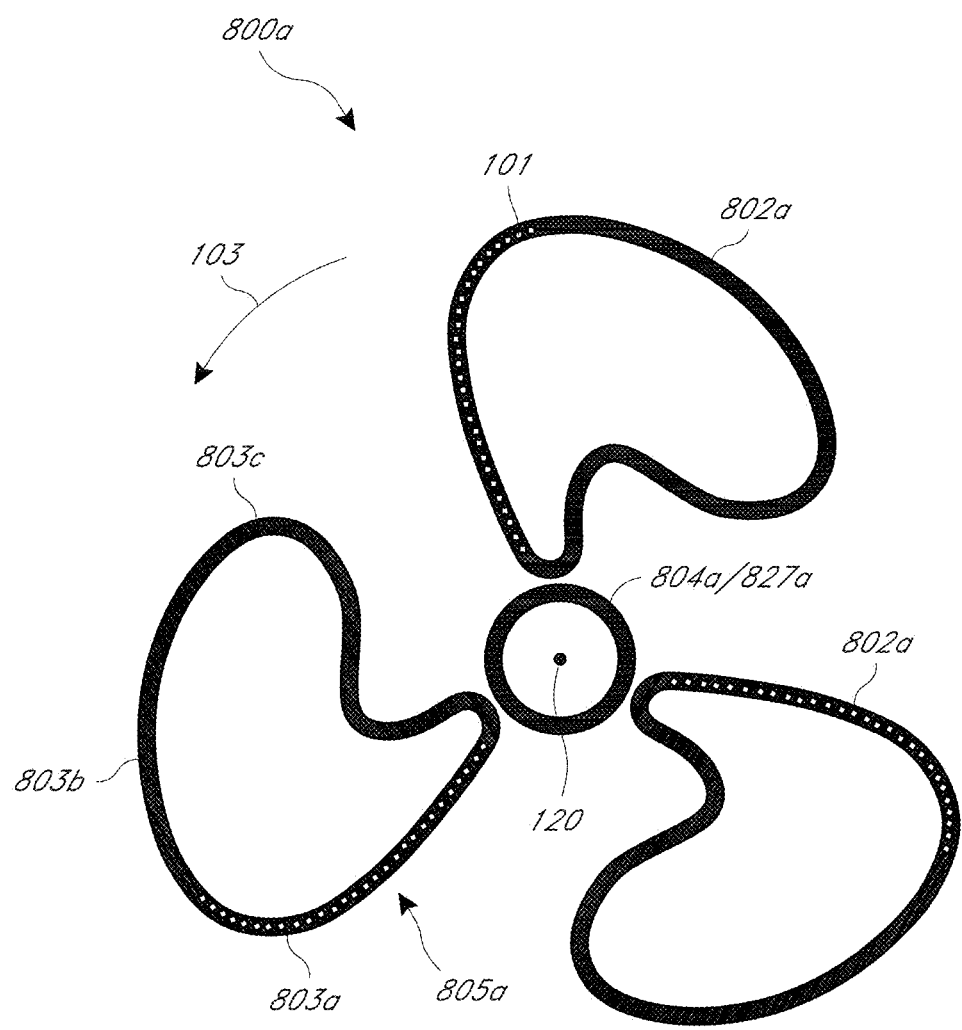
Figure 9C:
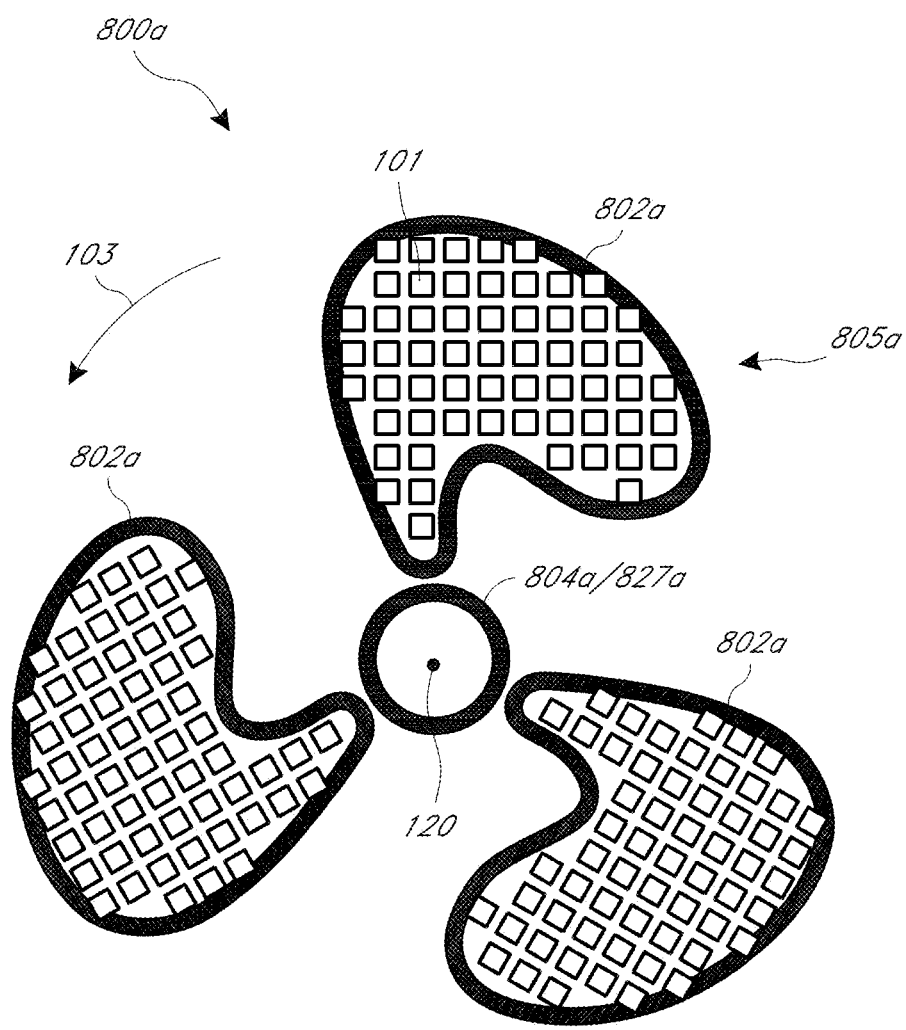

FIGS. 9A-9C illustrate various examples of a fan assembly (e.g., fan assembly 800a, 800b, collectively referred to hereinafter as "800") that may be included in a display apparatus as described above in FIG. 8A. The following description is made with reference to fan assembly 800; however, any fan assembly 800 may be representative of fan assembly 800a, 800b or any other fan assembly in accordance with embodiments herein. Furthermore, reference will be made to, for example, fan blades 802, motor 804, and rotatable structure 805, which may be representative of fan blades 802a, 802b; motor 804a 804b; and rotatable structure 805a, 805b, respectively. Other reference numbers will be referenced in a similar manner. This is for illustrative purposes only and not intended to be a limitation. The embodiments and concepts described herein may be applied to any fan blade, motor, rotatable structure, or fan assembly, for example but not limiting, fan assembly 800b of FIGS. 8B and 8C.

Returning to FIGS. 9A-9C, one or more fan blades 802 may comprise a plurality of light field sub-displays 101 arranged in different configurations along the fan blades 802 (the support 830, housing 865, and control system 110 are not shown). As used herein, each fan blade 802 may be indicative of an example elongated element 102 of FIG. 1. For example, FIG. 8A illustrates a rotatable structure 805 that comprises three fan blades 802. Similar to elongated elements 102a of FIG. 5A, each fan blade 802 includes a plurality of light field sub-displays 101 arranged in a 1×m array of light field sub-displays 101 (where m is the number of light field sub-displays along the length of the fan blade 802). In certain embodiments, n×m arrays of light field sub-displays can be used to cover as much or as little of the fan blade as desired. Other configurations and types of light sources can also be used.

FIG. 9B illustrates another example of a rotatable structure 805 comprising three fan blades 802 having another arrangement of light field sub-displays 101 thereon. Each fan blade 802 may comprise a plurality of edges forming the contour of the fan blade 802. The plurality of edges may comprise a leading edge 803a, a radial edge 803b, and a following edge 803c (collectively hereinafter "edges 803"). One or more edges 803 of the fan blades 802 may comprise a plurality of light field sub-displays disposed along the length of the edge. For example, FIG. 9B illustrates a plurality of light field sub-displays 101 disposed along the leading edge 803a. Other configurations are possible, for example, the plurality of light field sub-displays 101 may be disposed along the following edge 803c, the radial edge 803b, or a combination of one or more edges 803.

FIG. 9C illustrates another example of a rotatable structure 805 comprising a plurality of fan blades 802 having another arrangement of light field sub-displays 101 thereon. As illustrated in FIG. 9C, the fan blades 802 may comprise a plurality of light field sub-displays 101 arranged in an array corresponding to a portion of a surface of the fan blades 802. The surface of the fan blades 802 may correspond to the viewing direction (e.g., a fiducial viewing direction along rotational axis 120, as shown in FIG. 8A). The light field sub-displays 101 may be arranged in a pattern or orderly array as illustrated in FIG. 9C. In another embodiment, the light field sub-displays 101 may be arranged in any configuration, e.g., a randomized or disordered arrangement. The arrangement of the light field sub-displays 101 may be varied based on the particular application of the fan assembly 800.

Figure 9D:
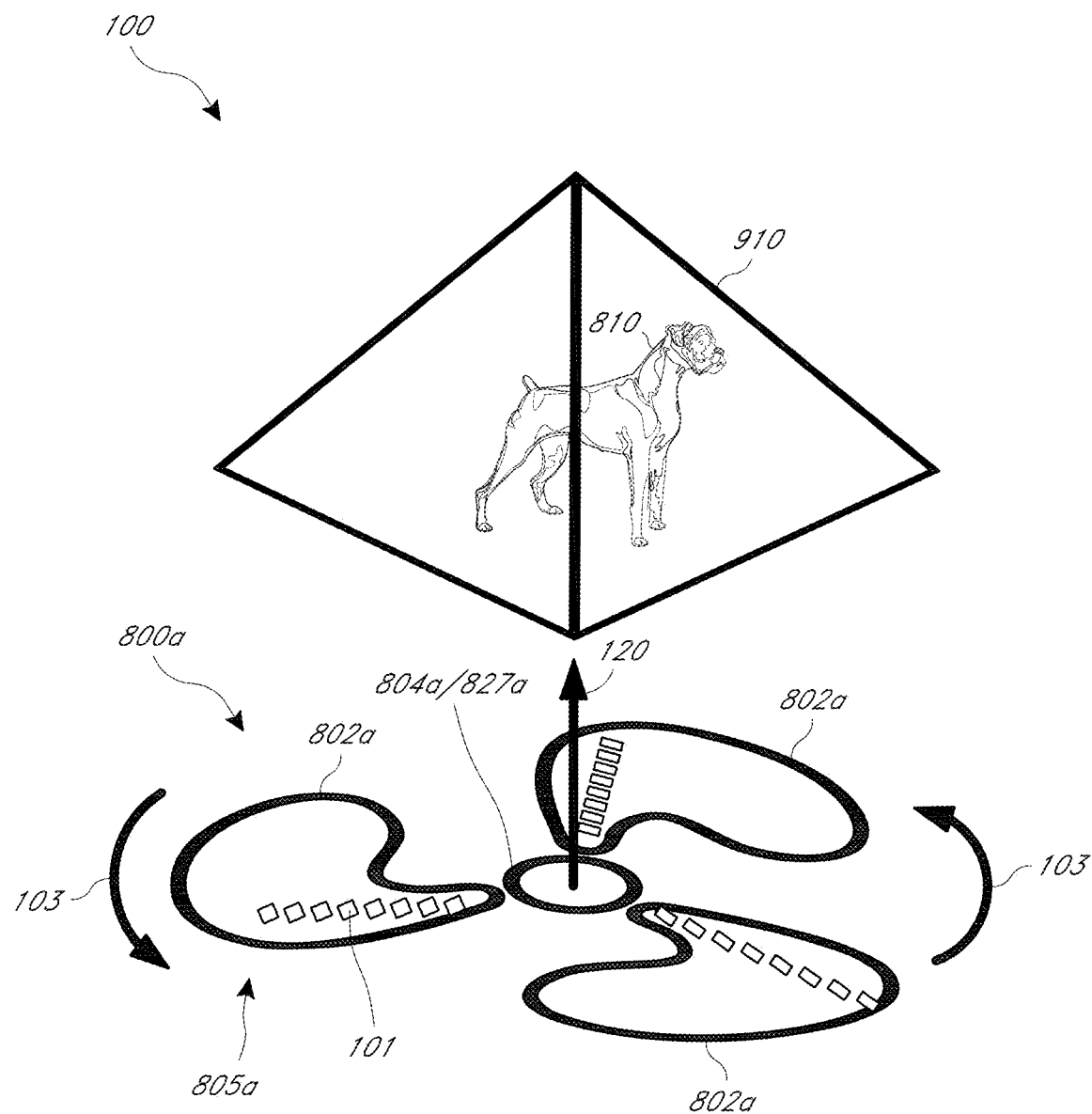

FIG. 9D illustrates another example fan assembly 800 for displaying a perceived 3-D representation of the image 810. FIG. 9D illustrates a fan assembly 800 that may be substantially similar to the fan assembly 800 of FIG. 9A. In addition, the embodiment illustrated in FIG. 9D comprises a three-dimensional geometric component configured to facilitate the display of the image 810. The geometric component may comprise a transparent or translucent material (e.g., plastic, glass, etc.) and can be configured to reflect light from the light field sub-displays 101 (or light sources in some embodiments) to produce the image 810. For example, as illustrated in FIG. 9D, a geometric component 910 having pyramid shape and made of transparent material may be positioned between the observer (e.g., observer 820) and the fan assembly 800. Light from the light sources on board the fan assembly 800 may be reflected by the geometric component 910 to produce one or more 2-D images. The images may be viewed by the observer and appear to be a 3-D representation of the image 810 hovering above the fan assembly 800 and contained within the geometric component 910. Other arrangements are possible (e.g., an inverted geometric component 910). Furthermore, the geometric component 910 may be used in conjunction with any other embodiment disclosed herein. In some embodiments, the geometric component 910 may be a plurality of planar surfaces joined together to create a pyramidal shape; alternatively, a solid geometric component 910 may be used.

While specific configurations are described above, these are intended to be illustrative only. Other configurations are possible. For example, FIGS. 9A-9D illustrate an arrangement of three equally spaced fan blades 802; however, the fan blades 802 need not be equally spaced, but may have any spacing therebetween. Furthermore, there need not be three fan blades 802, any number of fan blades 802 (e.g., 1, 2, 4, 5, etc.). In some embodiments, a plurality of light field sub-displays 101 may be disposed over the motor 104 (e.g., on a cover or hub assembly (not shown). Also, while FIGS. 9A-9D illustrate symmetric arrangements of light field sub-displays 101 on each fan blade 802, this is not a requirement and each fan blade 802 may comprise any combination of arrangements of light fields sub-displays.

Example Planar Display Apparatus

Figure 10:
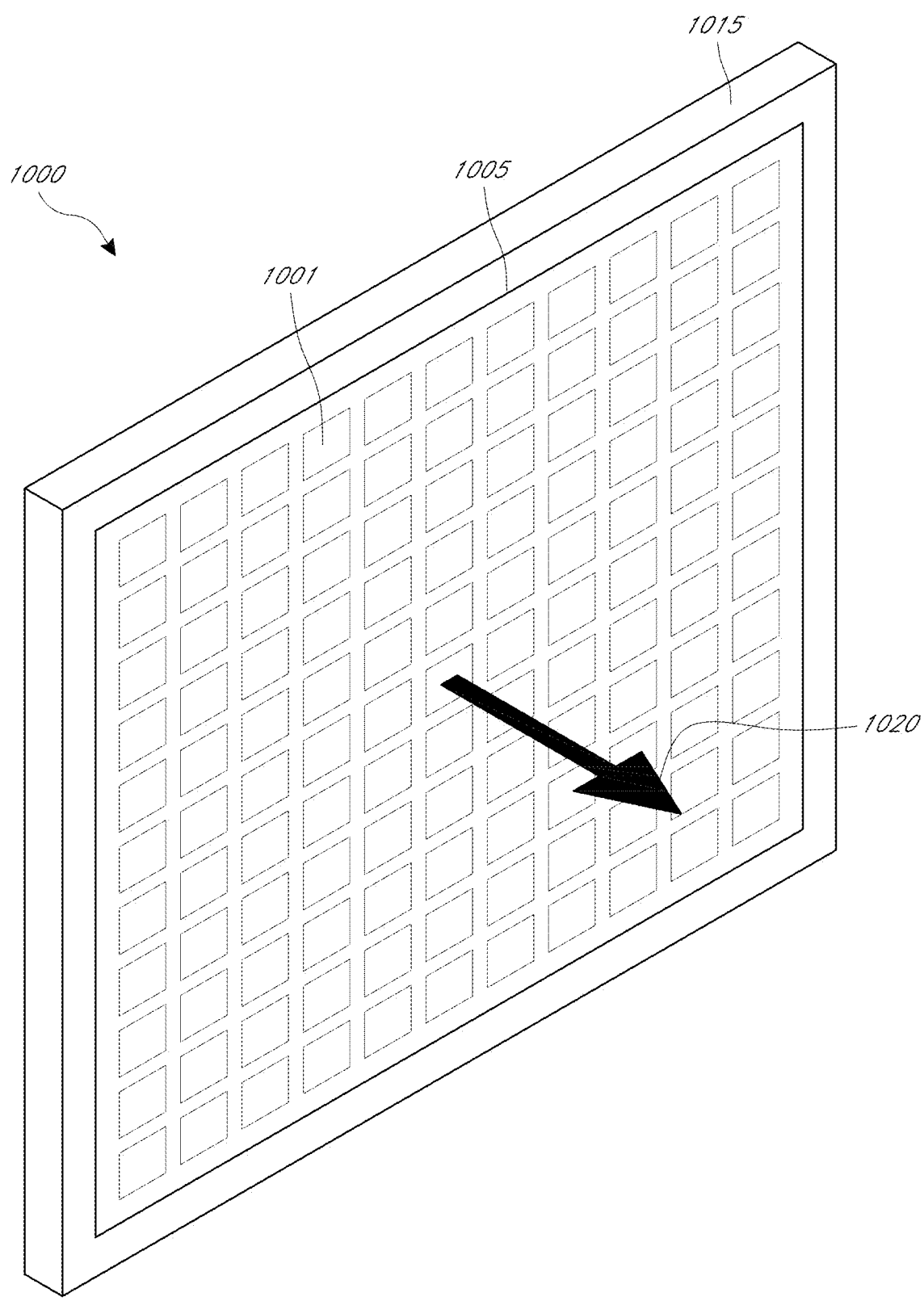
FIG. 10 schematically illustrates a display apparatus comprising two-dimensional array of light source.
Figure 11:
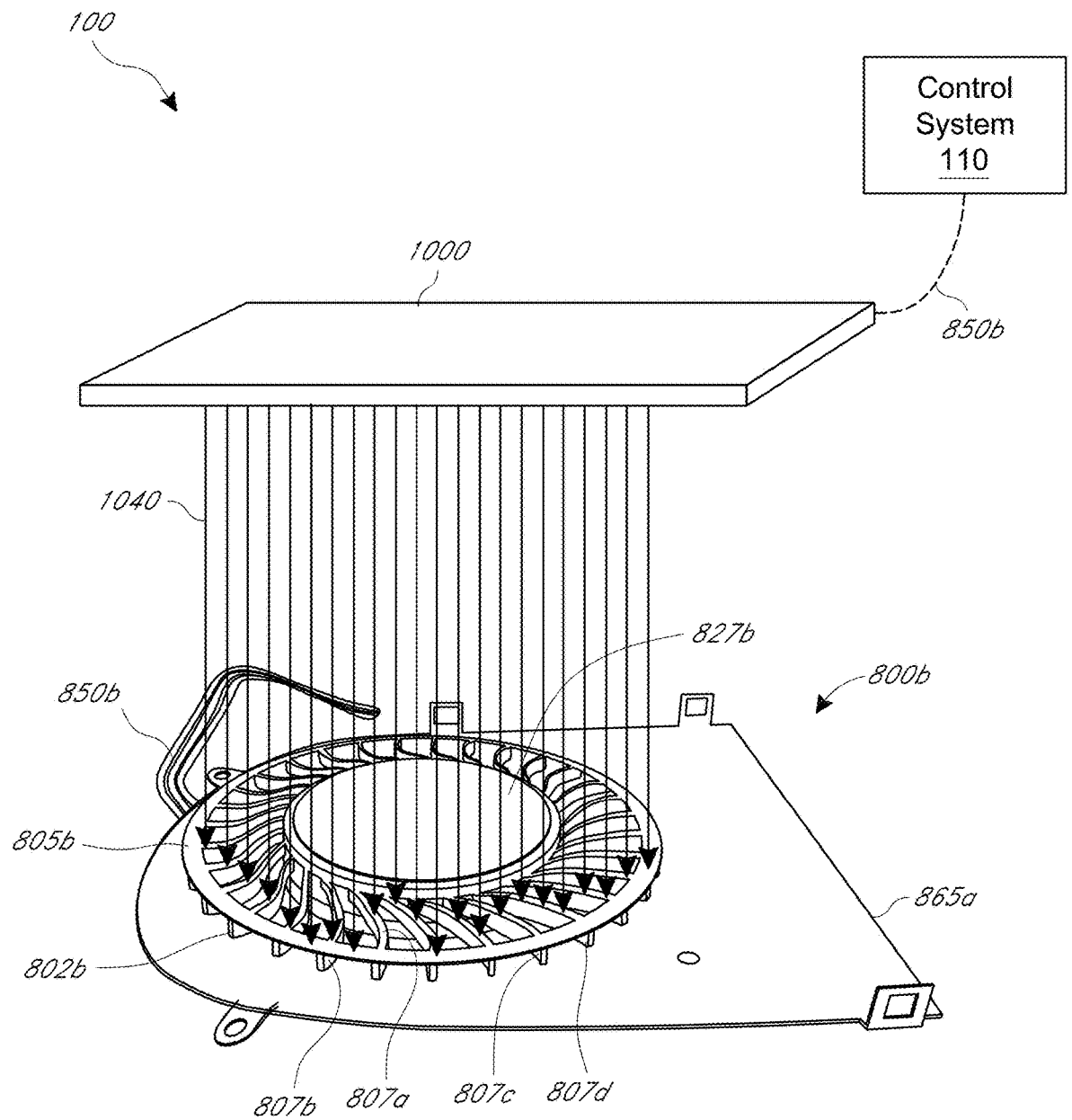
FIG. 11 is a perspective view that schematically illustrates another example display apparatus.

FIG. 10 is a perspective view that schematically illustrates another example display apparatus 1100. FIG. 10 illustrates an example of a display apparatus 1000 (e.g., a flat screen or planar television, in this example) comprising a plurality of light sources 1001. The display 1000 may be configured to display an image an object either as a 2-D image (e.g., a planar television) or a 3-D image (e.g., stereoscopic images or light field image displays). The display apparatus 1000 includes a display panel 1005 surrounded by a bezel 1015. The display panel 1005 can comprise an array of light sources 1001 disposed on a viewing surface of the display panel 1005 and configured to be viewed at a fiducial viewing direction 1020. In some embodiments, the display panel may comprise a 1-D or 2-D array of light sources 1001, for example, the 11×11 array of light sources illustrated in FIG. 10. The fiducial viewing direction 1020 can be perpendicular to the plane of the display panel 1005. The fiducial viewing direction 1020 thus points in the direction of a viewer who is positioned directly in front of the display. In some embodiments (e.g., FIG. 11) the fiducial viewing direction 1020 may be substantially the parallel to the rotation axis 120. The display 1000 may comprise an optional base or stand (not shown) to provide structural support and secure the display 1000 in a position (e.g., horizontal as shown in FIG. 11 or vertical) relative to other devices and systems described throughout this disclosure. While FIG. 10 depict a 11×11 light source array, it will be understood that this is for illustrative purposes and any other number or dimension n×m (n, m=1, 2, 3, 4, 5, 10, 20, 30, 64, 100, 512, 768, 1024, 1280, 1920, 3840, or any other integer).

The display 1000 may be in wired or wireless communication with a control system (e.g., control system 110 of FIG. 1). The control system may be configured to control the light emitted from the display 1000 in accordance with the disclosure herein. With reference to FIG. 11, one possible manner in which displaying a 3-D representation of an object can be accomplished is that the multiple light sources 1001 may be light field sub-displays (e.g., FIGS. 2A-4B) configured to anisotropically direct light into an array of light beams that propagate at different outgoing angles to generate a light field image. A fan assembly 800 disposed relative to the display 1000 may then interact with the light to generate the 3-D image (e.g., by modulating the light or including other optical components to otherwise direct the light to form the 3-D image). However, other configurations are possible. For example, the light sources 1001 may comprise liquid crystals (LC), light emitting diodes (LEDs), organic LEDs (OLEDs), or any other type of pixel structure configured to emit light for rendering an image. Other light sources may include lasers, fiber optics, or any structure configured to emit light that may be manipulated to render an image. In some embodiments, the display 1000 may comprise a spatial light modulator configured to spatially or temporally change the perceived intensity of the light projected from the display 1000. Examples of spatial light modulators include liquid crystal displays (LCD) including a liquid crystal on silicon (LCOS) displays and digital light processing (DLP) displays. In some embodiments, the light sources 1001 may be configured to emit a plurality of colors for use in rendering images (e.g., red, green, and blue; cyan, magenta, and yellow; etc.). The display 1000 may include lenses, waveguides, diffractive or reflective elements, baffles, or other optical elements to guide, direct, or focus light from the light sources toward or onto a rotatable structure such as, e.g., blades of a fan.

Example Apparatus for Displaying Images with Lights Directed Toward a Fan Assembly While FIGS. 8A-9D show examples of the display apparatus 100 comprising a fan assembly 800 having fan blades 802 comprising a plurality of light field sub-displays 101 disposed thereon, the display apparatus 100 can be configured differently in other embodiments. As described above, it may be advantages to control transverse loads of applied to components of the fan assembly to reduce noise and vibrations, and to mitigate the risks of fatigue, wear, or excessive loading conditions. Without subscribing to any scientific theory, additional structures (such as light sources) disposed on the propellers (e.g., FIGS. 1 and 5A-5F) or fan blades (e.g., FIGS. 9A-9D) may result in added weight and airflow resistance drawbacks affecting the rotation of the fan (e.g., inducing additional noise or vibration).

Accordingly, it may be advantageous to provide a display apparatus 100 comprising a rotatable structure that does not include light sources disposed thereon (e.g., on the fan blades or propellers). In some embodiments, a light source may be disposed relative to the rotatable structure (e.g., rotatable structures 105, 805) and configured to illuminate a portion of a surface of the rotatable structure. The rotatable structure can be configured to redirect the light (e.g., reflect, refract, transmit, or otherwise manipulate) to produce an image representative of an object. In some embodiments, the rotatable structure may comprise fan blades having a contoured shape configured anisotropically direct light into an array of light beams that propagate at different outgoing angles to generate an image. The image may comprise a 2-D image or a 3-D image. FIGS. 11-13B illustrate some of the embodiments of a display apparatus 100 in accordance with the disclosure herein, however, other configurations are possible. Unless otherwise noted, the components of the display apparatus 100 of FIGS. 11-13B may include components that are similar to like numbered components shown in FIGS. 8-9D. Such configurations may also provide a non-limiting advantage of reducing added heat generated by the operation of the light sources 101. In some embodiments, the light sources 101 are configured to produce light having a narrow dispersion or spreading (which may also be referred to as directional). In one embodiment, the light sources 101 may comprise an LED and a lens configured to focus light on to a surface of the rotatable structure. In another embodiment, the light sources 101 may comprise a plurality of lasers. In some embodiments, a light source configured to produce directional light (e.g., via a laser or via optical elements such as lenses that may focus light) may result in an improved image resolution based in part on the reduction of the dispersion of the light beam or focusing of the light beam onto at least a portion of the rotatable structure.

FIG. 11 is a perspective view that schematically illustrates an example display apparatus 100. In this embodiment, the display apparatus comprises a fan assembly (for example, fan assembly 800b of FIG. 8B), a display (e.g., display 1000 of FIG. 10), and a control system 110. The fan assembly 800b comprises the first support 865a, hub 827b, and rotatable structure 805b. For illustrative purposes, the second support 865b and other components of fan assembly 800b (see, e.g., FIGS. 8C and 8C) are not shown in FIG. 11. However, these components may be optionally included as desired for the particular implementation of the display apparatus.

The display 1000 is positioned relative to the fan assembly 800b. For example, FIG. 11 shows the display 1000 disposed a distance away from the fan assembly 800b along the fiducial viewing direction 1020 (FIG. 10). In some embodiments, the fiducial viewing direction 1020 may be substantially parallel to the rotation axis 120. As described above in connection to FIG. 10, the display 1000 may comprise a plurality of light sources 101 configured to emit light (illustrated as a plurality of light rays 1040) generally towards the fan assembly 800b. For example, the light sources 101 may comprise LEDs that emit light of a plurality of colors toward the rotatable structure 805b. In some embodiments, the display 1000 may be also be rotated about the same or a separate rotation axis, which may be substantially parallel to the fiducial viewing direction 1020.

The rotatable structure 805b comprises a plurality of fan blades 802b. Each fan blade 802b may comprise a plurality of surfaces 807, for example a proximal surface 807a, a first side surface 807b, a second side surface 807c, and a distal surface 807d. The light from the display 1000 is incident on one or more surfaces 807 (e.g., proximal surface 807a in the illustrative embodiment of FIG. 11). The surface 807a of FIG. 11 may be designed to have a contoured or angled shape configured to anisotropically direct light into an array of light beams that propagate at different outgoing angles to generate an image (e.g., as described above in connection with FIGS. 3A-3C). For example, the shape of the surface 807a may be designed to have a depth and contoured shape to direct one or more light rays 1040 into different directions to generate an image.

As described above, the fan assembly 800b or display 1000 may be in wired or wireless communication with control system 110. The control system 110 comprises a memory (e.g., memory 114) storing instructions that when executed by a processor (e.g., processor 112) are configured to drive the display 1000 so as to emit light indicative of a desired image; drive the rotatable structure 805b so as to rotate at a desired rate of rotation; and generate an image based on the light 1040 that may be redirected by the fan blades 802b (e.g., reflected, transmitted, refracted, or other methods of optically redirecting light incident thereon).

While FIG. 11 illustrates the display apparatus 100 comprising the fan assembly 800b, other configurations as possible. For example, the fan assembly 800b may be exchanged with fan assembly 800a of FIG. 8A or any other fan assembly type as described above. Reference to fan assembly 800b was for illustrative purposes only and not intended to be a limitation.

Figure 12A:
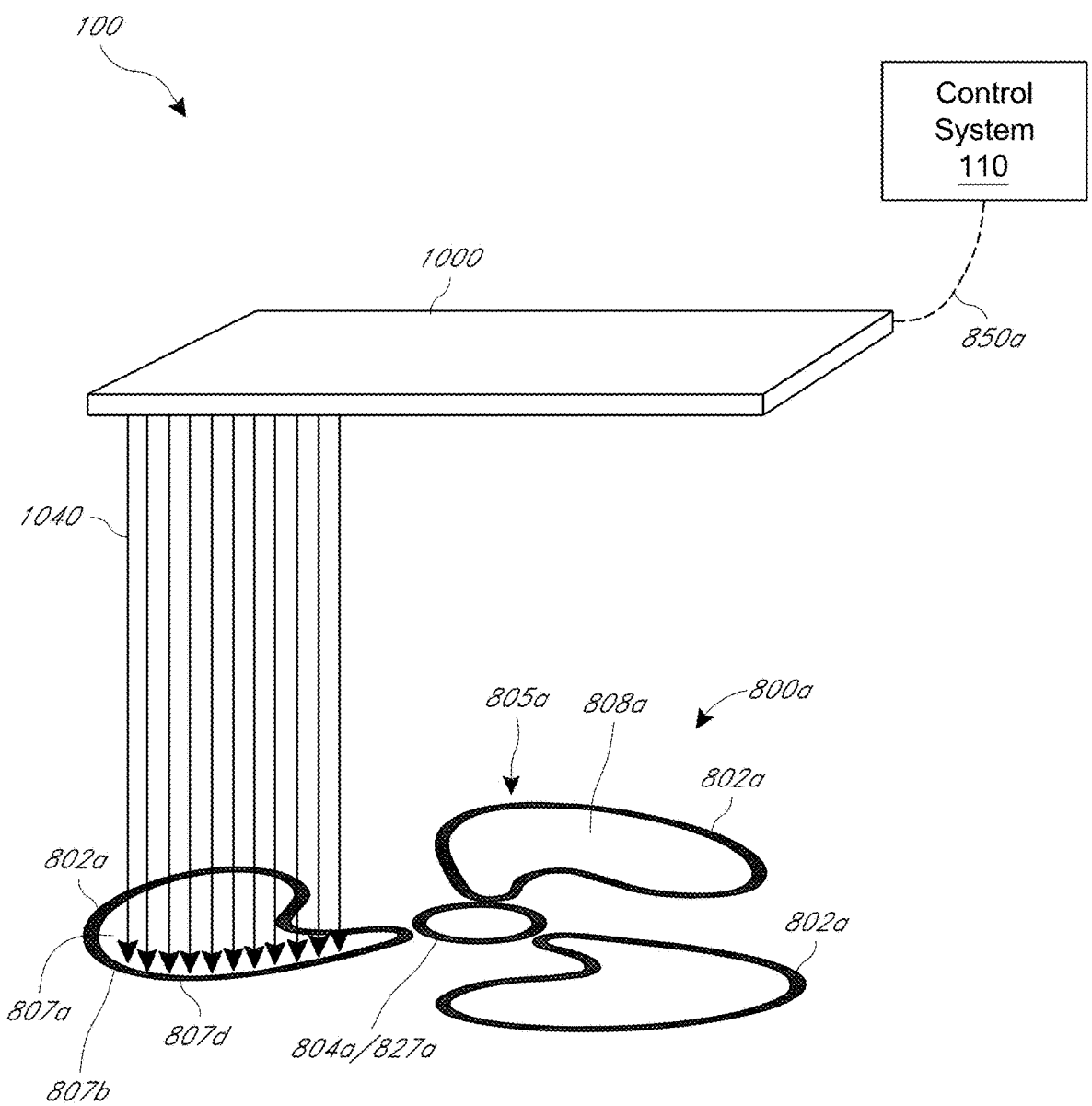
FIGS. 12A-12C schematically illustrate various examples of the display apparatus.
Figure 12B:
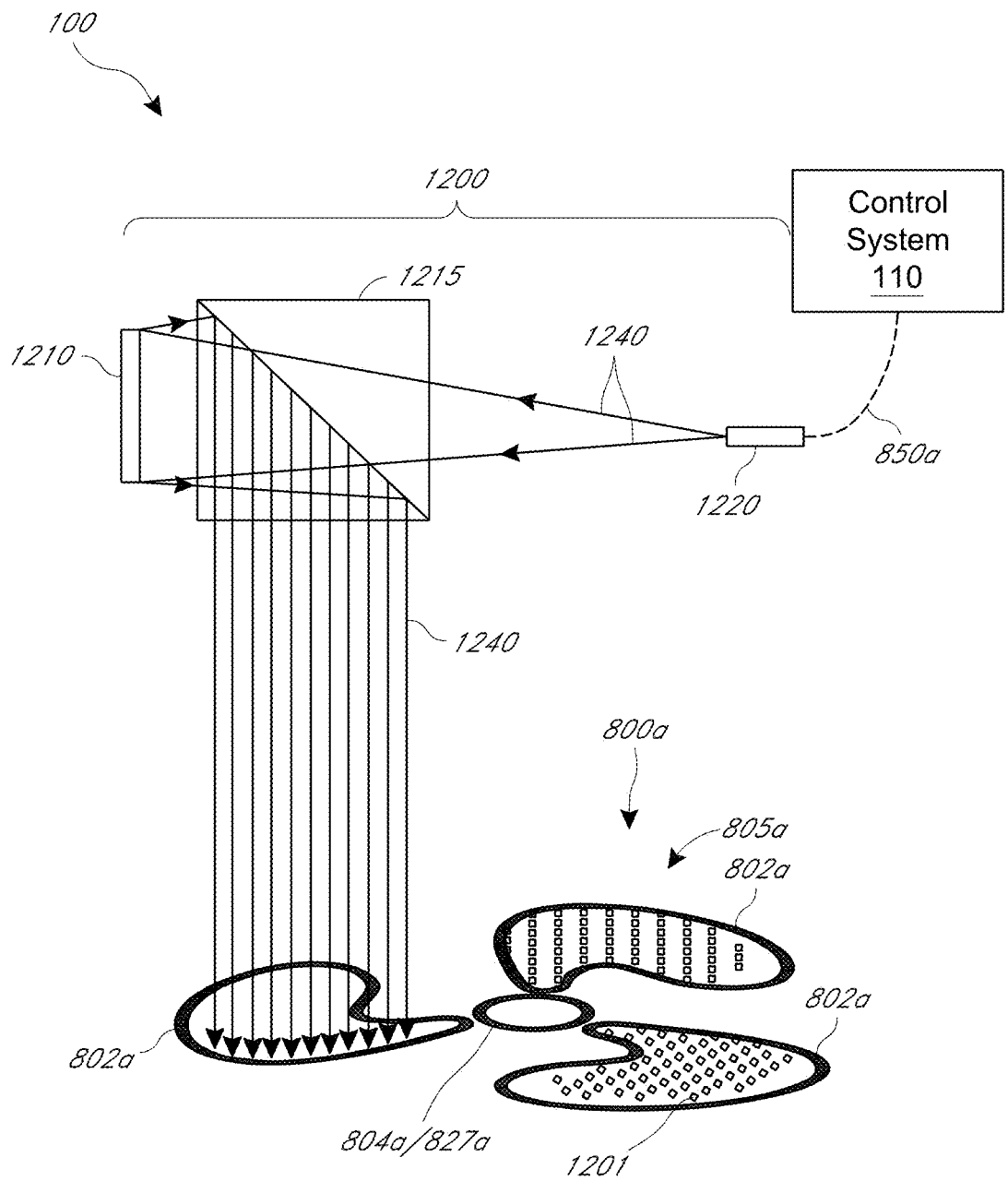
Figure 12C:
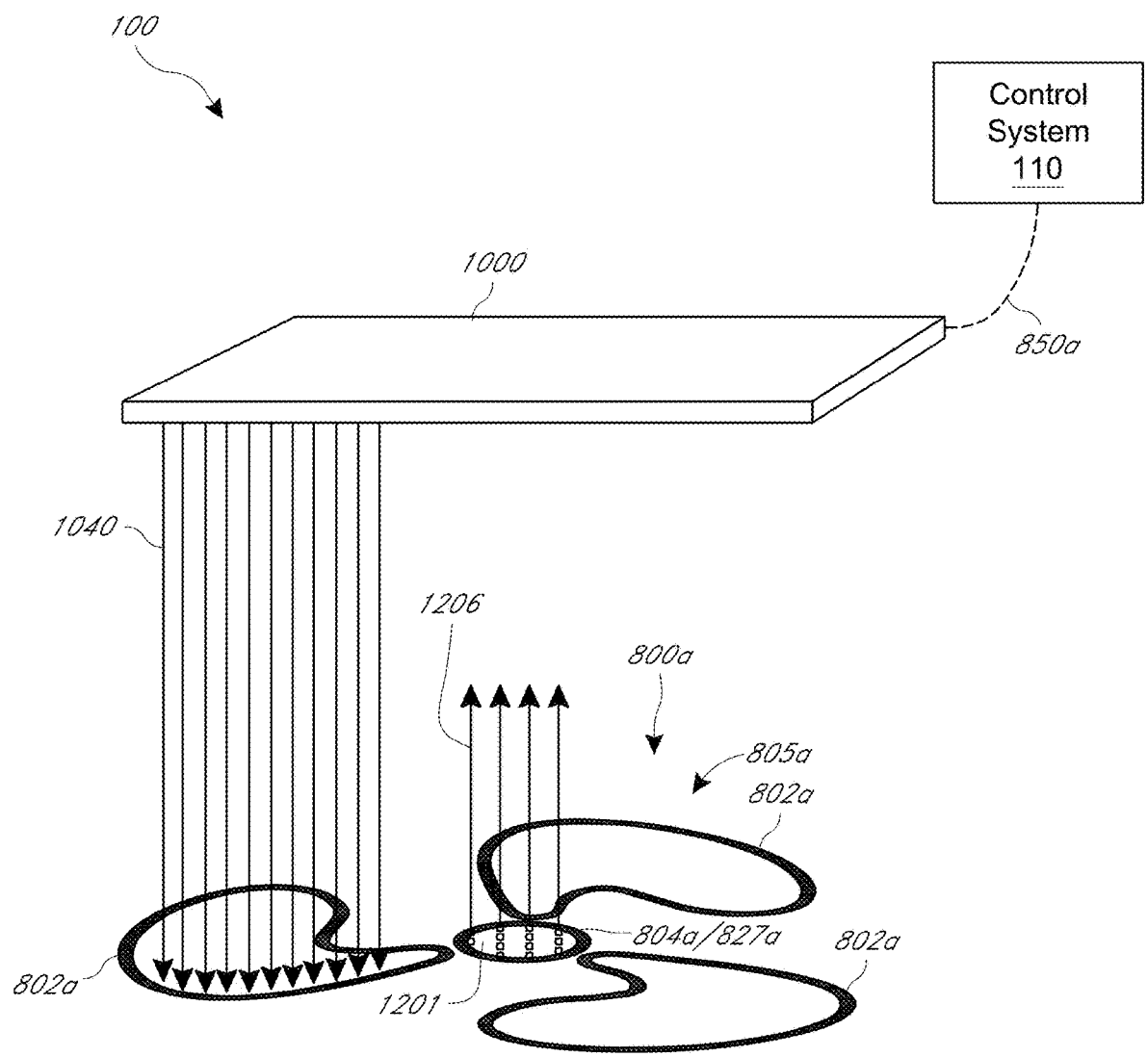

FIGS. 12A-12C schematically illustrate various examples of the display apparatus 100. The display apparatus 100 of FIGS. 12A-12C are substantially similar to the display apparatus 100 of FIG. 11, except that FIGS. 12A-12C illustrate the display apparatus 100 comprising the fan assembly 800a. Accordingly, the description above for FIG. 11 applies equally to FIGS. 12A-12C unless otherwise indicated. For example, FIG. 12A depicts the display apparatus 100 comprising the fan assembly 800a. While reference is made to fan assembly 800a, the description herein may apply equally to the fan assembly 800b of FIG. 8B. As described above in connection with FIG. 8A, the shape of the fan blades 800a may be optimized based on a plurality of parameters discussed above. In some embodiments, the shape may also be configured such that one or more light rays of the light 1040 travels a different distance to reach a corresponding position on the fan blade 802a than another light ray travels to reach its corresponding position on the fan blade 802a (e.g., each light ray may travel a different distance).

FIG. 12B illustrates an embodiment of the display apparatus 100 comprising a display 1200 configured to illuminate the fan assembly 800a. The display 1200 may similar to display 1000 and comprises a light emitter 1220 producing light 1240, a beamsplitter 1215 and a light modulator 1210. The light 1240 from the light emitter 1220 may be directed to and modified by a light modulator 1210, e.g., a spatial light modulator, via a beam splitter 1215. The light modulator 1210 may be configured to spatially or temporally change the perceived intensity of the light directed to the fan assembly 800a, via beamsplitter 1215. Examples of spatial light modulators include liquid crystal displays (LCD) including a liquid crystal on silicon (LCOS) displays. The light emitter 1220 may be device or system configured to emit light, for example, LED, lasers, lamp sources, etc. Also illustrated in FIG. 12B (and applicable in any of the embodiments described in the present disclosure) are fan blades 802a comprising a plurality of optical elements 1201 disposed on or formed in the fan blades 802a. For example, the optical elements 1201 may comprise reflective or diffractive elements configured to direct light incident thereon. In some embodiments, the optical elements may comprise micro-lenses or micro-mirrors configured produce a light field for generating a 3-D representation of an image. Other configurations are possible.

FIG. 12C depicts a display assembly 100 that may be substantially similar to the display apparatus 100 of FIG. 12A. Additionally, FIG. 12C depicts a plurality of light sources 1202 disposed at a central region of the rotatable structure 805a. The light sources 1202 may be substantially similar to light sources 101 and positioned within a desired area of the rotation axis of the rotatable structure 805a. In some embodiments, the light sources 1202 may be disposed on a hub 827a or along the rotation axis relative to the motor 804a. In some embodiments, the light sources 1202 may comprise light field sub-displays (e.g., FIGS. 2A-4B) and may be configured to produce a light field for generating a 3-D image. Without subscribing to a scientific theory, such a configuration in conjunction with the display 1000 may enhance the 3-D effect while minimizing drawbacks related to adding structure to the fan blades 802a. While FIG. 12C illustrates the light sources 1202 at a specific location, other configurations are possible. For example, light sources 1202 may be disposed on a surface of the fan blades 802a as described above or may be contained within a different portion of rotatable structure 805a to minimize the number of light sources 1202 added to the fan blades.

While FIGS. 12A-12B illustrate the display apparatus 100 comprising the fan assembly 800a, other configurations as possible. For example, the fan assembly 800a may be exchanged with fan assembly 800b of FIG. 8B or any other fan assembly type as described above. Reference to fan assembly 800a was for illustrative purposes only and not intended to be a limitation.

Figure 13A:
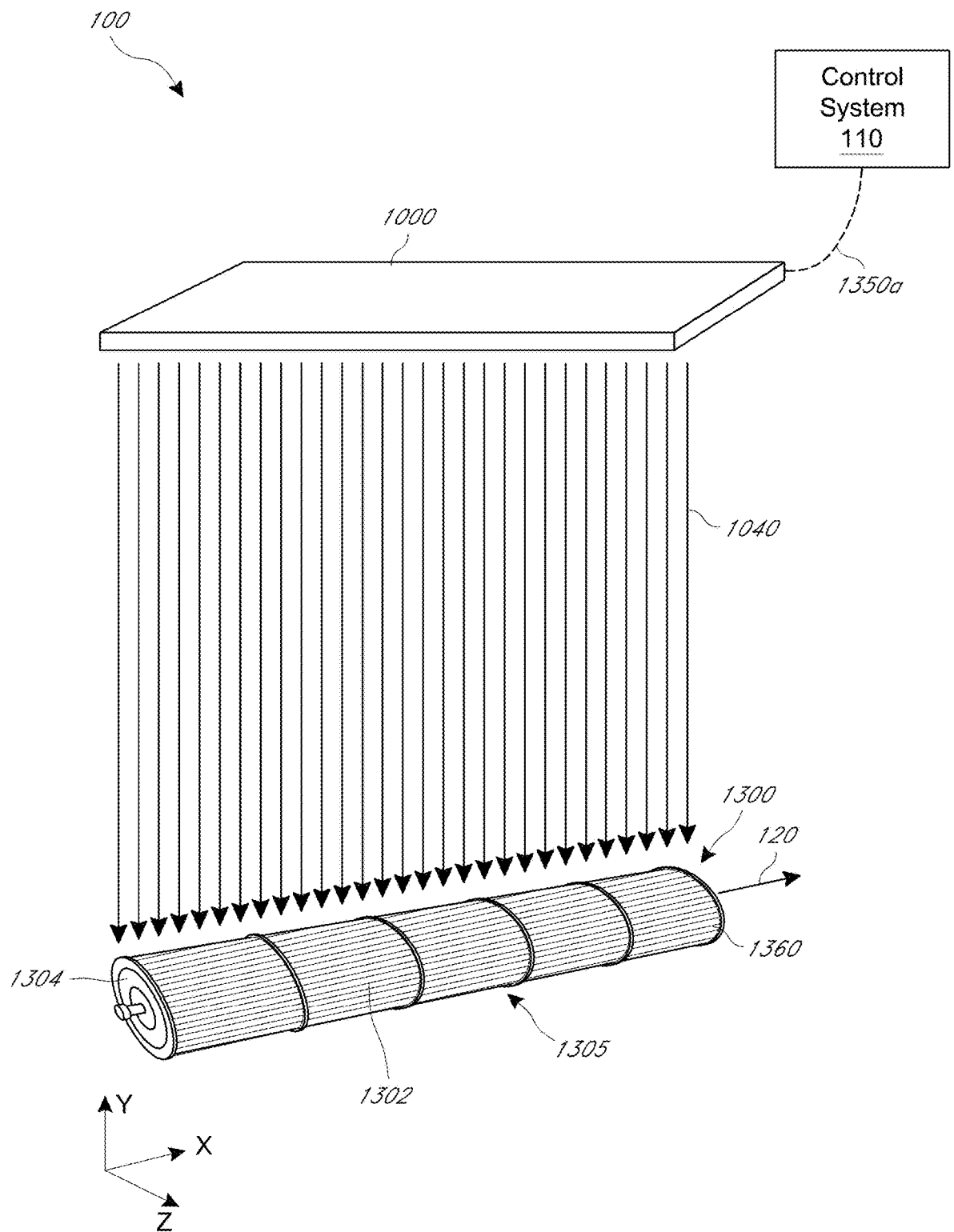
FIGS. 13A and 13B schematically illustrate examples of the display apparatus.
Figure 13B:
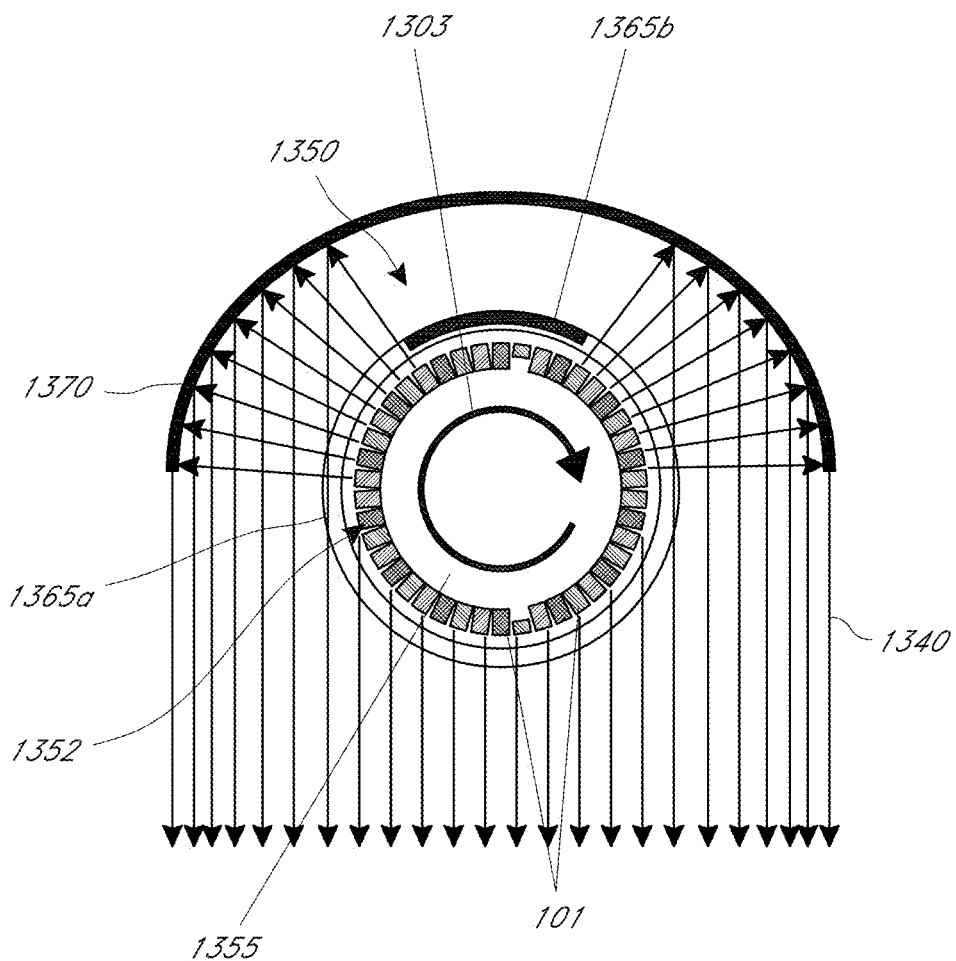

FIGS. 13A and 13B schematically illustrate examples of the display apparatus 100 comprising a centrifugal fan 1300 (e.g., a squirrel-cage fan). FIG. 13A illustrates a display apparatus 100 that may be substantially similar to the display apparatus of FIG. 11. However, a centrifugal fan 1300 may be included extending along the X-axis. The centrifugal fan 1300 comprises a cage housing 1360 and a rotatable structure 1305 extending in along the X-axis. Cage housing 1360 or rotatable structure 1305 may have a circular, an elliptical, or any other desired cross-sectional shape. A motor 1304 drives the rotatable structure 1305 so as to rotate about the rotation axis 120, which may be substantially parallel to the X-axis. In some embodiments, the rotatable structure comprises a plurality of fan blades 1302 also extending in along the X-axis. Accordingly, air flow due to rotation of the fan blades may be in a direction substantially perpendicular to or radially outward from the axis of rotation 102.

The display 1000 may be disposed relative to the centrifugal fan 1300 along a direction at an angle relative to the rotation axis (e.g., a direction that is non-parallel to the rotation axis). For example, FIG. 13A illustrates the display 1000 parallel to centrifugal fan 1300 in a direction perpendicular to the rotation axis 120 (e.g., the Y-axis in this example). Other relative angles are possible. Accordingly, light 1040 emitted by the display is directed toward the fan blades 1302, which are configured to anisotropically direct light into an array of light beams that propagate at different outgoing angles to generate an image, in accordance with the disclosure herein. Without subscribing to any scientific theory, the centrifugal fan embodiment of FIG. 13A may enhance a 3-D effect because while the rotatable structure 1305 is rotated a subset of fan blades 1302 may approach the light 1305 while another subset of fan blades 1302 recede from the light, thereby controlling the direction that incident light is directed to form the image. While FIG. 13A illustrates the display 1000 positioned along the Y-axis, other configurations are possible. For example, the display 1000 may be positioned anywhere within a sphere encompassing the centrifugal fan, such that the display 1000 is not positioned normal to the axis of rotation.

FIG. 13B schematically illustrates a side view of an example centrifugal fan 1350 for use in a display apparatus in accordance with the embodiments herein. The centrifugal fan 1350 may be substantially similar to the centrifugal fan 1300, unless otherwise noted. For example, centrifugal fan 1350 comprises a rotatable structure 1355 disposed within a housing 1365 and extending in a direction parallel to the centrifugal fan 1350 and configured to be rotated in a direction similar to that centrifugal fan 1300 (e.g., along the rotation axis 120 in a rotation direction 1320). The rotatable structure 1355 comprises fan blades 1352 that are similarly structured as the fan blades 1302 of FIG. 13A. However, the fan blades 1352 comprise a plurality of light sources 101 disposed thereon. For illustrative purposes, FIG. 13B shows the fan blades 1352 comprising a circular configuration of the light sources 101 that can alternate between different colors, for instance, red, blue, and green light sources (e.g., LEDs). Other configurations are possible. In some embodiments, the light sources 101 may be light field sub-displays as described above. Thus, the control system 110 may be configured to rotate the centrifugal fan 1350 and drive the light sources 101 so as to display an image in a manner similar to that described in connection with the various embodiments herein. Without subscribing to a scientific theory, providing light sources 101 on the fan blades 1352 may improve the image quality or 3-D effect and widen the field of view, because the light sources on respective sides of the fan approach or recede from the reflector 1370.

In some embodiments, the housing 1365 may comprise one or more portions having different optical properties. For example, FIG. 13B illustrates an embodiment of housing 1365 comprising a translucent portion 1365a and an at least partially opaque portion 1365b of housing 1365. The translucent portion 1365a may comprise any translucent, transparent, or semitransparent material. In some embodiments, the translucent portion 1365a may comprise a cage portion having alternating openings and opaque regions. In some embodiments, the translucent portion 1365a may comprise a transparent portion made of, for example, glass, plastic or other transparent material. The opaque portion 1365b may be configured to at least partially block, filter, reflect, or absorb a subset of light emitted by the light sources 101. While a specific arrangement of the portions 1365a, 1365b are illustrated in FIG. 13B, other configurations are possible. For example, a plurality of opaque portions may be interposed between translucent portions.

A reflector 1370 may also be disposed relative to the centrifugal fan 1352 and configured to direct light from light sources 101 to desired positions for rendering the image. As shown in FIG. 13B, the reflector may comprise a concave reflector disposed on a side of the centrifugal fan 1352 opposite of an observer. In such an arrangement, light projected away from the observer may be redirected to enhance the image quality or 3-D effect of the representation. The reflector 1352 may comprise any reflective material or a surface having a reflective coating disposed thereon. While a specific arrangement is shown in FIG. 13B, other configurations are possible. For example, the reflector 1370 may be convex or any other shape desired for a particular application. The reflector 1370 can have a shape that is cylindrical, ellipsoidal, or paraboloidal, which may help direct or focus light to a desired point or direction. The reflector 1370 need not be disposed on the same side as the opaque portion 1365b, but may be positioned anywhere relative to the centrifugal fan 1352.

While specific configurations and arrangements of a display apparatus 100 have been described with reference to the figures throughout this application, other configurations are possible. For example, in any of the above described configurations, additional optical elements may be disposed within or between the various components of the display apparatus 100 to manipulate, direct, and control the light as it propagates from the light sources 101 to the image or observer.

Example Routine for Displaying a Representation of an Image

Figure 14:
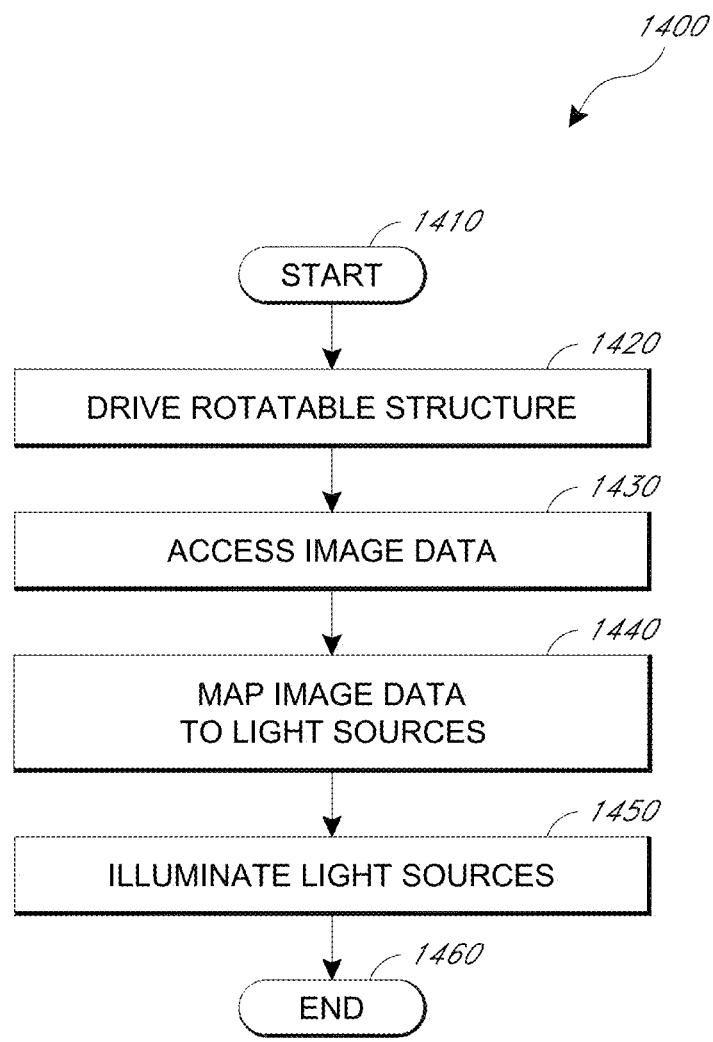
FIG. 14 is a process flow diagram of an example of a method of displaying a representation of an object using a display apparatus.

FIG. 14 is a flow diagram of an illustrative routine for displaying a representation of an image using the display apparatus described herein. In some embodiments, the representation may comprise a 3-D or 2-D image of an object, operational indicator, or other pictorial depiction. The routine 1400 is an example flow for processing image data and illuminating light sources to display a representation of an object or image. For example, in embodiments of the display apparatus described herein comprising light field sub-displays, the routine 1400 may be an example flow for processing light field image data and illuminating light field sub-displays to display a 3-D representation of an object or image. The routine 1400 may be performed by the control system 110 of embodiments of the display apparatus 100.

The routine 1400 starts at the block 1410 and then moves to the block 1420, where the control system drives a rotatable structure (e.g., rotatable structures 105, 805, 1305, etc.) by a motor (e.g., motor 104, 805, 1304, etc.) such that the rotatable structure is rotated about rotation axis 120 along the path (e.g., rotation path 103 or 1303) at a rotation rate. In some embodiments (e.g., FIGS. 1, 5A-5G, 8A-9D, and 13B), as a result of the motor driving the rotatable structure, the light field sub-displays included on the rotatable structure are associated with a position based on a rotation angle as a function of time. In other embodiments (e.g., FIGS. 11-13A), as a result of the motor driving the rotatable structure, the display emits light onto the rotatable structure at corresponding positions based on a rotation angle as a function of time. For a constant rotation rate, the rotation angle is the rotation rate multiplied by time plus an initial rotation angle (at time=0). In some embodiments the rotation rate may be based, in part, on the arrangement of the rotatable structure (e.g., the number of or spatial arrangement of the elongated elements, or the sub-displays disposed on the rotatable structure). The rotation rate may also be based, in part, on the object to be displayed and the number of rendered frames of the object to be represented by the display apparatus 100. For example, an increase in the rotation rate may correspond to an increase in the image quality (e.g., a higher refresh rate). As described above, the rotation rate can be sufficiently fast that the human visual system does not perceive the elongated elements.

The routine 1400 continues to the block 1430, where the image data is accessed, for example, from the memory 114 or another separate or remote storage unit. In some embodiments, the image data may comprise a 2-D representation of an object to be displayed. The image data may be indicative of a one or more rendered frames and comprise data indicative of a color of light to be directed to a particular position. In some implementations, the image may be a light field representation of an object to be displayed. The light field image may comprise multiple rendered frames. Each rendered frame may comprise a representation of the object to be displayed at different viewing directions. In this way, the multiple rendered frames are each associated with a viewing direction of the object. In other implementations, the images of the object may be sequenced so that the object appears to be moving in space. In this case, the accessed light field image may include multiple light field images, where each light field image is a single frame of a video.

The routine 1400 continues to the block 1440, wherein the image data is mapped to the light sources. For example, the control system 110 of FIG. 1 may execute instructions to generate an association or mapping of the accessed image data to each of the light sources based, in part, on the rotation angle of the display apparatus. In some embodiments, each rendered frame of the light field image may be mapped to the pixels (e.g., a given light source or a micro-lens of FIGS. 2A and 2B in some embodiments implementing light field sub-displays) of the light sources. The mapping may be based in part on the rotation rate or rotation angle of the rotatable structure as a function of time. The mapping of the image data may also include determining a color and intensity of light to be emitted at the viewing direction associated with the rendered frame to be displayed by the mapped pixel (e.g., a light source or micro-lens of FIGS. 2A and 2B) of the light source. In some embodiments, the light source may comprise a light field sub-display and the image data may comprise light field image data.

In embodiments comprising a display 1000 separate from the rotatable structure, the image data can be mapped to positions on the rotatable structure corresponding to the emitted light. For example, the control system 110 of FIG. 1 may execute instructions to generate an association or mapping of the accessed image data to each of the position on the rotatable structure based, in part, on the rotation angle of the rotatable structure and a relative position between the light source and corresponding position. In some embodiments, each rendered frame of the image data may be mapped to the pixels (e.g., a corresponding position and associated light source). The mapping may be based in part on the rotation rate or rotation angle of the rotatable structure as a function of time. In some embodiments, the mapping may include an association of positions of light sources on a display in relation to the position of the rotatable structure as a function of time.

In one embodiment, the mapping of the image data to the light field sub-displays may be performed according to a routine detailed below in connection with FIG. 15.

The routine 1400 continues to the block 1450, where the light sources are illuminated. For example, the light sources may be illuminated based, at least in part, on the mapped image data. In embodiments comprising light field sub-displays, the control system 110 of FIG. 1 may execute instructions to cause the light field sub-displays to be illuminated based, in part, on the mapped light field image data and the rotation angle as a function of time of the rotatable structure. In one implementation, the light field sub-displays may be modulated (e.g., turned on and off) as a function of time and based in part on the rendered frame. For example, as the position of a light field sub-display is moved due to the rotation of the rotatable structure, the rendered frame to be represented may be changed and the light field sub-display may be switched between the multiple rendered frames (e.g., strobed).

In embodiments comprising light sources, the control system 110 of FIG. 1 may execute instructions to cause the light sources to be illuminated based, in part, on the mapped image data and the rotation angle as a function of time of the rotatable structure. In one implementation, the light sources may be modulated (e.g., turned on and off) as a function of time and based in part on the rendered frame. For example, as the position of a light source is moved relative to the rotatable structure due to the rotation of the rotatable structure, the rendered frame to be represented may be changed and the light sources may be switched between the multiple rendered frames (e.g., strobed).

In one embodiment, the illumination of the light sources may be performed according to a routine detailed below in connection with FIG. 16. Thereafter, at the block 1460, the routine 1400 ends.

In various embodiments, the routine 1400 may be performed by a hardware processor (e.g., the hardware processor 112 of control system 110 of FIG. 1) of a display apparatus 100 of FIG. 1. In other embodiments, a remote computing device (in network communication with the display apparatus) with computer-executable instructions can cause the display apparatus to perform aspects of the routine 1400.

Example Routine for Mapping Image Data to Light Sources

Figure 15:
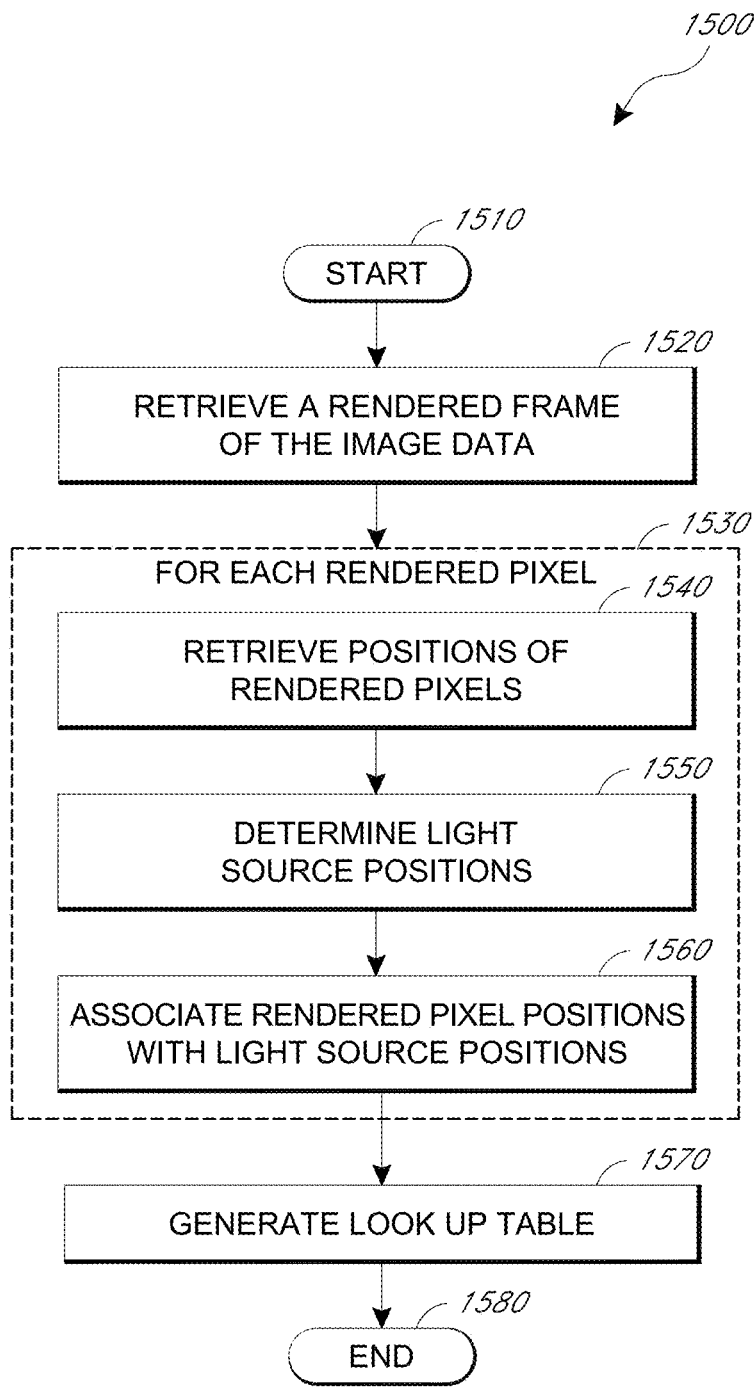
FIG. 15 is a process flow diagram of an example of a method of mapping image data to light sources of a display apparatus.

FIG. 15 is a flow diagram of an illustrative routine for mapping image data to light sources. Routine 1500 may be one example of one method that hardware processor 112 of control system 110 of FIG. 1 or a remote computing device may map the image data to each of the light sources based, at least in part, on the rotation angle of rotatable structure.

The routine 1500 starts at the block 1510 and then moves to the block 1520, where one or more rendered frames of the image data are retrieved. For example, at the block 1520 of routine 1500 the image data is accessed from the digital memory 114 of control system 110. In some embodiments, the image data may comprise light field image data, where the light field image may include multiple rendered frames. Each rendered frame may be indicative of a different view of the plurality of different views of the object. Furthermore, the rendered frames may comprise multiple rendered pixels that may be combined to represent the image of the object to be displayed. The routine continues to subroutine 1530 for each rendered pixel of a rendered frame.

For each rendered pixel, the subroutine 1530 proceeds to the block 1540, where the position of a given rendered pixel is retrieved. Each rendered pixel may have a position within the rendered frame. For example, the rendered frame may comprise a 2-D representation of the object for a given viewing direction, and each rendered pixel may have a coordinate (e.g., X and Y coordinates) position within that rendered frame. In some embodiments, each rendered frame of the image data may include the same number of rendered pixels, such that the positions of rendered pixels are constant from rendered frame to rendered frame.

At the block 1550, light source positions are determined as a function of time based at least partly on the rotation rate (as a function of time) of the rotatable structure. In some embodiments, light field sub-display positions are determined as a function of time based at least partly on the rotation rate of the rotatable structure. In some embodiments, the light source may be separate from the rotatable structure. Accordingly, at block 1550 the position that light is incident on the rotatable structure may be determined as a function time based at least partly on the rotation rate (as a function of time) of the rotatable structure. In some embodiments, the position may also be based on the position of the light source relative to the rotatable structure as a function of time based on the rotation rate of the rotatable structure.

At the block 1560, each rendered pixel position of a given rendered pixel can be associated with a light source position. In some embodiments, as described above, the position of a rendered pixel (u) may be associated with a light source position on the rotatable structure (z) as a function of time (t), where the position of each light source is based on the rotation angle as a function of time. In some embodiments, the position of a rendered pixel (u) may be associated with a position that light is incident on the rotatable structure (z) as a function of time (t), where the position of each light source is based on the rotation angle as a function of time. In some embodiments where the number and position of the rendered pixels is unchanged between rendered frames, the association may be constant for any rendered frame of the light field image. At block 1570, the routine 1500 can generate (and store) a data structure (e.g., a look up table (LUT)) that associates rendered pixels with light field sub-display positions. Multiple display apparatuses may be able to access the same lookup table so as to synchronize the image displayed by the multiple display apparatus located apart or physically separate from each other. At the block 1580, the routine ends.

Example Routine for Illuminating the Light Sources

Figure 16:
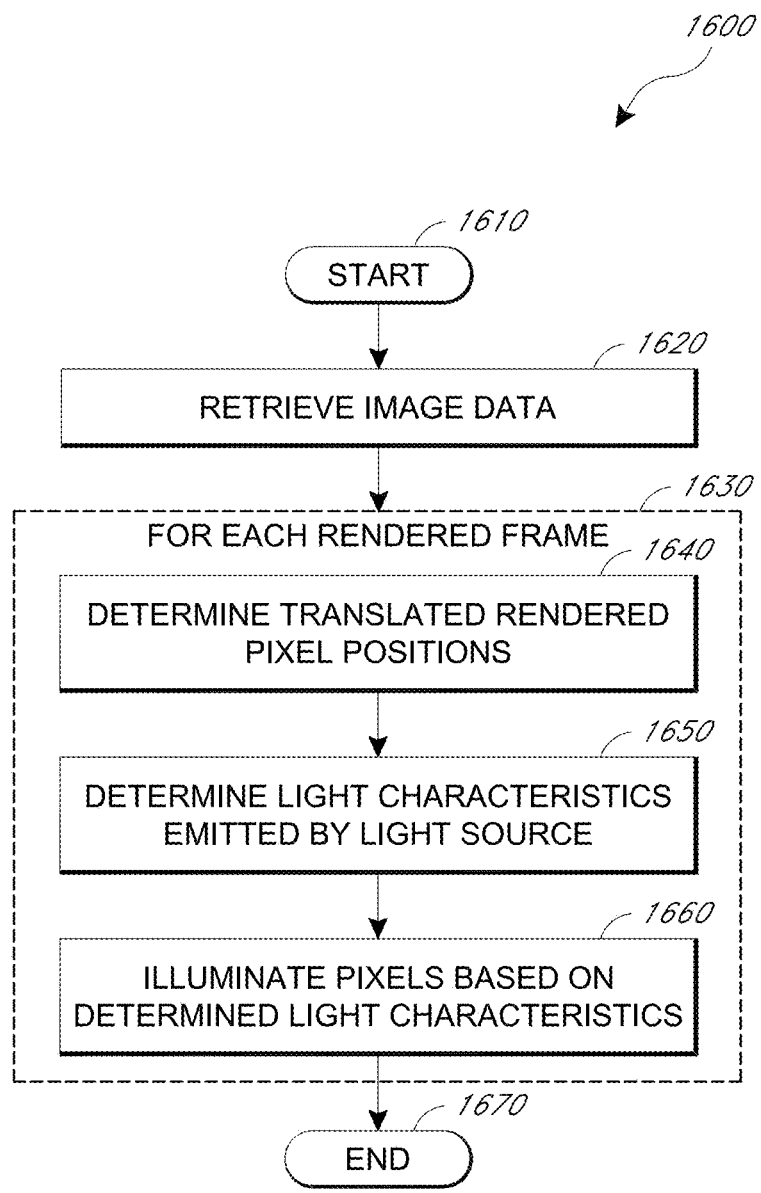
FIG. 16 is a process flow diagram of an example of a method of illuminating light sources of a display apparatus.

FIG. 16 is a flow diagram of an illustrative routine for illuminating the light sources of a display apparatus (e.g., the display apparatus 100 of the embodiments described throughout this disclosure). Routine 1600 may be one example of a method that hardware processor 112 of control system 110 of FIG. 1 or a remote computing device that can be used to illuminate the light sources based at least in part on the mapped image data. In some embodiments, the light sources may comprise light field sub-displays (e.g., FIGS. 2A and 2B) and the image data may comprise light field image data.

The routine 1600 starts at the block 1610 and then moves to the block 1620, where the image data is retrieved. The image data may be representative of one or more rendered frames. Each rendered frame may include a color and intensity (e.g., image parameters), among other optical properties for rendering an image, associated with each rendered pixel of the rendered frame so as to portray the object at a viewing direction associated with the rendered frame. In some embodiments, the color and intensity may be configured to produce an appearance of depth in the image (e.g., by varying the intensity or color of light produced by a light source to render an image). As described above, the image data may include light field image data comprising multiple rendered frames representing different viewing directions. The multiple rendered frames may include one or more of the above described optical properties for rendering an image. The routine 1600 continues to subroutine 1630 for each rendered frame.

For each rendered frame, the subroutine 1630 proceeds to the block 1640, where translated rendered pixel positions are determined. The translated rendered pixel positions may relate to the positions of the rendered pixels translated to a position of the associated light source or position on the rotatable structure that light is incident upon, for example, as determined in routine 1500 of FIG. 15. In some embodiments, the determination of translated rendered pixel positions may be performed by accessing a data structure (e.g., data structure generated in the block 1560 of FIG. 15).

At the block 1650, a color and intensity of light to be emitted by the light source is determined based, at least in part, on the rendered frame to be displayed. In one implementation, the color and intensity may be defined by the rendered pixel to be displayed by a light source.

For example, each rendered frame may comprise a 2-D representation of an image. Each pixel (e.g., each LED) of an array of light sources (e.g., display 1000 or light source disposed on the rotatable structure) may be associated with a direction of emitting light based on the position from which light emanates from the rotatable structure, which may be mapped to a given rendered pixel. Thus, each pixel or position on the rotatable structure may be associated with a given viewing direction at any instance in time. Based on this association, it can be possible to determine which rendered pixel of the rendered frame will be associated with a position on the rotatable structure. From this association, the subroutine 1630 may retrieve a color and intensity of the rendered pixel to determine the color and intensity of light that a given pixel of the light source will emit based on the viewing direction of the rendered frame.

In some embodiments comprising light field sub-displays (e.g., FIGS. 2A and 2B), each rendered frame can be associated with a viewing direction. Each pixel (e.g., pixel 205) in a pixel array 225 of a light field sub-display 101 may be associated with a direction of emitting light based on the association with a micro-lens 215a, which may be mapped to a given rendered pixel. Thus, each pixel 205 of the pixel array 225 can be associated with a given viewing direction at any instance in time. Based on this association, it is possible to determine which rendered pixel of the rendered frame will be associated with a given pixel 205 of the pixel array 225. From this association, the subroutine 1630 may retrieve a color and intensity of the rendered pixel to determine the color and intensity of light that a given pixel of the light field sub-display 101 will emit based on the viewing direction of the rendered frame.

The subroutine 1630 continues to the block 1660, where each light source can be illuminated based on the determined color and intensity, as well as on the rotation angle of the rotatable structure. For example, as the light source is rotated through a rotation path (e.g., rotation path 103), the rendered frame to be displayed by the light source may change based on the change in position. Accordingly, the pixels or light sources may be illuminated or strobed (e.g., alternated or switched between different rendered frames of the light field image) based on the rendered frame to be displayed by a light source as the light source is rotated. Thereafter, at the block 1680, the routine 1600 ends.

Example System for Displaying Images Using a Fan Assembly

Figure 17:
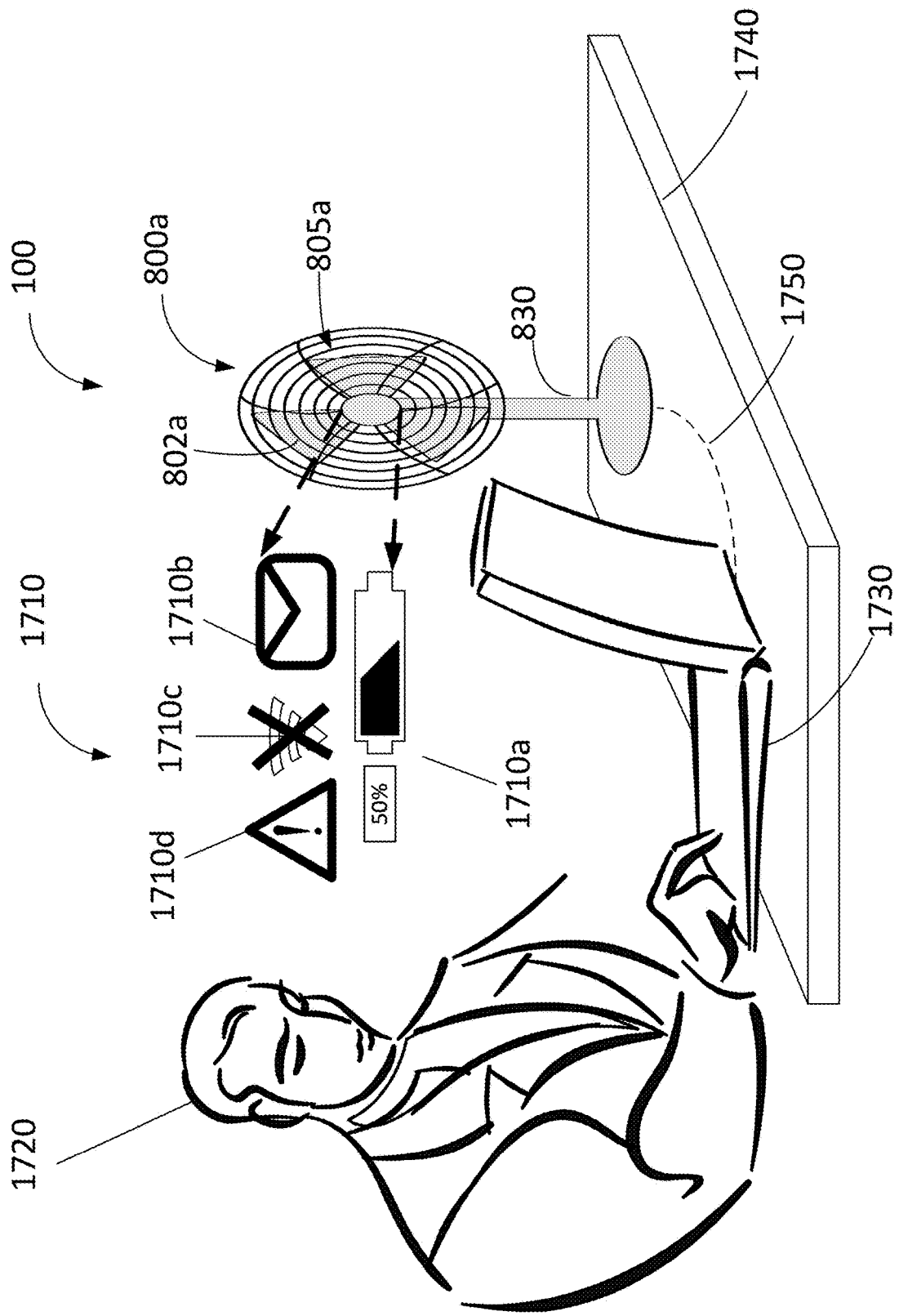
FIG. 17 schematically illustrates an example display apparatus for displaying images using a display apparatus comprising a fan assembly.

FIG. 17 schematically illustrates an example display apparatus for displaying images using a display apparatus comprising a fan assembly. FIG. 17 illustrates a display apparatus 100 operably connected to a computer system 1730 used by a user 1720. Unless otherwise noted, the components of display apparatus 100 may include a fan assembly 800a and other components similar to like numbered components described in connection to the examples shown in FIGS. 8A-13B. For example, the fan assembly 800a shown in FIG. 17 could be a desk fan (as illustrated), but the fan assembly could additionally or alternatively be a cooling fan 800b for a computer system 1730 (or other electronic device) or a wearable augmented reality display device (such as the example shown in FIG. 4C). The fan assembly 800a may be configured to illuminate and redirect light while the fan blades 802a are rotated. Such displays can be used for displaying system notifications to a user 1720 indicative of operation states of the computer system 1730. For example, the fan assembly 800a may be used to display a notification image 1710 indicative of a battery status 1710a (e.g., for a battery powering the fan assembly, computer system, other electronic device, or AR display device), a lack of wireless connectivity (e.g., Wi-Fi or other communication protocol) 1710c, a new message 1710b (e.g., an e-mail or a text message), or an alert 1710d (collectively hereinafter referred to as notification image 1710). The notification image 1710 may be a 2-D or 3-D image based in part on the image data for rendering the notification image 1710.

Referring again to FIG. 17, a computer system 1730 (e.g., a laptop computer in this illustrative embodiment) is illustrated operated by a user 1720 on a surface 1740 (e.g., a desk). The fan assembly 800a can be a desk fan positioned relative to the user 1720 (e.g., on the desk or otherwise pointed toward the user) to provide, for example, air flow to cool the user. Other types of fans may be applicable as described above. The fan assembly 800a can be operatively coupled to the computer system 1730, such as via a wired or wireless communication link (e.g., shown as a dotted line 1750). In some embodiments, the computer system 1730 may include the control system 110 (e.g., link 1750 may be similar to link 850a). In other embodiments, the computer system 1730 may be operatively coupled to the control system 110 via the communication link 1750. The computer system 1730 can be configured to transmit signals to the fan assembly 800a via the communication link 1750. The signals may comprise data indicative of (i) instructions for driving or illuminating the display apparatus in accordance with FIGS. 14-16; (ii) image data for rendering the object or image; or (iii) information indicative of notifications 1710. In some embodiments, the data may be indicative of one or more operational states of the computer system 1730, for example, a battery status for a battery powering e.g., the fan assembly 800a, the computer system 1730, or other battery-powered component (e.g., an AR device such as shown in FIG. 4C); a connectivity state to a wireless network; or an alert of a fault in the system such as a corrupt data file. In other embodiments, the information may be indicative of a message (e.g., an email or instant message) intended for the user 1720; a request for an action or input by the user (e.g., a request to update software or programs included in the computer system 1730); or any notification for the user 1720 to interpret or otherwise act upon.

The display apparatus 100 can be configured to receive the signal from the computer system 1730 and display an image 1710 representative of one or more of the notifications included in the signal. For example, each type of notification may be associated with a notification image 1710. The data included in the signal may be indicative of the notification (or in some embodiments the signal may include the notification image 1710). Where the data is transmitted without the notification image 1710, the control system 110 may retrieve the image data corresponding to the associated notification image 1710. In either case, the fan assembly 800a may be operated to display the notification image 1710 based on the received data (e.g., as described above in connection to FIGS. 8A-16). Thus, as shown in FIG. 17, the fan assembly 800a may be used to display notification images 1710 to the user. While FIG. 17 illustrates multiple notification images 1710 displayed at once, this is for illustrative purposes only and not a limitation. The fan assembly 800*a* may be configured to display one or more notification image 1710 based on the signal received from the computer system 1730.

While a specific configuration is depicted in FIG. 17, other configurations are possible. For example, while the description herein was made with reference to FIG. 8A, this is for illustrative purposes only and is not intended as a limitation. Any of the display apparatus described in the present disclosure may be used in place of display apparatus 100. For example, the display apparatus 100 may comprise a fan assembly 800*b* of FIG. 4C, FIG. 8B or any of the fan assemblies described herein. Furthermore, the fan assembly may be part of the computer system 1730 (e.g., a fan assembly configured to cool electrical or mechanical components of the computer system 1730). The fan assembly may also include any type of fan assembly, for example, a ceiling fan, a box fan, an engine turbine, etc.

FIG. 17 illustrates the computer system 1730 as a laptop for illustrative purposes only, and other computer systems may be equally applicable. The computer system 1730 may be any system comprising a hardware process for executing instructions in a memory. For example, the computer system 1730 may comprise a component of a head mounted augmented reality display (e.g., the local processing and data module 70 of FIG. 4C) a video game system, a mobile cellular telephone, etc. In some embodiments, the computer system 1730 may be operably coupled to a mechanical component (e.g., an engine or propeller of an aerial vehicle) and the notifications 1710 may provide operational states of the mechanical components (e.g., information for controlling the vehicle, heat states, pressure states, etc.). Furthermore, the display apparatus 100 need not be coupled to only one computer system 1730, but may be coupled to a plurality of computer systems 1730 and configured to display one or more notification images 1710 corresponding to any one or more of the plurality of computer systems 1730.

Example Routine for Mapping Image Data to Light Sources

Figure 18:
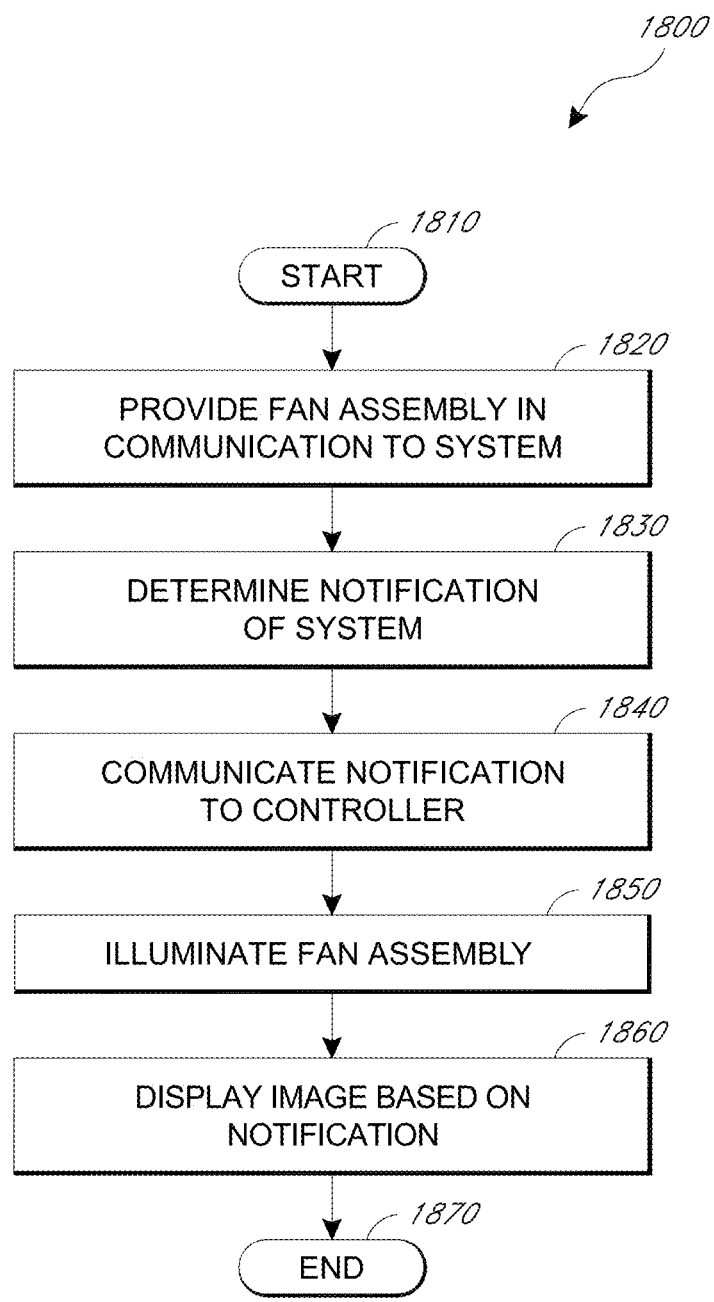
FIG. 18 is a process flow diagram of an example method of displaying an image using a display apparatus comprising a fan assembly.

FIG. 18 is a process flow diagram of an example method of displaying an image using a display apparatus comprising a fan assembly. For example, the process flow 1800 may be used to display the notification image 1710 of FIG. 17. The routine 1800 is an example flow for processing image data and illuminating light sources to display a representation of an image. The routine 1400 may be performed by the control system 110 of embodiments of the display apparatus 100. In some embodiments, the display system 100 may be operably coupled to one or more computer systems (e.g., computer system 1730 of FIG. 17).

The routine 1800 starts at block 1810 and then moves to block 1820, where a fan assembly is provided in communication with a computer system. For example, a fan assembly 800*a* (or any other fan assembly described herein) may be provided as part of a display apparatus 100 and operably coupled to a computer system 1730 (e.g., FIG. 17).

The routine 1800 continues to block 1830, where a notification of the system is determined. For example, a computer system can be configured to determine one or more notifications (e.g., as described above in connection to FIG. 17). In some embodiments, the computer system may be configured to monitor an operational state (e.g., battery status, connectivity status, temperature status, etc.) and store the status in a memory. In other embodiments, the computer system may be configured to detect or receive signals indicative of one or more notifications (e.g., an alert, notification to update software thereon, received message, etc.).

The routine 1800 continues to block 1840, where the notification is communicated to a controller. In some embodiments, the notification is communicated via wired or wireless communication links to a control system of the display apparatus (e.g. control system 100). In other embodiments, the display apparatus may be controlled by the computer system, which may communicate the notification to a local application configured to drive the display apparatus. In some embodiments, the computer system may be configured to transmit a signal indicative of the notification, for example, a data stream including the notification or including the notification image (e.g., notification image 1710 of FIG. 17). The display apparatus or a control system therein may be configured to receive the signal and store it in a memory.

The routine 1800 continues to block 1850, where the fan assembly is illuminated, for example, based on the received signal. In some embodiments, the received signal includes data indicative of the notification image. The notification image may comprise image data that may be mapped to one or more light sources of the display apparatus (e.g., FIGS. 14-16). The fan assembly may then be illuminated based on the mapped image data (e.g., as described in more detail in FIG. 14).

The routine 1800 continues to block 1860, where an image is displayed by the fan assembly based on the received notification. For example, the fan assembly can be illuminated in block 1850 and driven based on signals received from the control system (e.g., FIG. 14-16) to display one or more images representative of the received signal (e.g., notification image 1710).

In various embodiments, the routine 1800 may be performed by a hardware processor (e.g., the hardware processor 112 of control system 110 of FIG. 1) of a display apparatus 100 of FIG. 1. In other embodiments, a remote computing device (in network communication with the display apparatus) with computer-executable instructions can cause the display apparatus to perform aspects of the routine 1400.

Additional Aspects

In a 1st aspect, a fan assembly for displaying a representation of an image, the fan assembly comprising: a plurality of fan blades; a motor configured to rotate the plurality of fan blades to induce an airflow; a plurality of light sources disposed on at least one of the plurality of fan blades; a non-transitory memory configured to store image data to be displayed by the fan assembly, the image data comprising one or more views of the image at a viewing direction; and a processor operably coupled to the non-transitory memory, the motor, and the plurality of light sources, the processor comprising executable instructions to: drive the motor to rotate the plurality of fan blades about a rotation axis, the plurality of fan blades positioned at a rotation angle as a function of time, access the image data, map the image data to each of the plurality of light sources based at least in part on the rotation angle, and illuminate the plurality of light sources based at least in part on the mapped image data.

In a 2nd aspect, the fan assembly of aspect 1, wherein the image data is representative of a light field image, the light field image configured to provide a plurality of different views of the image at different viewing directions.

In a 3rd aspect, the fan assembly of aspect 1 or 2, wherein the plurality of light sources comprise at least one of a light field sub-display, a liquid crystal, a light emitting diode (LED), an organic LED, or a laser.

In a 4th aspect, the fan assembly of any one of aspects 1-3, wherein each light source comprises: a micro-lens array comprising a plurality of micro-lenses, and a pixel array comprising a plurality of pixel subsets, each pixel subset associated with a respective micro-lens and configured to produce light, wherein each pixel subset and associated micro-lens are arranged to produce outgoing light at a plurality of angles, wherein light from a first pixel of the pixel subset propagates from the light field sub-display at an angle that is different from an angle of a second pixel of the pixel subset.

In a 5th aspect, the fan assembly of any one of aspects 1-4, wherein the plurality of light sources comprises a pixel array comprising a plurality of pixels, each pixel configured to produce light, wherein each pixel is arranged to produce outgoing light at an angle based on a shape of the at least one of the plurality of fan blades, wherein light from a first pixel propagates from the at least one of the plurality of fan blades at an angle that is different from an angle of a second pixel.

In a 6th aspect, the fan assembly of any one of aspects 1-5, wherein the plurality of light sources are disposed radially from the rotation axis.

In a 7th aspect, the fan assembly of any one of aspects 1-6, wherein the plurality of light sources are disposed along the at least one of the plurality of fan blades.

In a 8th aspect, the fan assembly of any one of aspects 1-7, wherein the plurality of light sources are disposed in a two-dimensional array on the at least one of the plurality of fan blades.

In a 9th aspect, the fan assembly of any one of aspects 1-8, wherein the plurality of light sources are disposed along at least one of a leading edge, a following edge, or a radial edge of the at least one of the plurality of fan blades.

In a 10th aspect, the fan assembly of any one of aspects 1-9, wherein each light source has a corresponding radius based on its position from the rotation axis, and wherein to illuminate the plurality of light sources the processor is programmed to scale an intensity or a duration of the illumination of a light source based on the corresponding radius.

In a 11th aspect, the fan assembly of aspect 10, wherein the scaling is linear with a radius of the light field sub-display.

In a 12th aspect, the fan assembly of any one of aspects 1-11, wherein the plurality of fan blades, motor, and plurality of light sources are part of a fan assembly. In another aspect, the fan assembly of any of aspects 1-11, further comprising a housing, wherein the plurality of fan blades, motor, and plurality of light sources are disposed within the housing.

In a 13th aspect, the fan assembly of aspect 1, wherein the fan assembly comprises a housing having an opening centered at the rotation axis and an elongate member extending across the opening between the plurality of fan blades and displayed image, the elongate member configured to control transvers loading of the fan assembly based on the plurality of light sources.

In a 14th aspect, the fan assembly of any one of aspects 1-12, wherein the fan assembly comprises a housing including an opening exposing a first subset of the plurality of fan blades; and a covered region covering a second subset of the plurality of fan blades, wherein the processor further comprises executable instructions to map the image data to light sources of the plurality of light sources corresponding to the first subset of the plurality of fan blades.

In a 15th aspect, the fan assembly of aspect 14, wherein the image data is not mapped to a second subset of light sources of the plurality of light sources corresponding to the second subset of the plurality of fan blades.

In a 16th aspect, the fan assembly of any one of aspects 1-15, wherein the motor is configured to rotate the plurality of fan blades at a rotation rate based at least in part on an image quality.

In a 17th aspect, the fan assembly of any one of aspects 1-16, further comprising a speaker system configured to project audio in combination with the processor programmed to illuminate the plurality of light sources.

In a 18th aspect, the fan assembly of any one of aspects 1-17, further comprising a microphone configured to receive audio, and wherein the processor comprises executable instructions to: receive an audio input from the microphone; recognize that the audio input comprises an audio command; and initiate an action to modify the illumination of the plurality of light sources based on the audio command.

In a 19th aspect, the fan assembly of any one of aspects 1-18, further comprising a proximity sensor configured to detect an entity within a predetermined distance of the fan assembly, and wherein the processor comprises executable instructions to initiate an action based on the proximity sensor detecting the entity.

In a 20th aspect, the fan assembly of any one of aspects 1-19, further comprising a centrifugal fan assembly, the centrifugal fan assembly comprising the plurality of fan blades and the motor.

In a 21st aspect, the fan assembly of aspect 20, wherein the centrifugal fan assembly comprises a housing having a translucent portion and an opaque portion.

In a 22nd aspect, a method for displaying a representation of an image by a fan assembly, the method comprising: driving a motor to rotate a plurality of fan blades of the fan assembly, each of the plurality of fan blades comprising a plurality of light sources about a rotation axis, the plurality of fan blades positioned at a rotation angle as a function of time; accessing image data to be displayed, the image data comprising one or more views of the image at a viewing direction; mapping the image data to each of the plurality of light sources based at least in part on the rotation angle; and illuminating the plurality of light sources based at least in part on the mapped image data.

In a 23rd aspect, the method of aspect 22, wherein the plurality of light sources comprise a plurality of light field sub-displays and the image data comprises light field image data comprising a plurality of rendered frames, each rendered frame representative of a different view of the one or more views of the image, wherein each rendered frame comprises a plurality of rendered pixels that combine to render the rendered frame, each rendered pixel having a position within the rendered frame.

In a 24th aspect, the method of aspect 23, wherein mapping the image data, comprises associating the position of each rendered pixel with a position of each light field sub-display on the plurality of fan blades, wherein the position of each light field sub-display is based on the rotation angle as a function of time.

In a 25th aspect, the method of aspects 23 or 24, wherein the rendered pixel positions are unchanged between the plurality of rendered frames.

In a 26th aspect, the method of any one of aspects 23-25, wherein mapping the image data further comprises, for each light field sub-display, determining a color and intensity based on a rendered frame to be displayed and the association of the position of each rendered pixel with the position of each light field sub-display on the plurality of fan blades.

In a 27th aspect, the method of any one of aspects 23-26, wherein illuminating the plurality of light field sub-displays comprises: for a given rendered frame, illuminating each light field sub-display based on the determined color and intensity, wherein the direction of illumination is related to the viewing direction of the rendered frame, and strobing the illumination of each light field sub-display based on the rotation of the plurality of fan blades, the plurality of rendered frames, and the association of the position of each rendered pixel with the position of each light field sub-display on the plurality of fan blades.

In a 28th aspect, the method of any one of aspects 22-27, wherein the image data comprise at least one rendered frame, the rendered frame comprising a plurality of rendered pixels that combine to render the rendered frame, each rendered pixel having a position within the rendered frame.

In a 29th aspect, the method of aspect 28, wherein mapping the image data to each of the plurality of light sources based at least in part on the rotation angle, comprises associating the position of each rendered pixel with a position of each light source on the plurality fan blades, wherein the position of each light source is based on the rotation angle as a function of time.

In a 30th aspect, the method of aspect 29, wherein mapping the image data to each of the plurality of light sources further comprises, for each light source, determining a color and intensity based on the rendered frame and the association of the position of each rendered pixel with the position of each light source on the plurality of fan blades.

In a 31st aspect, the method of aspects 29 or 30, wherein illuminating the plurality of light sources comprises: for the rendered frame, illuminating each light source based on the determined color and intensity, wherein the direction of illumination is related to the viewing direction of the rendered frame, and strobing the illumination of each light source based on the rotation of the plurality of fan blades, the plurality of rendered frames, and the association of the position of each rendered pixel with the position of each light source on the plurality of fan blades.

In a 32nd aspect, a display apparatus for displaying a representation of an image, the display apparatus comprising: a rotatable structure; a motor configured to rotate the rotatable structure; a plurality of light sources positioned relative to the rotatable structure so as to direct light toward the rotatable structure; a non-transitory memory configured to store image data to be displayed by the display apparatus, the image data comprising one or more views of the image at a viewing direction; and a processor operably coupled to the non-transitory memory, the motor, and the plurality of light sources, the processor comprising executable instructions to: drive the motor to rotate the rotatable structure about a rotation axis, the rotatable structure positioned at a rotation angle as a function of time, access the image data, map the image data to each of the plurality of light sources based at least in part on the rotation angle, and illuminate the plurality of light sources based at least in part on the mapped image data.

In a 33rd aspect, the apparatus of aspect 32, wherein the rotatable structure comprises a fan assembly.

In a 34th aspect, the apparatus of aspect 33, wherein the rotatable structure is included in at least one of a desk fan, a ceiling fan, a household fan, a propeller on an aerial vehicle, an engine turbine, an electric cooling fan, a computer fan, a cooling fan for an electronic device, or a centrifugal fan.

In a 35th aspect, the apparatus of any one of aspect 32-34, further comprising a display including the plurality of light sources, wherein the plurality of light sources is arranged in a two-dimensional array.

In a 36th aspect, the apparatus of aspect 35, wherein the display comprises a spatial light modulator.

In a 37th aspect, the apparatus of any one of aspects 32-36, wherein at least one of the plurality of light sources is configured to focus light onto a portion of the rotatable structure.

In a 38th aspect, the apparatus of aspect 37, wherein the plurality of light sources comprise at least one of a light field sub-display, a light emitting diode (LED), a liquid crystal, a light emitting diode (LED), an organic LED, or a laser.

In a 39th aspect, the apparatus of aspects 37 or 38, wherein the rotatable structure comprises a plurality of elongated elements configured to redirect the light focused thereon to display the representation.

In a 40th aspect, the apparatus of aspect 39, wherein each of the plurality of elongated elements comprises a fan blade having a shape configured to induce an airflow and to redirect the light focused thereon to display the representation.

In a 41st aspect, the apparatus of aspect 40, wherein the shape of the fan blade comprises a contoured surface varied along a radially extending length of the fan blade, wherein light emitted by a first light source of the plurality of light sources propagates a first distance to the contoured surface that is different than light emitted by a second light source of the plurality of light sources.

In a 42nd aspect, the apparatus of any one of aspects 32-41, wherein the plurality of light sources comprises a pixel array that comprises a plurality of pixels, each pixel configured to produce light directed toward the rotatable structure, wherein a shape of the rotatable structure is configured to redirect light from a first pixel at an angle that is different from an angle of a second pixel.

In a 43rd aspect, the apparatus of any one of aspects 32-42, further comprising an assembly including the rotatable structure, a hub disposed along the rotation axis, and a second plurality of light sources disposed on at least one of the hub or the rotatable structure.

In a 44th aspect, the apparatus of aspect 43, wherein the second plurality of light sources comprise the plurality of light sources of aspects 1-30. In another aspect, the apparatus of aspect 32, further comprising a hub disposed at the rotation axis, wherein at least a portion of the plurality of light sources are positioned relative to the rotatable structure so as to direct light onto the hub In a 45th aspect, the apparatus of any one of aspects 32-44, wherein each light source has a position relative to the rotation axis, and wherein to illuminate the plurality of light sources the processor is programmed to scale intensity or a duration of the illumination of a light source based on the position from the rotation axis.

In a 46th aspect, the apparatus of any one of aspects 32-45, further comprising an assembly including the rotatable structure, a housing having an opening centered at the rotation axis between the rotatable structure and the plurality of light sources, and an elongate member extending across the opening between the rotatable structure and the displayed image, the elongate member configured to control transvers loading of the assembly based in part of the rotation of the rotatable structure and the illumination of the plurality of light sources.

In a 47th aspect, the apparatus of any one of aspects 32-46, further comprising a housing having an opening between the rotatable structure and the plurality of light sources, the opening exposing a first portion of the rotatable structure to light emitted by the plurality of light sources, the housing further comprising a cover that covers a second portion of the rotatable structure, wherein the processor further comprises executable instructions to map the image data to a first subset of light sources of the plurality of light sources corresponding to the first portion of the rotatable structure.

In a 48th aspect, the apparatus of aspect 47, wherein image data is not mapped to a second subset of light sources of the plurality of light sources corresponding to the second portion of the rotatable structure.

In a 49th aspect, the apparatus of any one of aspects 32-48, wherein the motor is configured to rotate the rotatable structure at a rotation rate based at least in part on an image quality.

In a 50th aspect, the apparatus of any one of aspects 32-49, further comprising a speaker system configured to project audio in combination with the processor programmed to illuminate the plurality of light sources.

In a 51st aspect, the apparatus of any one of aspects 32-50, further comprising a microphone configured to receive audio, and wherein the processor comprises executable instructions to: receive an audio input from the microphone; recognize that the audio input comprises an audio command; and initiate an action to modify the illumination of the plurality of light sources based on the audio command.

In a 52nd aspect, the apparatus of any one of aspects 32-51, further comprising a proximity sensor configured to detect an entity within a predetermined distance of the display apparatus, and wherein the processor is programmed with executable instructions to initiate an action based on the proximity sensor detecting the entity.

In a 53rd aspect, the apparatus of any one of aspects 32-52, further comprising a centrifugal fan assembly, the centrifugal fan assembly comprising the rotatable structure and the motor, wherein the rotatable structure comprises one or more elongated elements, and wherein the rotation axis is at an angle relative to the plurality of light sources and substantially parallel to the one or more elongated elements of the rotatable structure.

In a 54th aspect, a method for displaying a representation of an image, the method comprising: driving a motor to rotate a rotatable structure about a rotation axis, the rotatable structure positioned at a rotation angle as a function of time; accessing image data to be displayed by the display apparatus, the image data comprising one or more views of the image at a viewing direction; mapping the image data to each of a plurality of light sources based at least in part on the rotation angle, the plurality of light sources positioned relative to the rotatable structure so as to direct light toward the rotatable structure; and illuminating the plurality of light sources based at least in part on the mapped image data.

In a 55th aspect, the method of aspect 54, wherein the image data comprise at least one rendered frame, the rendered frame comprising a plurality of rendered pixels that combine to render the rendered frame, each rendered pixel having a position within the rendered frame.

In a 56th aspect, the method of aspect 55, wherein mapping the image data to the plurality of light sources based at least in part on the rotation angle, comprises associating the position of each rendered pixel with a position of each light source, and with a plurality of positions on the rotatable structure based on the rotation angle as a function of time.

In a 57th aspect, the method of aspect 56, wherein mapping the light field image to each of the plurality of light sources further comprises, for each light source, determining a color and intensity based on the rendered frame and the association.

In a 58th aspect, the method of any of aspects 54-57, wherein illuminating the plurality of light sources comprises: for the rendered frame, illuminating each light source based on a determined color and intensity, wherein the illumination is incident on the rotatable structure and the redirection of the incident light is related to the viewing direction of the rendered frame, and strobing the illumination of each light source based on the rotation of the rotatable structure, the rendered frame, and the association.

In a 59th aspect, a method for displaying an image, the method comprising: determining a notification of a state of a device; communicating a signal indicative of the notification to a controller; illuminating a fan assembly based on the signal; and displaying the image using the fan assembly, wherein the image is indicative of the notification.

In a 60th aspect, the method of aspect 59, wherein the notification is at least one of an operational state, a status of a battery configured to provide electrical power to the device; a temperature state, a communication connectivity state, notification of a received message; an e-mail; an instant message; an SMS message; or an alert indicative of a fault in the device.

In a 61st aspect, the method of aspects 59 or 60, wherein the signal comprises image data for displaying the image.

In a 62nd aspect, a fan assembly for displaying a representation of an image, the fan assembly comprising: a rotatable structure; a motor configured to rotate the rotatable structure; a plurality of light sources disposed relative to the rotatable structure; a non-transitory memory configured to store image data to be displayed by the fan assembly; and a processor operably coupled to the non-transitory memory, the motor, and the plurality of light sources, the processor comprising executable instructions to implement the method of any of aspects 59-61.

In a 63rd aspect, the fan assembly of aspect 62, wherein the device is operably connected to the fan assembly via at least one of a wired or wireless communication link.

In a 64th aspect, An augmented reality device comprising: a display system positioned in front of the eyes of a user; a fan assembly comprising a rotatable structure, a motor configured to rotate the rotatable structure, and a plurality of light sources disposed relative to the rotatable structure; a non-transitory memory configured to store image data; and a processor operably coupled to the non-transitory memory, the display, and the fan assembly, the processor comprising executable instructions to implement the method of any of aspects 59-61.

In a 65th aspect, the augmented reality device of aspect 64, wherein the device is the augmented reality device.

In a 66th aspect, the augmented reality device of aspects 64 or 65, wherein the device is operably connected to the fan assembly via at least one of a wired or wireless communication link.

In a 67th aspect, the augmented reality device of any one of aspects 64-66, further comprising a belt-pack, the beltback comprising at least one of the fan assembly, the non-transitory memory, the processor, or a battery.

In a 68th aspect, an augmented reality system comprising the fan assembly of any one of aspects 1-21 or 62-63 or comprising the display apparatus of any one of aspects 32-53 or configured to perform any one of the methods of aspects 22-31 or 54-61.

In a 69th aspect, the augmented reality system of aspect 68 comprising a processing device configured to be worn on a torso or appendage of a user, wherein the processing device comprises the fan assembly of any one of aspects 1-21 or 62-63 or comprises the display apparatus of any one of aspects 32-53 or is configured to perform any one of the methods of aspects 22-31 or 54-61.

Additional Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) or specialized graphics processing units may be necessary to perform the functionality, for example, due to the volume or complexity of the calculations involved or to provide the image display results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. For example, the control system 110 can be in communication with a network environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   a fan assembly for displaying a representation of an image, the fan assembly comprising:
      a plurality of fan blades;
      a motor configured to rotate the plurality of fan blades to induce an airflow; and
      a plurality of light sources disposed on at least one of the plurality of fan blades;
   a non-transitory memory configured to store image data to be displayed by the fan assembly, the image data comprising one or more views of the image at a viewing direction; and
   a processor operably coupled to the non-transitory memory, the motor, and the plurality of light sources, the processor comprising executable instructions to:
      drive the motor to rotate the plurality of fan blades about a rotation axis, the plurality of fan blades positioned at a rotation angle as a function of time,
      access the image data,
      map the image data to the plurality of light sources based at least in part on the rotation angle, and
      illuminate the plurality of light sources based at least in part on the mapped image data,
   wherein the fan assembly is included in a wearable augmented reality display device comprising a head mounted display for a user to wear to view images presented by said head mounted display.

2. The apparatus of claim 1, wherein the image data is representative of a light field image, the light field image configured to provide a plurality of different views of the image at different viewing directions.

3. The apparatus of claim 1, wherein the plurality of light sources comprise at least one of a light field sub-display, a liquid crystal, a light emitting diode (LED), an organic LED, or a laser.

4. The apparatus of claim 1, wherein at least one of the light sources comprises:
   a micro-lens array comprising a plurality of micro-lenses, and
   a pixel array comprising a plurality of pixel subsets, each pixel subset associated with a respective micro-lens and configured to produce light,
   wherein each pixel subset and associated micro-lens are arranged to produce outgoing light at a plurality of angles, wherein light from a first pixel of the pixel subset propagates at an angle that is different from an angle for a second pixel of the pixel subset.

5. The apparatus of claim 1, wherein the plurality of light sources comprises a pixel array comprising a plurality of pixels, the pixels configured to produce light, wherein at least one of the pixels is arranged to produce outgoing light at an angle based on a shape of the at least one of the plurality of fan blades, wherein light from a first pixel propagates from the at least one of the plurality of fan blades at an angle that is different from an angle for a second pixel.

6. The apparatus of claim 1, wherein the plurality of light sources are disposed radially from the rotation axis.

7. The apparatus of claim 1, wherein the plurality of light sources are disposed along the at least one of the plurality of fan blades.

8. The apparatus of claim 1, wherein the plurality of light sources are disposed in a two-dimensional array on the at least one of the plurality of fan blades.

9. The apparatus of claim 1, wherein the plurality of light sources are disposed along at least one of a leading edge, a following edge, or a radial edge of the at least one of the plurality of fan blades.

10. The apparatus of claim 1, wherein each light source has a corresponding radius based on its position from the rotation axis, and wherein to illuminate the plurality of light sources the processor is programmed to scale an intensity or a duration of the illumination of a light source based on the corresponding radius.

11. The apparatus of claim 10, wherein the scaling is linear with the radius of the light source.

12. The apparatus of claim 1, further comprising a housing, wherein the plurality of fan blades, motor, and plurality of light sources are disposed within the housing.

13. The apparatus of claim 1, wherein the fan assembly comprises a housing having an opening centered at the rotation axis and an elongate member extending across the opening between the plurality of fan blades and displayed image, the elongate member configured to control transverse loading of the fan assembly based on the plurality of light sources.

14. The apparatus of claim 1, wherein the fan assembly comprises:
a housing including an opening exposing a first subset of the plurality of fan blades; and
a covered region covering a second subset of the plurality of fan blades,
wherein the processor further comprises executable instructions to map the image data to light sources of the plurality of light sources corresponding to the first subset of the plurality of fan blades.

15. The apparatus of claim 14, wherein the image data is not mapped to a light sources of the plurality of light sources corresponding to the second subset of the plurality of fan blades.

16. The apparatus of claim 1, wherein the motor is configured to rotate the plurality of fan blades at a rotation rate based at least in part on an image quality.

17. The apparatus of claim 1, further comprising a speaker system configured to project audio in combination with the processor programmed to illuminate the plurality of light sources.

18. The apparatus of claim 1, further comprising a microphone configured to receive audio, and wherein the processor comprises executable instructions to:
receive an audio input from the microphone;
recognize that the audio input comprises an audio command; and
initiate an action to modify the illumination of the plurality of light sources based on the audio command.

19. The apparatus of claim 1, further comprising a proximity sensor configured to detect an entity within a predetermined distance of the fan assembly, and wherein the processor comprises executable instructions to initiate an action based on the proximity sensor detecting the entity.

20. The apparatus of claim 1, further comprising a centrifugal fan assembly, the centrifugal fan assembly comprising the plurality of fan blades and the motor.

21. The apparatus of claim 20, wherein the centrifugal fan assembly comprises a housing having a translucent portion and an opaque portion, wherein the plurality of light sources are visible through the translucent portion.

22. The apparatus of claim 1, wherein the fan assembly is included in a belt-pack.

23. The apparatus of claim 22, wherein the belt-back comprises at least one of the non-transitory memory, the processor, or a battery.

24. The apparatus of claim 1, wherein said fan assembly is configured to cool electrical components.

25. The apparatus of claim 1, wherein said fan assembly is included in a local processing and data module.

26. The apparatus of claim 25, wherein said fan assembly is configured to cool electronics in the local processing and data module.

27. The apparatus of claim 25, wherein said local processing and data module is configured to be removably attached to the torso or an appendage of a user.

28. The apparatus of claim 25, wherein said local processing and data module is configured to be removably attached to a hip of a user.

29. The apparatus of claim 1, wherein the augmented reality display device comprises a light field display.

30. The apparatus of claim 29, wherein the light field display comprises a stacked waveguide assembly.

31. The apparatus of claim 1, wherein the augmented reality display device comprises an eyepiece comprising at least one waveguide positioned in front of the eyes of a user.

32. A method for displaying a representation of an image by a fan assembly, the method comprising:
driving a motor to rotate a plurality of fan blades of the fan assembly, one or more of the plurality of fan blades comprising a plurality of light sources about a rotation axis, the plurality of fan blades positioned at a rotation angle as a function of time;
accessing image data to be displayed, the image data comprising one or more views of the image at a viewing direction;
mapping the image data to the plurality of light sources based at least in part on the rotation angle; and
illuminating the plurality of light sources based at least in part on the mapped image data,
wherein the fan assembly is included in a wearable augmented reality display device comprising a head mounted display for a user to wear to view images presented by said head mounted display.

33. The method of claim 32, wherein the plurality of light sources comprises a plurality of light field sub-displays and the image data comprises light field image data comprising a plurality of rendered frames, each rendered frame representative of a different view of the one or more views of the image, wherein each rendered frame comprises a plurality of rendered pixels that combine to render the rendered frame, each rendered pixel having a position within the rendered frame.

34. The method of claim 33, wherein mapping the image data comprises associating the position of each rendered pixel with a position of a light field sub-display on the plurality of fan blades, wherein the position of the light field sub-display is based on the rotation angle as a function of time.

35. The method of claim 33, wherein the rendered pixel positions are unchanged between the plurality of rendered frames.

36. The method of claim 33, wherein mapping the image data further comprises, for a light field sub-display, determining a color and intensity based on a rendered frame to be displayed and the association of the position of a rendered pixel with the position of the light field sub-display on the plurality of fan blades.

37. The method of claim 36, wherein illuminating the plurality of light field sub-displays comprises:
for a given rendered frame, illuminating the light field sub-display based on the determined color and intensity, wherein the direction of illumination is related to the viewing direction of the rendered frame, and
strobing the illumination of the light field sub-display based on the rotation of the plurality of fan blades, the plurality of rendered frames, and the association of the position of each rendered pixel with the position of the light field sub-display on the plurality of fan blades.

38. The method of claim 32, wherein the image data comprise at least one rendered frame, the rendered frame comprising a plurality of rendered pixels that combine to render the rendered frame, each rendered pixel having a position within the rendered frame.

39. The method of claim 38, wherein mapping the image data to the plurality of light sources based at least in part on the rotation angle, comprises associating the position of a rendered pixel with a position of a light source on the plurality fan blades, wherein the position of the light source is based on the rotation angle as a function of time.

40. The method of claim 39, wherein mapping the image data to of the plurality of light sources further comprises, for a light source, determining a color and intensity based on the rendered frame and the association of the position of a rendered pixel with the position of the light source on the plurality of fan blades.

41. The method of claim 39, wherein illuminating the plurality of light sources comprises:

for the rendered frame, illuminating the light source based on the determined color and intensity, wherein the direction of illumination is related to the viewing direction of the rendered frame, and strobing the illumination of the light source based on the rotation of the plurality of fan blades, the plurality of rendered frames, and the association of the position of the rendered pixel with the position of the light source on the plurality of fan blades.

42. The method of claim 32, wherein the fan assembly is included in a belt-pack.

43. The method of claim 42, wherein the belt-back comprising at least one of a non-transitory memory, a processor, or a battery.

44. The method of claim 32, further comprising cooling electrical components with said fan assembly.

45. The method of claim 32, wherein the fan assembly is included in a local processing and data module.

46. The method of claim 45, further comprising cooling electronics in the local processing and data module with said fan assembly.

47. The method of claim 45, further comprising attaching said local processing and data module to and removing said local processing and data module from the torso or an appendage of a user.

48. The method of claim 45, further comprising attaching said local processing and data module to and removing said local processing and data module from a hip of a user.

49. The method of claim 32, wherein the augmented reality display device comprises a light field display.

50. The method of claim 49, wherein the light field display comprises a stacked waveguide assembly.

51. The method of claim 32, wherein the augmented reality display device comprises an eyepiece comprising at least one waveguide positioned in front of the eyes of a user.

* * * * *